US007447530B2

(12) United States Patent
Iwai et al.

(10) Patent No.: US 7,447,530 B2
(45) Date of Patent: Nov. 4, 2008

(54) PORTABLE RADIO COMMUNICATION APPARATUS PROVIDED WITH A BOOM PORTION AND A PART OF HOUSING OPERATING AS AN ANTENNA

(75) Inventors: Hiroshi Iwai, Katano (JP); Atsushi Yamamoto, Osaka (JP); Kenichi Yamada, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/798,246

(22) Filed: May 11, 2007

(65) Prior Publication Data

US 2007/0225053 A1 Sep. 27, 2007

Related U.S. Application Data

(62) Division of application No. 10/771,449, filed on Feb. 5, 2004, now Pat. No. 7,245,950.

(30) Foreign Application Priority Data

Feb. 6, 2003 (JP) ............................. P2003-29217
Feb. 20, 2003 (JP) ............................. P2003-42822

(51) Int. Cl.
*H04M 1/00* (2006.01)

(52) U.S. Cl. ................ 455/575.7; 455/550.1; 455/90.3; 455/575.1; 455/562.1; 455/277.1; 343/702; 343/866; 343/871; 343/726

(58) Field of Classification Search .............. 455/575.7, 455/550.1, 575.3, 575.4, 575.1, 83, 90.3, 455/562.1, 101, 277.1; 343/702, 741, 866, 343/871, 726, 901
See application file for complete search history.

(56) References Cited

U.S. PATENT DOCUMENTS

| | | | |
|---|---|---|---|
| 4,313,119 A | 1/1982 | Garay et al. |
| 5,246,374 A | 9/1993 | Boodram |
| 5,561,437 A | 10/1996 | Phillips et al. |
| 5,649,306 A | 7/1997 | Vannatta et al. |
| 5,760,747 A | 6/1998 | McCoy et al. |
| 5,903,821 A | 5/1999 | Ishikzuka |

(Continued)

FOREIGN PATENT DOCUMENTS

CN 1123476 5/1996

(Continued)

OTHER PUBLICATIONS

Chinese Official Action issued Nov. 2, 2007.

*Primary Examiner*—Sujatha Sharma
(74) *Attorney, Agent, or Firm*—Wenderoth, Lind & Ponack, L.L.P.

(57) ABSTRACT

In a portable radio communication apparatus including a housing, at least one part of the housing is formed as a housing electrical conductor portion by an electrically conductive material. The housing electrical conductor portion is connected with a radio communication circuit of the portable radio communication apparatus so as to operate as at least one part of an unbalanced type antenna of the radio communication circuit. Further, the portable radio communication apparatus further includes a boom portion coupled with the housing at least at two positions so as to provide at least one penetrating hole between the housing and the boom portion.

6 Claims, 46 Drawing Sheets

U.S. PATENT DOCUMENTS

| | | | | |
|---|---|---|---|---|
| 5,991,643 | A | 11/1999 | Chao-Cheng | |
| 5,995,052 | A | 11/1999 | Sadler et al. | |
| 6,075,500 | A | 6/2000 | Kurz et al. | |
| 6,255,996 | B1 | 7/2001 | Wallace | |
| 6,272,356 | B1 | 8/2001 | Dolman et al. | |
| 6,307,511 | B1 | 10/2001 | Ying et al. | |
| 6,307,520 | B1 | 10/2001 | Liu | |
| 6,625,469 | B1 | 9/2003 | Hwang et al. | |
| 6,819,295 | B1 | 11/2004 | Peng et al. | |
| 6,839,569 | B1 | 1/2005 | Ritter | |
| 6,861,989 | B2 * | 3/2005 | Morningstar et al. | 343/702 |
| 6,885,880 | B1 | 4/2005 | Ali | |
| 6,963,310 | B2 * | 11/2005 | Horita et al. | 343/702 |
| 7,084,919 | B2 | 8/2006 | Shibata et al. | |
| 7,096,046 | B2 | 8/2006 | Shapiro et al. | |
| 7,271,772 | B2 * | 9/2007 | Qi et al. | 343/702 |
| 2001/0020335 | A1 | 9/2001 | Busch | |
| 2002/0169010 | A1 | 11/2002 | Shoji et al. | |
| 2003/0184494 | A1 | 10/2003 | Yagi | |
| 2003/0210206 | A1 | 11/2003 | Phillips et al. | |
| 2004/0001022 | A1 | 1/2004 | Silzer, Jr. | |
| 2005/0183242 | A1 | 8/2005 | Gartrell el al. | |

FOREIGN PATENT DOCUMENTS

| | | |
|---|---|---|
| CN | 1278955 | 1/2001 |
| DE | 100 53 817 | 5/2002 |
| EP | 1 087 461 | 3/2001 |
| EP | 1 388 910 | 2/2004 |
| JP | 64-33248 | 3/1989 |
| JP | 6-216621 | 8/1994 |
| JP | 8-97622 | 4/1996 |
| JP | 9-64778 | 3/1997 |
| JP | 10-84406 | 3/1998 |
| JP | 10064648 | 3/1998 |
| JP | 2001-156898 | 6/2001 |
| JP | 2002-084355 | 3/2002 |
| JP | 2002-516503 | 6/2002 |
| JP | 2002-299931 | 10/2002 |
| JP | 2002-335180 | 11/2002 |
| WO | 99/04500 | 1/1999 |
| WO | 02/37599 | 5/2002 |

* cited by examiner

FIRST PREFERRED EMBODIMENT 102
102a
102b
103
103p
103q
104
105
106
107
108
109
110
111
112
112a
112h
113
114
115
901
902
910

FIRST MODIFIED PREFERRED EMBODIMENT
OF FIRST PREFERRED EMBODIMENT

SECOND MODIFIED PREFERRED EMBODIMENT OF FIRST PREFERRED EMBODIMENT

SECOND PREFERRED EMBODIMENT

MODIFIED PREFERRED EMBODIMENT OF SECOND PREFERRED EMBODIMENT

THIRD PREFERRED EMBODIMENT

FOURTH PREFERRED EMBODIMENT

MODIFIED PREFERRED EMBODIMENT OF FOURTH PREFERRED EMBODIMENT

FIFTH PREFERRED EMBODIMENT

MODIFIED PREFERRED EMBODIMENT OF FIFTH PREFERRED EMBODIMENT

PERSPECTIVE VIEW SEEN FROM INNER SIDE SURFACE OF FIRST IMPLEMENTAL EXAMPLE

INNER SIDE SURFACE

OUTER SIDE SURFACE

PERSPECTIVE VIEW SEEN FROM INNER SIDE SURFACE OF SECOND IMPLEMENTAL EXAMPLE

INNER SIDE SURFACE

OUTER SIDE SURFACE

OUTER SIDE SURFACE

INNER SIDE SURFACE

PERSPECTIVE VIEW SEEN FROM INNER SIDE SURFACE OF THIRD IMPLEMENTAL EXAMPLE

PERSPECTIVE VIEW SEEN FROM INNER SIDE SURFACE OF FOURTH IMPLEMENTAL EXAMPLE

INNER SIDE SURFACE

OUTER SIDE SURFACE

PERSPECTIVE VIEW SEEN FROM INNER SIDE SURFACE OF FIFTH IMPLEMENTAL EXAMPLE

INNER SIDE SURFACE

OUTER SIDE SURFACE

OUTER SIDE SURFACE
102b
102bp

INNER SIDE SURFACE
102b
115
102bm
933
115

PERSPECTIVE VIEW SEEN FROM INNER SIDE SURFACE OF SIXTH IMPLEMENTAL EXAMPLE
102b
102bp
102bm
115
933
115

OUTER SIDE SURFACE

INNER SIDE SURFACE

PERSPECTIVE VIEW SEEN FROM INNER SIDE SURFACE OF SEVENTH IMPLEMENTAL EXAMPLE

PERSPECTIVE VIEW SEEN FROM INNER SIDE SURFACE OF EIGHTH IMPLEMENTAL EXAMPLE

INNER SIDE SURFACE

OUTER SIDE SURFACE

PERSPECTIVE VIEW SEEN FROM INNER SIDE SURFACE OF NINTH IMPLEMENTAL EXAMPLE

INNER SIDE SURFACE

OUTER SIDE SURFACE

TENTH IMPLEMENTAL EXAMPLE

SIXTH PREFERRED EMBODIMENT

MODIFIED PREFERRED EMBODIMENT
OF SIXTH PREFERRED EMBODIMENT

SEVENTH PREFERRED EMBODIMENT

EIGHTH PREFERRED EMBODIMENT

MODIFIED PREFERRED EMBODIMENT OF EIGHTH PREFERRED EMBODIMENT

NINTH PREFERRED EMBODIMENT

TENTH PREFERRED EMBODIMENT

MODIFIED PREFERRED EMBODIMENT OF TENTH PREFERRED EMBODIMENT

ELEVENTH PREFERRED EMBODIMENT

TWELFTH PREFERRED EMBODIMENT

MODIFIED PREFERRED EMBODIMENT
OF TWELFTH PREFERRED EMBODIMENT

THIRTEENTH PREFERRED EMBODIMENT
106
105
102d
116
191
192
107

103dc
103d
108
192
191

106
105
109
107
102d
103d
108
103dc

MODIFIED PREFERRED EMBODIMENT OF THIRTEENTH PREFERRED EMBODIMENT

PORTABLE RADIO COMMUNICATION APPARATUS PROVIDED WITH A BOOM PORTION AND A PART OF HOUSING OPERATING AS AN ANTENNA

This is a divisional application of Ser. No. 10/771,449, filed Feb. 5, 2004, now U.S. Pat. No. 7,245,950.

BACKGROUND OF THE INVENTION

1. Field of the Invention

The present invention relates to a portable radio communication apparatus including a housing, and in particular, relates to a portable radio communication apparatus provided with a boom portion and a part of housing operating as an antenna.

2. Description of the Related Art

Recently, portable radio communication apparatuses such as cellular phones have been increasingly made smaller in size and thinner. In addition, the portable radio communication apparatuses have been not only used as conventional cellular phones but also transformed to data terminal apparatuses for transmitting and receiving E-mails and for viewing web pages through WWW (World Wide Web). Due to this, liquid crystal displays have been made larger in size. In these circumstances, folding cellular phone terminals, which are considered to be suited to make the portable radio communication apparatuses smaller in size and make the liquid crystal displays larger in size, have been spread as disclosed in the following publications:

(a) Japanese Patent Laid-open Publication No. 2001-156898;

(b) Japanese Patent Laid-open Publication No. 2002-084355;

(c) Japanese Patent Laid-open Publication No. 2002-335180;

(d) Japanese Patent Laid-open Publication No. 2002-299931; and (e) Japanese Patent Laid-open Publication No. 2002-516503.

However, since an external antenna protrudes from the upper housing, a user often feels uncomfortable as follows. When the user takes out the portable radio communication apparatus from his pocket, the external antenna is disadvantageously got stuck in his pocket. When the user sits on the chair with the communication apparatus put in his trouser pocket, the external antenna is uncomfortably and strongly pressed onto the user. On the other hand, when the communication apparatus is suspended from the user's neck without being put into his pocket, the center of gravity of the external antenna disadvantageously deviates from the center of the communication apparatus, and the external antenna disadvantageously becomes unbalanced because of its asymmetric structure in which the external antenna is located on either the right or left end portion of the portable radio communication apparatus.

SUMMARY OF THE INVENTION

It is an object of the present invention to provide a portable radio communication apparatus, which can solve the above-mentioned disadvantages, and which can be constituted so that even if the portable radio communication apparatus is put into his pocket of a user, the user does not feel uncomfortable.

It is another object of the present invention to provide a portable radio communication apparatus, which can solve the above-mentioned disadvantages, and which can be constituted so that if the same apparatus is suspended from the user's neck, the same apparatus can be suspended in a well-balanced manner while maintaining good antenna characteristics.

According to the aspect of the present invention, there is provided a portable radio communication apparatus including a housing. The portable radio communication apparatus includes at least one part of the housing, which is formed as a housing electrical conductor portion by an electrically conductive material. The housing electrical conductor portion is connected with a radio communication circuit of the portable radio communication apparatus so as to operate as at least one part of an antenna of the radio communication circuit. A boom portion is further provided to be coupled with the housing at least at two positions so as to provide at least one penetrating hole between the housing and the boom portion.

In the above-mentioned portable radio communication apparatus, the antenna is preferably an unbalanced type antenna.

In the above-mentioned portable radio communication apparatus, the portable radio communication apparatus is preferably a straight type portable radio communication apparatus. Otherwise, the portable radio communication apparatus is preferably a slide type portable radio communication apparatus in which an upper housing and a lower housing are slidable through a sliding mechanism, and at least one part of at least one of the upper housing and the lower housing is formed as a housing electrical conductor portion by an electrically conductive material. Alternatively, the portable radio communication apparatus is preferably a folding portable radio communication apparatus in which an upper housing and a lower housing are foldable through a hinge portion, and at least one part of at least one of the upper housing and the lower housing is formed as a housing electrical conductor portion by an electrically conductive material.

In the above-mentioned portable radio communication apparatus, the housing electrical conductor portion is preferably made by forming an electrical conductor layer on a dielectric housing which is at least one part of the housing. Further, the electrical conductor layer is preferably made by forming an electrical conductor pattern on the dielectric housing.

In the above-mentioned portable radio communication apparatus, the electrical conductor layer preferably includes electrical conductor patterns different from each other on both surfaces of the dielectric housing, respectively, so that the antenna operates in a plurality of frequency bands.

In the above-mentioned portable radio communication apparatus, the electrical conductor layer preferably includes a plurality of electrical conductor portions having electric lengths different from each other, respectively, so that the antenna operates in a plurality of frequency bands.

The above-mentioned portable radio communication apparatus preferably further includes one of a slot and a slit which are formed in the electrical conductor layer.

In the above-mentioned portable radio communication apparatus, the upper housing preferably includes an upper first housing portion and an upper second housing portion, and at least one of the upper first housing portion and the upper second housing portion is formed as a housing electrical conductor portion by an electrically conductive material so that the housing electrical conductor portion operates as at least one part of the antenna of the portable radio communication apparatus.

In the above-mentioned portable radio communication apparatus, the lower housing preferably includes a lower first housing portion and a lower second housing portion, and at least one of the lower first housing portion and the lower second housing portion is formed as a housing electrical conductor portion by an electrically conductive material so that the housing electrical conductor portion operates as at least one part of the antenna of the portable radio communication apparatus.

In the above-mentioned portable radio communication apparatus, at least one part of the hinge portion preferably is formed as a hinge electrical conductor portion by an electrically conductive material, and the hinge electrical conductor portion is connected with the radio communication circuit of the portable radio communication apparatus so as to operate as at least one part of the antenna of the radio communication circuit.

In the above-mentioned portable radio communication apparatus, at least one part of the hinge portion is preferably formed as a hinge electrical conductor portion by an electrically conductive material so that the hinge electrical conductor portion operates as a parasitic element of the antenna of the radio communication circuit.

In the above-mentioned portable radio communication apparatus, the hinge portion is preferably made to be rotatable in at least biaxial directions.

The above-mentioned portable radio communication apparatus preferably further includes an electrically insulating layer formed on the hinge portion.

The above-mentioned portable radio communication apparatus preferably further includes a plurality of reactance elements having a plurality of reactance values different from each other, respectively, and a switching device for selectively switching over the plurality of reactance elements so as to connect selected one of the reactance elements with the housing electrical conductor portion.

The above-mentioned portable radio communication apparatus preferably includes a plurality of reactance elements having a plurality of reactance values different from each other, respectively, and a switching device for selectively switching over the plurality of reactance elements so as to connect selected one of the reactance elements with the housing electrical conductor portion through the hinge electrical conductor portion.

In the above-mentioned portable radio communication apparatus, the switching device preferably selectively switches over the plurality of reactance elements in accordance with whether the portable radio communication apparatus is in either one of an open state and a closed state thereof.

In the above-mentioned portable radio communication apparatus, the switching device preferably selectively switches over the plurality of reactance elements in accordance with a plurality of operating frequency bands of the portable radio communication apparatus.

In the above-mentioned portable radio communication apparatus, the switching device preferably selectively switches over the plurality of reactance elements in accordance with either one of transmission and receiving of the portable radio communication apparatus.

In the above-mentioned portable radio communication apparatus, the housing electrical conductor portion is preferably made of one of a dielectric material and a magnetic material, and the housing electrical conductor portion is connected with the radio communication circuit through an electrical insulator having a predetermined capacitance so that a radio signal from the radio communication circuit is fed through the capacitance of the electrical insulator to the housing electrical conductor portion.

The above-mentioned portable radio communication apparatus preferably further includes a thin-film-shaped electrically insulating sheet formed on the upper housing having the housing electrical conductor portion, and the thin-film-shaped electrically insulating sheet is made of one of a dielectric material and a magnetic material.

In the above-mentioned portable radio communication apparatus, the boom portion is preferably coupled with the housing so as to be laterally symmetric relative to a width direction of the portable radio communication apparatus.

In the above-mentioned portable radio communication apparatus, at least one part of the boom portion is preferably made of an electrically conductive material. Alternatively, at least one part of the boom portion is preferably made of a flexible dielectric material.

The above-mentioned portable radio communication apparatus preferably further includes at least one antenna element provided in the boom portion and connected with the radio communication circuit. In this case, a further switching device is further provided which selectively switches over between at least one antenna element connected with the radio communication circuit and the antenna including the housing conductor portion.

The above-mentioned portable radio communication apparatus preferably further includes a plurality of antenna elements provided in the boom portion. The plurality of antenna elements is connected with the radio communication circuit, and has electric lengths different from each other, respectively.

The above-mentioned portable radio communication apparatus preferably further includes an external antenna provided in the housing. In this case, a still further switching device is further provided which selectively switches over between the external antenna and the antenna including the housing conductor portion.

The above-mentioned portable radio communication apparatus preferably further includes a built-in antenna provided in the housing. In this case, a still further switching device is further provided which selectively switches over between the built-in antenna and the antenna including the housing conductor portion.

According to the portable radio communication apparatus of the present invention, the boom portion connected with the housing at a position where the boom portion is substantially, laterally symmetric relative to the width direction of the portable radio communication apparatus. Further, there is further provided a combination of the first antenna element provided in the boom portion, and the second antenna which includes, as the constituent element, the housing whose one part is made of an electrically conductive material. It is thereby possible to transmit and receive radio waves without using any conventional external antenna. Therefore, it is possible to solve such a conventional disadvantage that the external antenna is sometimes got stuck in his pocket when the portable radio communication apparatus is taken out from his pocket. In addition, since the penetrating hole is formed in the space surrounded by the boom portion and the housing, it is possible to suspend the portable radio communication apparatus from the neck of the user with the strap attached to the boom portion. In this case, since it is unnecessary to use any conventional external antenna, the portable radio communication apparatus can be designed to be laterally symmetric, and the portable radio communication apparatus can be easily well balanced laterally when the apparatus is suspended from his neck.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENTS

Figures 1A, 1B, 1C:
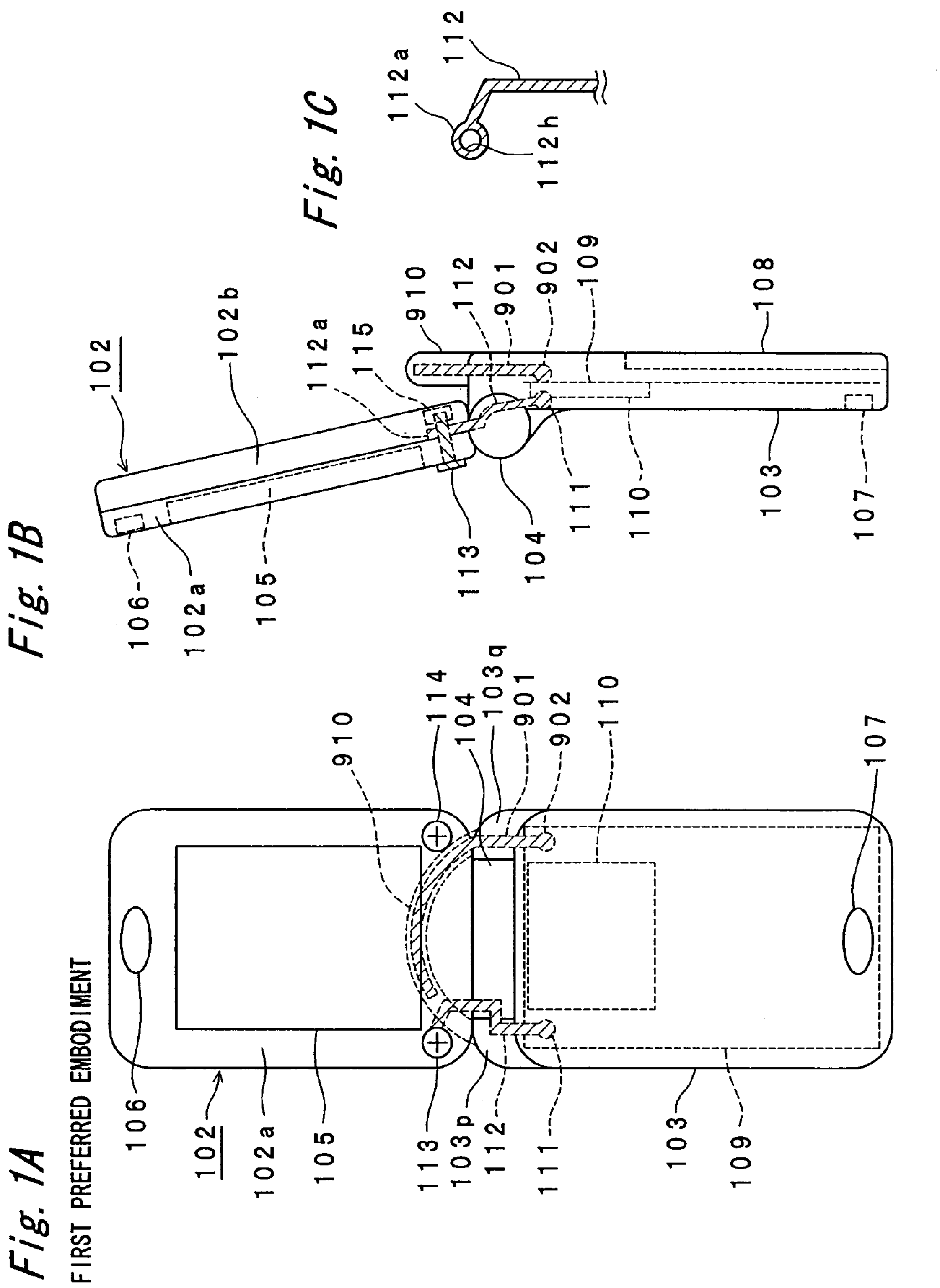
FIG. 1A is a plan view of a folding portable radio communication apparatus in an open state thereof according to a first preferred embodiment of the present invention.
FIG. 1B is a side view of the portable radio communication apparatus shown in FIG. 1A.
FIG. 1C is a plan view of an antenna element 112 employed in the portable radio communication apparatus shown in FIGS. 1A and 1B.

The preferred embodiments of the present invention will be described hereinafter with reference to the drawings. In the drawings, similar components are denoted by the same reference symbols, respectively.

First Preferred Embodiment

FIG. 1A is a plan view of a folding portable radio communication apparatus in an open state thereof according to a first preferred embodiment of the present invention. FIG. 1B is a side view of the portable radio communication apparatus shown in FIG. 1A. FIG. 1C is a plan view of an antenna element 112 for use in the portable radio communication apparatus shown in FIGS. 1A and 1B.

Referring to FIGS. 1A and 1B, the portable radio communication apparatus according to the first preferred embodiment includes an upper housing 102 and a lower housing 103, where the housings 102 and 103 are connected with each other through a circular cylindrical uniaxial hinge portion 104, so as to be foldable through the circular cylindrical uniaxial hinge portion 104. The upper housing 102 includes an upper first housing portion 102*a* arranged on the inside thereof, and an upper second housing portion 102*b* arranged on the outside thereof. These upper first and second housing portions 102*a* and 102*b* are bonded and coupled together. A surface of the upper first housing portion 102*a* that is opposed to the inside of the same apparatus will be referred to as an inner side surface, and a surface of the upper second housing portion 102*b* that is opposed to the outside of the same apparatus will be referred to as an outer side surface, hereinafter. Further, the hinge portion 104 is formed integrally, for example, with the upper first housing portion 102*a*, is fitted into the central portion of an upper end (located between an upper left end 103*p* and an upper right end 103*q*) of the lower housing 103, and is penetrated through a circular cylindrical hollow of the circular cylindrical hinge portion 104. This leads to that the upper housing 102 and the lower housing 103 are rotatable and foldable about the hinge portion 104 by a circular cylindrical shaft (not shown) extending into the upper left end 103*p* and the upper right end 103*q* of the lower housing 103. The two housing portions 102*a* and 102*b* are penetrated into the upper first housing portion 102*a* from the inner side surface to the outer side surface and screwed by respective screws 113 and 114 on the left and right corner portions of the lower ends to a screw reception portion 115 of the upper second housing portion 102*b*.

At least one part of the upper first housing portion 102*a* is made of an electrically conductive material such as magnesium or zinc, whereas the upper second housing portion 102*b* is made of an electrically insulating material such as a resin material. As will be described later in detail, all of the upper first housing portion 102*b* may be made of an electrically conductive material. Alternatively, the upper first housing portion 102*b* may be made of an electrically insulating material such as a resin material with an electrical conductor layer made of an electrically conductive material formed on its surface. The portion of the upper first housing portion 102*a* that is formed by at least the electrically conductive material will be referred to as a conductor portion hereinafter.

Figure 2:
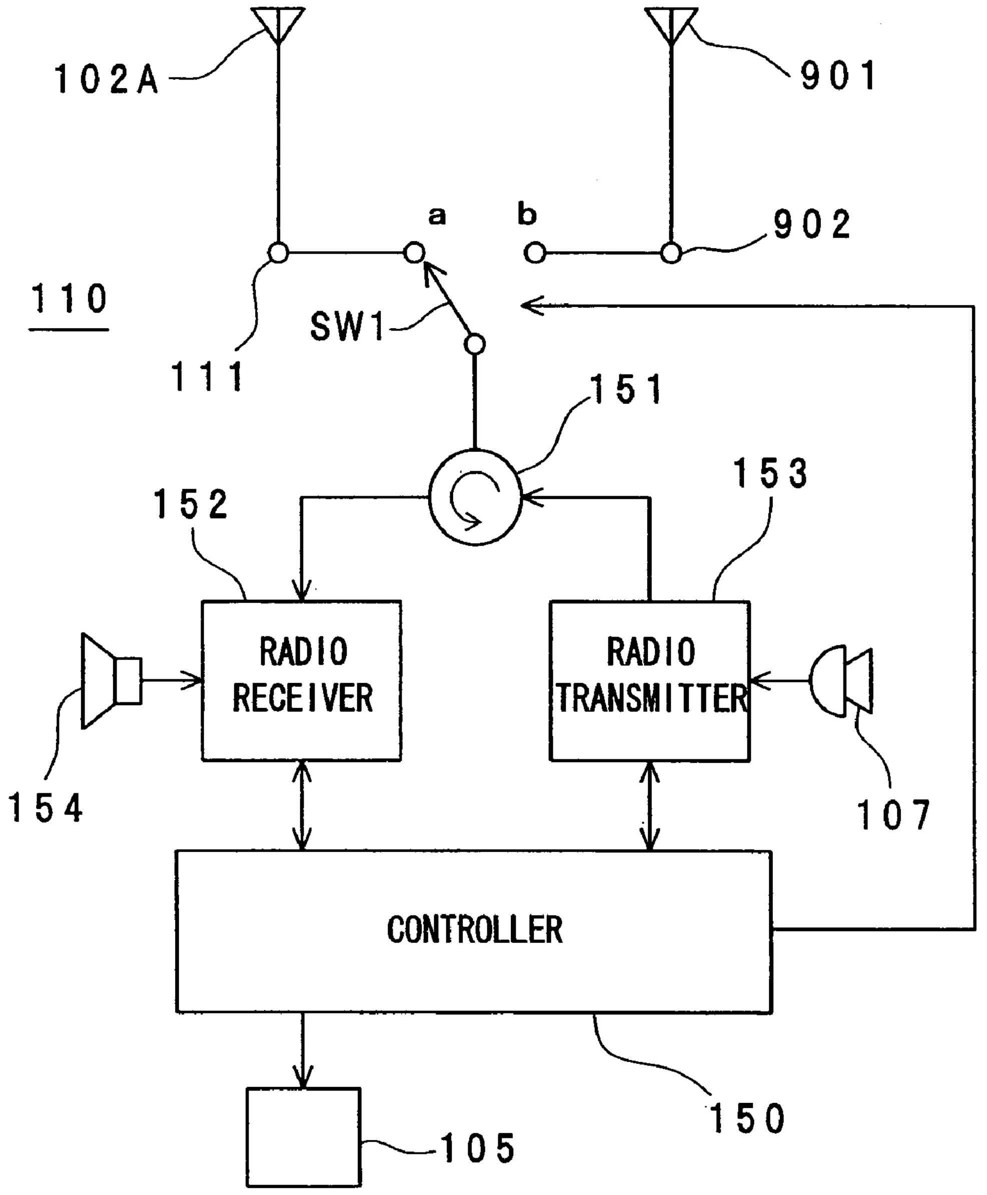
FIG. 2 is a circuit diagram of antenna elements 102A and 901 and a radio communication circuit 110 connected with antenna elements 102A and 901 of the portable radio communication apparatus shown in FIG. 1A.

Further, a liquid crystal display 105 is located substantially in the central portion of the inner side surface of the upper first housing portion 102*a* and a sound hole portion 106 is arranged above the liquid crystal display 105 at an upper end portion of the inner side surface of the upper first housing portion 102*a*. A loudspeaker 154 of FIG. 2, that generates a voice of a party on the other end of the communication line during a telephone conversation, is arranged immediately under the sound hole portion 106 so that a user of the portable radio communication apparatus can listen to the voice generated by the loudspeaker 154 through the sound hole portion 106. Further, a microphone 107 is arranged on a surface of the lower housing 103 that is opposed to the inside (whose surface will be referred to as an inner side surface hereinafter) in the vicinity of a lower end on an opposite side to the hinge portion 104, and a chargeable battery 108 is arranged on a surface of the opposite side to the microphone 107 on the lower housing 103 (whose surface will be referred to as an outer side surface hereinafter). A printed wiring board 109 is arranged on the inside of the lower housing 103 and substantially in the central portion of the lower housing 103 in the thickness direction thereof. As shown in FIG. 2, a radio communication circuit 110 that includes a radio receiver 152 and a radio transmitter 153 is formed on the printed wiring board 109.

A connection point 111 that serves as a feeding point of the radio communication circuit 110 is connected with a screw 113 of the upper housing 102 through an antenna element 112, and the screw 113 is electrically connected with the conductor portion of the upper first housing portion 102*a*. The antenna element 112 is provided so as to extend from the radio communication circuit 110 of the lower housing 103 to the screw 113 through an inside of an upper right end of the lower housing 103, an inside of the hinge portion 104, and an inside of the upper second housing portion 102*b*.

As shown in FIG. 1C, an electrical conductor ring 112*a* having a circular hole 112*h* is provided on one end of the antenna element 112. The screw 113 is penetrated through the circular hole 112*h*, and contacted and electrically connected with the conductor ring 112*a*. Therefore, the connection point 111 of the radio communication circuit 110 is electrically connected with the conductor portion of the upper first housing portion 102*a* through the antenna element 112 and the screw 113, and then, the antenna element 112 and the conductor portion of the upper first housing portion 102*a* operate as a first antenna element 102A of FIG. 2 of the portable radio communication apparatus.

A boom portion 910, which is made of a resin material (preferably a flexible resin material) which is curved and generally circular cylindrical, is provided so as to be connected with left and right ends on an upper end surface of the lower housing 103. Namely, both ends of the boom portion 910 are connected with the left and right ends of the upper end surface of the lower housing 103, respectively, so as to be substantially bilaterally symmetric in the width direction or the horizontal direction of the portable radio communication apparatus. In this case, in a space surrounded by the boom portion 910 and the lower housing 103, a penetrating hole (or an air space or gap) 910*h* is formed. In addition, an antenna element 901 that operates as a second antenna element of the portable radio communication apparatus and that has a length such as a quarter of wavelength or the like is included in the boom portion 910. Further, the antenna element 901 is electrically connected with a connection point 902 that serves as a feeding point of the radio communication circuit 110 from an inside of the boom portion 910 through an inside of the lower housing 103.

FIG. 2 is a circuit diagram of the antenna elements 102A and 901 and the radio communication circuit 110 connected with the antenna elements 102A and 901 of the portable radio communication apparatus shown in FIG. 1A.

Referring to FIG. 2, the antenna element 102A is connected with a first terminal of a circulator 151 through the connection point 111 and a contact "a" of a switch SW1, and further, the antenna element 901 is connected thereto through the connection point 902 and a contact "b" of the switch SW1. A second terminal of the circulator 151 is connected with the radio receiver 152 that includes the loudspeaker 154 and a third terminal thereof is connected with the radio transmitter 153 that includes the microphone 107. The operations of the radio receiver 152, the radio transmitter 153, and the switch SW1 are controlled by a controller 150.

A radio signal received by the antenna element 102A or 901 is inputted to the radio receiver 152 through the switch SW1 and the circulator 151. The radio receiver 152 subjects the inputted radio signal to low noise amplification, frequency transform, a demodulation processing, thereby extracting a voice and character data and image data contained in the radio signal from the radio signal, and outputting the extracted data to the loudspeaker 154 and also to the liquid crystal display 105 to display the extracted data on the display 105. On the other hand, voice and character data and image data to be transmitted are inputted to the radio transmitter 153 from the microphone 107 or the controller 150. The radio transmitter 153 subjects a carrier signal to modulation, frequency transform, power amplification, and the like according to the inputted voice and character data and image data to thereby generate a radio signal, and outputs the radio signal to the antenna element 102A or 901 through the circulator 151 and the switch SW1 to project the radio signal.

The controller 150 compares, for example, a signal level of the radio signal received at the antenna element 102A with that of the radio signal received at the antenna element 901 and selectively switches over to the antenna element that receives the radio signal at the higher signal level using the switch SW1, thereby executing a reception diversity processing. Further, the controller selects one of the antenna elements based on results of the reception diversity processing to transmit the radio signal from the selected antenna element. Alternatively, by transmitting the radio signal using the both antenna elements 102A and 901 simultaneously and controlling the amplitude and the phase of the radio signal fed to the two antenna elements 102A and 901, the controller 150 may execute a transmission diversity processing.

As mentioned above, according to the first preferred embodiment, the conductor portion of the upper first housing portion 102*a* that is a part of the upper housing 102 is allowed to operate as a part of the antenna element 102A. Then, this leads to that the number of parts can be decreased while maintaining good antenna characteristics, and the manufacturing cost can be reduced. In addition, by forming the conductor portion of the upper first housing portion 102*a* using the electrically conductive material having an excellent mechanical strength such as magnesium or the like, it is possible to increase the strength of the portable radio communication apparatus against the impact such as that upon the user's dropping the same apparatus. Further, since no space occupied by an antenna apparatus is required, the portable radio communication apparatus can be made thinner and lighter in weight than the conventional apparatus. Besides, since an area of the antenna elements can be made larger than a conventional external antenna such as a helical antenna, the maximum value of a current density can be reduced and an SAR (Specific Absorption Rate) can be suppressed to be lower.

The SAR is a power absorbed by an organic structure having a unit mass when an organism such as a human is put in an electromagnetic field. The SAR is classified to a whole-body average SAR and a local SAR. The radiofrequency safety guideline specifies, for an ordinary environment (for ordinary people), that an arbitrary six-minute average of the whole-body average SAR is 0.08 W/kg or lower and the local SAR (six-minute average) for an arbitrary structure of 10 g is 2 W/kg or lower (3 W/kg for the limbs).

In the present preferred embodiment, the conductor portion of the upper first housing portion 102*a* is electrically connected with the antenna element 112 by the screw 113. However, the present invention is not limited to this, and they may be electrically connected with each other using the other method such as a soldering method, a crimping terminal connection method or a mechanical forced contact method without using the screw 113.

In the present preferred embodiment, the antenna element 102A is constituted by using the conductor portion of the upper first housing portion 102*a* and the antenna element 112. However, the present invention is not limited to this, and the antenna element 102A may be made of a feeding line such as a coaxial cable so as to feed the radio signal to the antenna element 102A through the feeding line.

In the present preferred embodiment, the portable radio communication apparatus includes the two antenna elements 102A and 901. However, the present invention is not limited to this, and the portable radio communication apparatus may not include the boom portion 910 and the antenna element 901.

In the present preferred embodiment, the circular cylindrical hinge portion 104 is employed. However, the present invention is not limited to this, and a biaxial hinge portion 704 of FIG. 15A may be employed.

In the present preferred embodiment, the boom portion 910 is connected with the lower housing 103. However, the present invention is not limited to this, and the boom portion 910 may be connected with the upper housing 102.

Figure 3A:
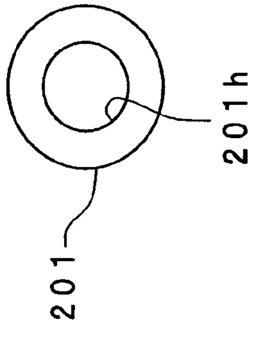
FIG. 3A is a plan view of an electrically insulating ring 201 employed in a folding portable radio communication apparatus according to a first modified preferred embodiment of the first preferred embodiment of the present invention.
Figure 3B:
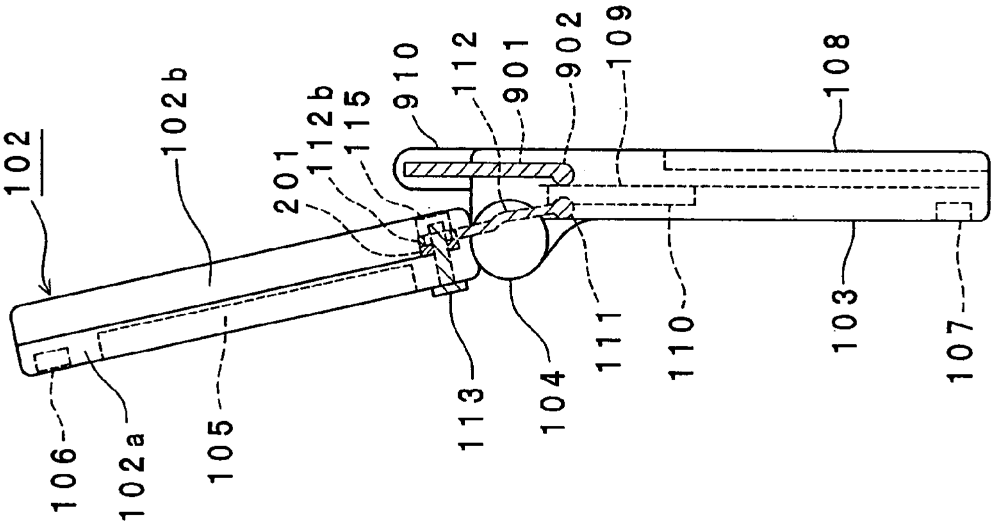
FIG. 3B is a side view of the portable radio communication apparatus that includes the insulating ring 201 shown in FIG. 3A.
Figure 4:
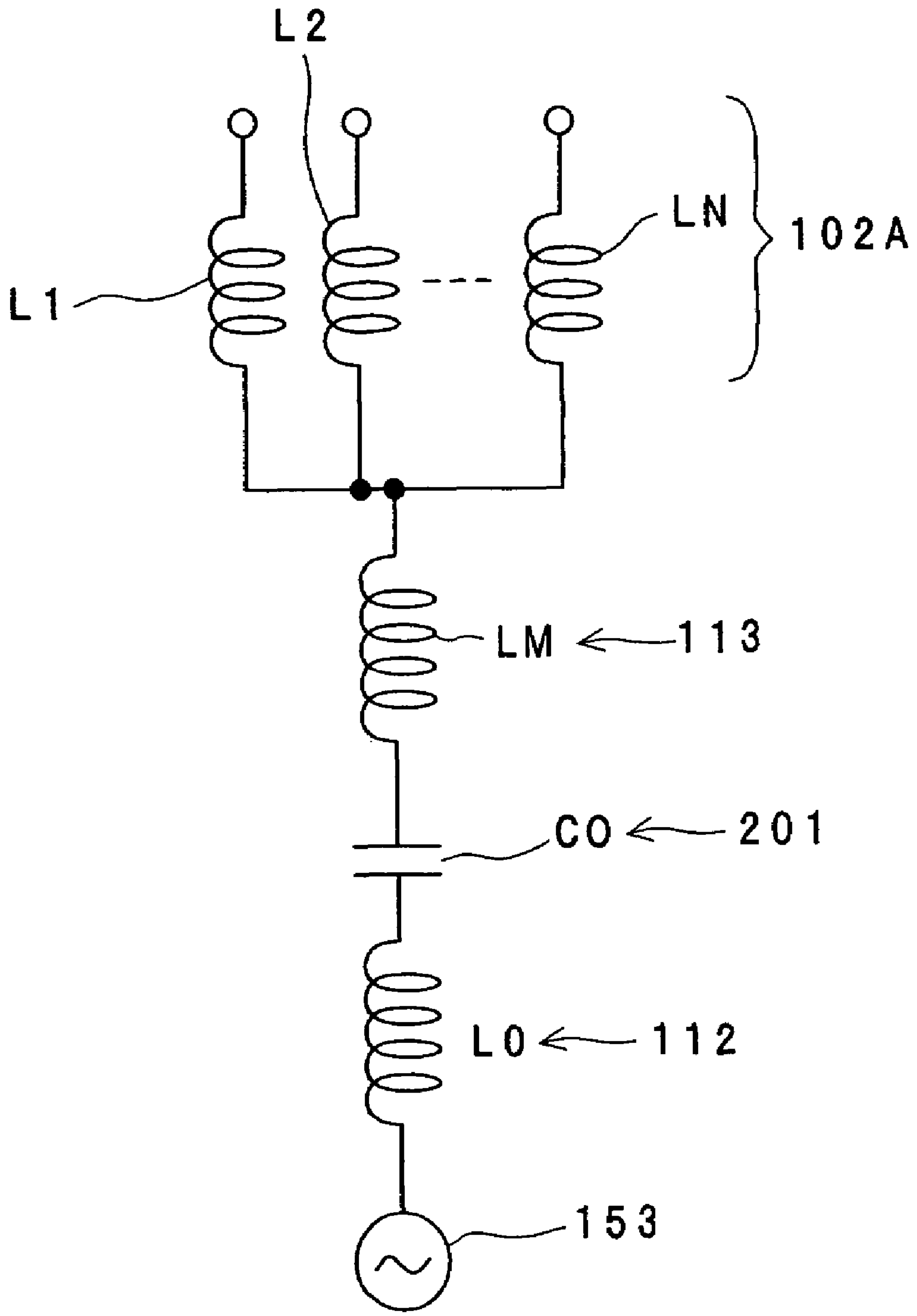
FIG. 4 is a circuit diagram showing an equivalent circuit of an antenna apparatus of the folding portable radio communication apparatus shown in FIGS. 3A and 3B.

FIG. 3A is a plan view of an electrically insulating ring 201 employed in a folding portable radio communication apparatus according to a first modified preferred embodiment of the first preferred embodiment according to the present invention. FIG. 3B is a side view of the portable radio communication apparatus that includes the insulating ring 201 shown in FIG. 3A. FIG. 4 is a circuit diagram showing an equivalent circuit of the antenna apparatus of the folding portable radio communication apparatus shown in FIGS. 3A and 3B.

In the portable radio communication apparatus shown in FIGS. 1A and 1B, the antenna element 112 is screwed with the upper first housing portion 102*a* through the screw 113. However, the present invention is not limited to this. For example, the electrically insulating ring 201 made of a dielectric material and having a circular hole 201*h* shown in FIG. 3A may be inserted between the upper first housing portion 102*a* and an electrical conductor ring 112*b* (having a larger circular hole than the conductor ring 112*a*) of the antenna element 112 as shown in FIG. 3B, and this leads to that not only the screwing effect but also a capacitive feeding effect can be attained. As shown in FIG. 3B, the screw 113 is not mechanically contacted with the conductor ring 112*b* of the antenna element 112, and a capacitance of the insulating ring 201 is formed between the screw 113 and the antenna element 112.

Therefore, as shown in the equivalent circuit of FIG. 4, the antenna element 102A is constituted, for example, so that a plurality of inductances L1, L2, . . . , and LN is connected with each other by a connection point 102Ac on one end of each inductance. The connection point 102Ac is connected with the radio transmitter 153 through an inductance LM of the screw 113, the capacitance C0 of the insulating ring 201, and an inductance L0 of the antenna element 112. Since the antenna element 102A is constituted so that the plural inductances L1, L2, . . . , and LN are connected with each other at the connection point 102Ac on one end of each inductance, the portable radio communication apparatus can provide wide band characteristics. In addition, there can be obtained the following two resonance frequencies: (a) a first resonance frequency obtained when the capacitance C0 of the insulating ring 201 is inserted; and (b) a second resonance frequency, which is higher than the first resonance frequency, and which is obtained when the capacitance C0 of the insulating ring 201 is not inserted. Then, this leads to that the portable radio communication apparatus can provide wide band characteristics and operate in the two bands.

Figure 5A:
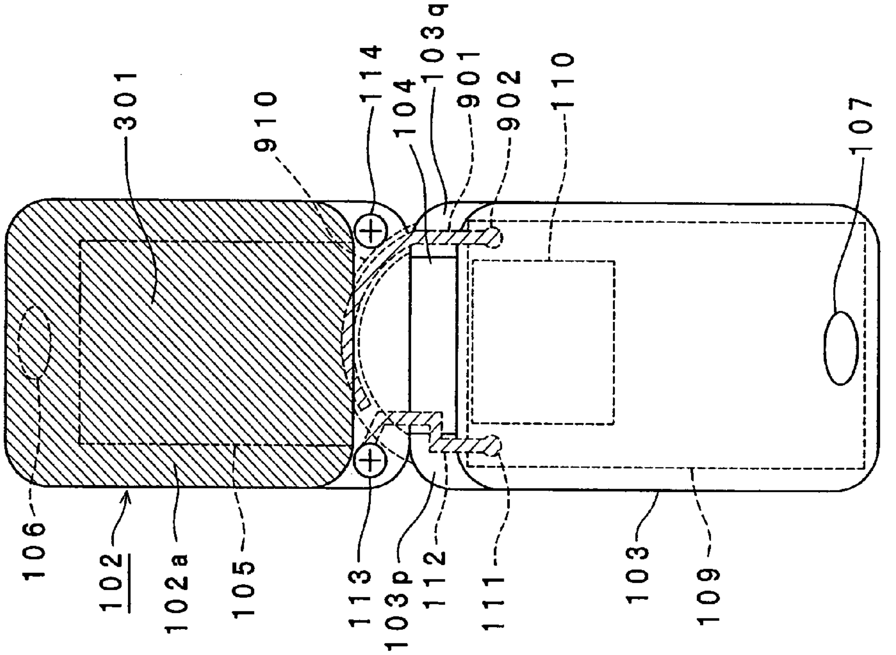
FIG. 5A is a plan view of a folding portable radio communication apparatus in an open state thereof according to a second modified preferred embodiment of the first embodiment of the present invention.
Figure 5B:
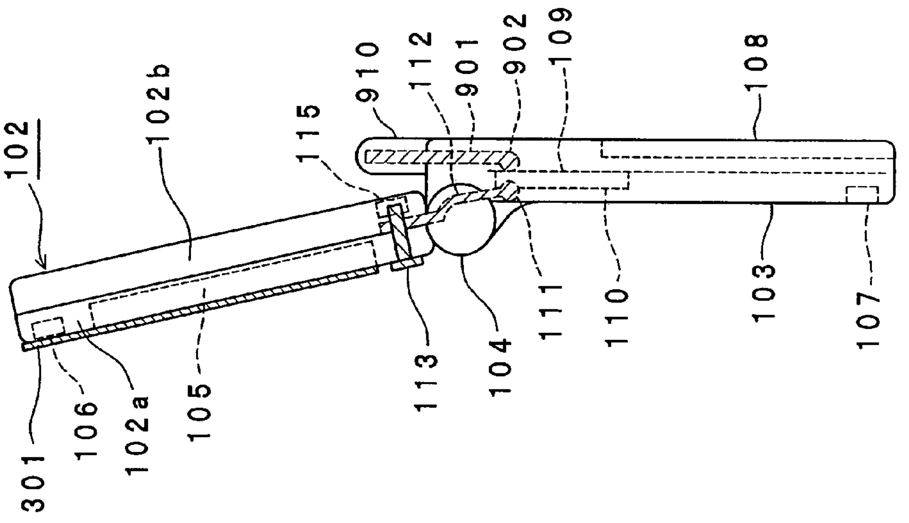
FIG. 5B is a side view of the portable radio communication apparatus shown in FIG. 5A.

FIG. 5A is a plan view of a folding portable radio communication apparatus in an open state thereof according to a second modified preferred embodiment of the first preferred embodiment of the present invention. FIG. 5B is a side view of the portable radio communication apparatus shown in FIG. 5A.

In the portable radio communication apparatus according to the first preferred embodiment, a thin-film-shaped electrically insulating seal 301 made of a dielectric material or a magnetic material such as acryl and having a thickness such as about 0.2 to 0.3 mm may be formed on an entire surface or a part of the inside of the upper first housing portion 102*a*, for example, by adhesion, as shown in FIGS. 5A and 5B. This can prevent a part of a human body from directly contacting with the inner side surface of the upper first housing portion 102*a* that operates as the antenna element 102A, and can lower the decrease in the antenna gain caused by the human body during a telephone conversation. In addition, the distance between the antenna element 102A and the human body can be set larger, and the SAR can be kept lower. Alternatively, a transparent panel or a coating member made of a dielectric material such as a resin material may be employed instead of the insulating seal 301.

Figures 6A, 6B:
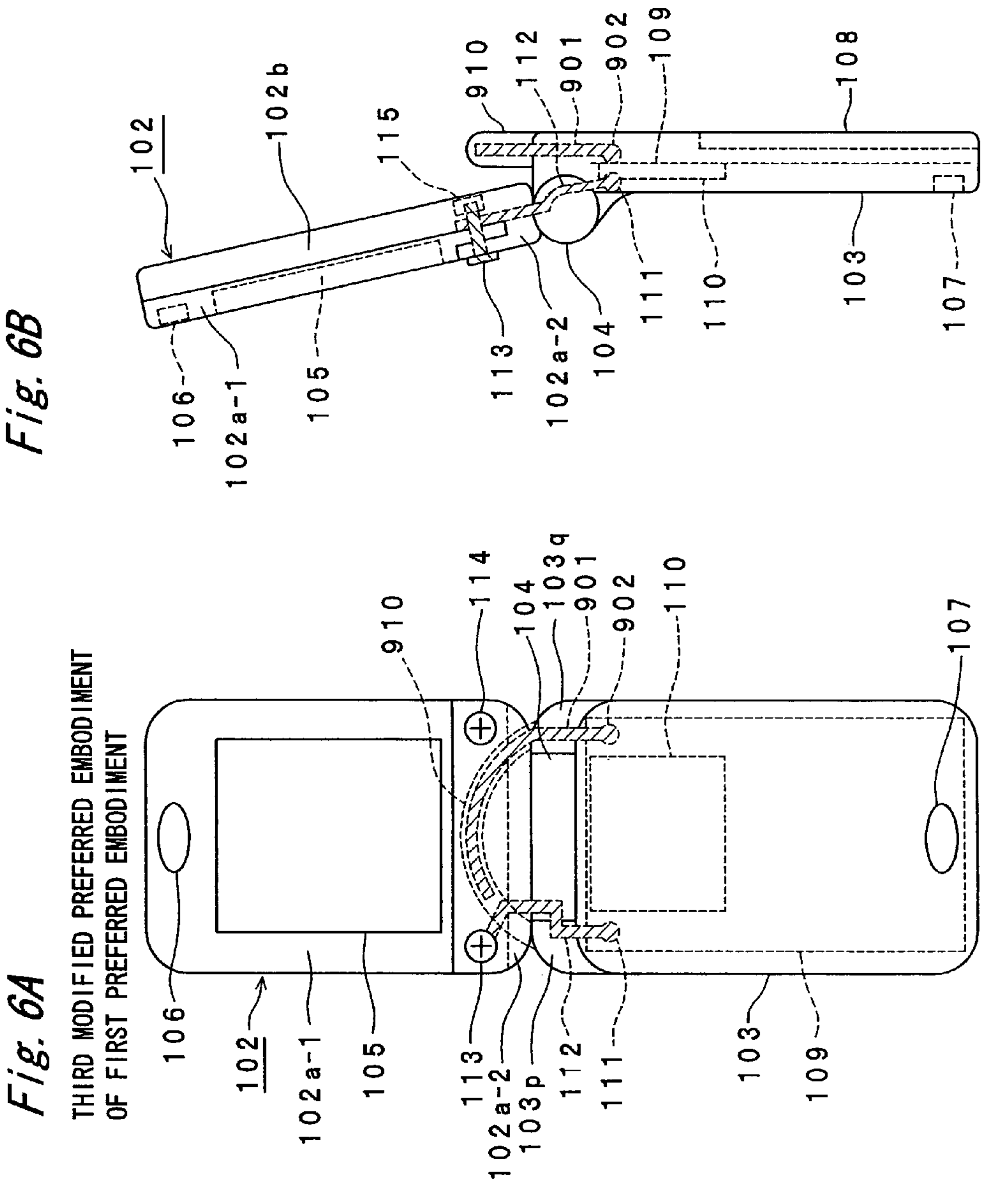
FIG. 6A is a plan view of a folding portable radio communication apparatus in an open state thereof according to a third modified preferred embodiment of the first preferred embodiment of the present invention.
FIG. 6B is a side view of the portable radio communication apparatus shown in FIG. 6A.

FIG. 6A is a plan view of a folding portable radio communication apparatus in an open state thereof according to a third modified preferred embodiment of the first preferred embodiment of the present invention. FIG. 6B is a side view of the portable radio communication apparatus shown in FIG. 6A.

The portable radio communication apparatus according to the third modified preferred embodiment of the first preferred embodiment is different from that according to the first preferred embodiment shown in FIGS. 1A and 1B, in that the upper first housing portion 102*a* is divided to a first part 102*a*-1 and a second part 102*a*-2. In this case, the first and second parts 102*a*-1 and 102*a*-2 have half the thickness of the upper first housing portion 102*a*, respectively, and are fitted and bonded together in the vicinity of the lower end of the upper first housing portion 102*a* at a position where the screw 113 is arranged. The screw 113 is screwed with the screw reception portion 115 from the inner side surface of the upper housing 102 through the second part 102*a*-2 and the first part 102*a*-1 of the upper first housing portion 102*a* and the upper second housing portion 102*b*.

Second Preferred Embodiment

Figure 7B:
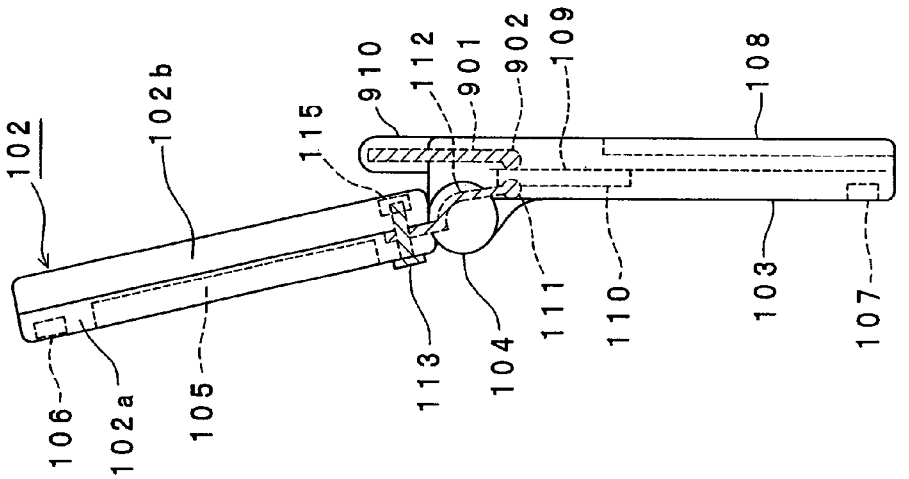
FIG. 7B is a side view of the portable radio communication apparatus shown in FIG. 7A.
Figure 7A:
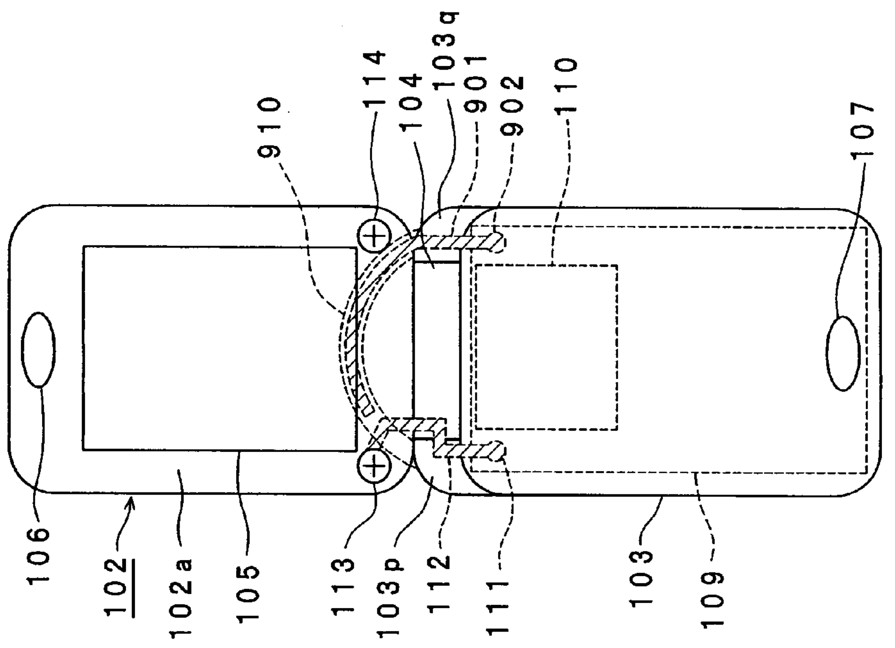
FIG. 7A is a plan view of a folding portable radio communication apparatus in an open state thereof according to a second preferred embodiment of the present invention.

FIG. 7A is a plan view of a folding portable radio communication apparatus in an open state thereof according to a second preferred embodiment of the present invention. FIG. 7B is a side view of the portable radio communication apparatus shown in FIG. 7A. The portable radio communication apparatus according to the second preferred embodiment is different from that according to the first preferred embodiment in the following points.

(a) At least one part of the upper second housing portion 102*b* is made of an electrically conductive material such as magnesium or zinc, and the upper first housing portion 102*a* is made of an electrically insulating material such as a resin material or the like. All of the upper second housing portion 102*b* may be made of an electrically conductive material. Alternatively, the upper second housing portion 102*b* may be made of an electrically insulating material such as a resin material with an electrical conductor layer made of an electrically conductive material formed on its surface. The portion of the upper second housing portion 102*b* that is formed by at least the electrically conductive material will be referred to as a conductor portion hereinafter.

(b) The connection point 111 that serves as a feeding point of the radio communication circuit 110 is connected with the screw 113 of the upper housing 102 through the antenna element 122, and further, the screw 113 is electrically connected with the upper second housing portion 102*b* of the housing 102. Therefore, the connection point 111 of the radio communication circuit 110 is electrically connected with the conductor portion of the upper second housing portion 102*b* through the antenna element 112 and the screw 113, and then, the antenna element 112 and the conductor portion of the upper second housing portion 102*b* operate as the first antenna element 102A of the portable radio communication apparatus.

The portable radio communication apparatus constituted as mentioned above has the same functions and advantageous effects as those of the portable radio communication apparatus according to the first preferred embodiment. In addition, since the distance between the antenna element 102A and the human body can be set larger during a telephone conversation, the portable radio communication apparatus can advantageously suppress the decrease of the antenna gain caused by the electromagnetic influence of the human body. In addition, since the upper first housing portion 102*a* includes the liquid crystal display 105, it is necessary to secure a high strength of the upper first housing portion 102*a* against an impact upon the user's dropping the same apparatus. However, it is unnecessary to secure a high strength of the upper second housing portion 102*b*, thereby increasing the degree of freedom for designing the same apparatus.

In the present preferred embodiment, by inserting the insulating ring 201 shown in FIG. 3A between the antenna element 112 and the upper second housing portion 102*b*, the capacitive feeding to the antenna element 102A may be performed.

In the present preferred embodiment, the conductor portion of the upper second housing portion 102*b* is electrically connected with the antenna element 112 by the screw 113. However, the present invention is not limited to this, and they may be electrically connected with each other using the other method such as the soldering method, the crimping terminal connection method or the mechanical forced contact method without using the screw 113.

Figure 8B:
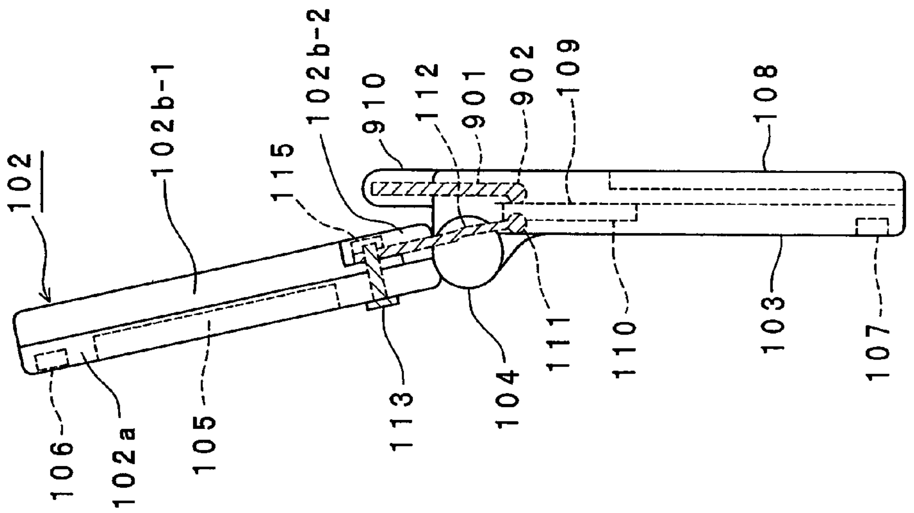
FIG. 8B is a side view of the portable radio communication apparatus shown in FIG. 8A.
Figure 8A:
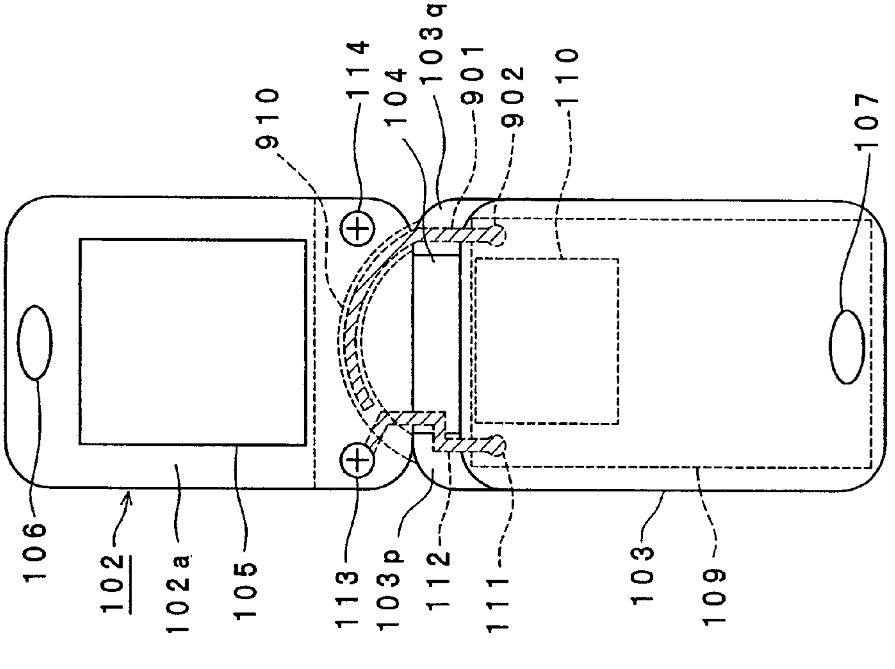
FIG. 8A is a plan view of a folding portable radio communication apparatus in an open state thereof according to a modified preferred embodiment of the second preferred embodiment of the present invention.

FIG. 8A is a plan view of a folding portable radio communication apparatus in an open state thereof according to a modified preferred embodiment of the second preferred embodiment of the present invention. FIG. 8B is a side view of the portable radio communication apparatus shown in FIG. 8A.

The portable radio communication apparatus according to the modified preferred embodiment of the second preferred embodiment is different from that according to the second preferred embodiment shown in FIGS. 7A and 7B, in that the upper second housing portion 102*b* is divided to a first part 102*b*-1 and a second part 102*b*-2. In this case, the first and second parts 102*b*-1 and 102*b*-2 have half the thickness of the upper second housing portion 102*b*, respectively, and are fitted and bonded together in the vicinity of the lower end of the upper second housing portion 102*b* at a position at which the screw 113 is arranged. The screw 113 is screwed with the screw reception portion 115 from the inner side surface of the upper housing 102 through the upper first housing portion 102*a*, the first part 102*b*-1 and the second part 102*b*-2 of the upper second housing portion 102*b*.

Third Preferred Embodiment

Figure 9B:
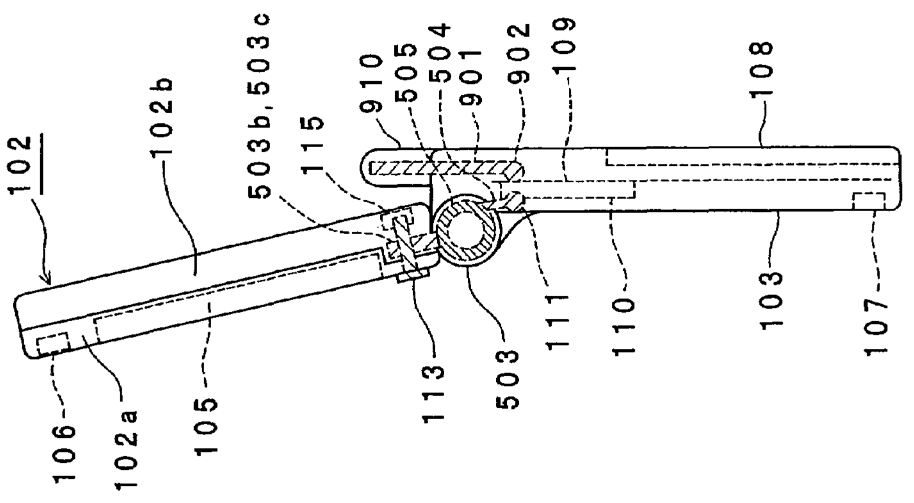
FIG. 9B is a side view of the portable radio communication apparatus shown in FIG. 9A.
Figure 9A:
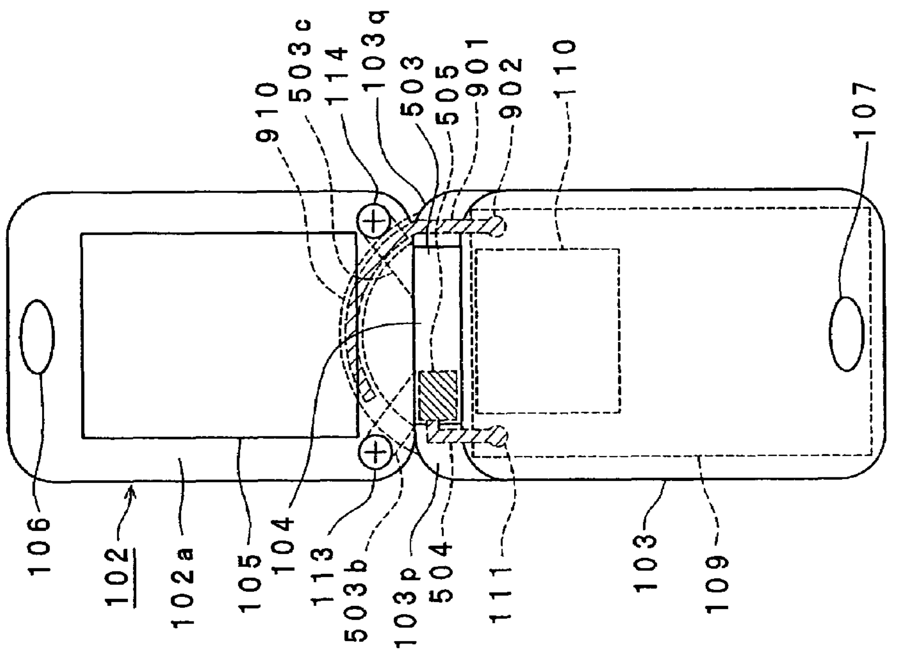
FIG. 9A is a plan view of a folding portable radio communication apparatus in an open state thereof according to a third preferred embodiment of the present invention.
Figure 10A:
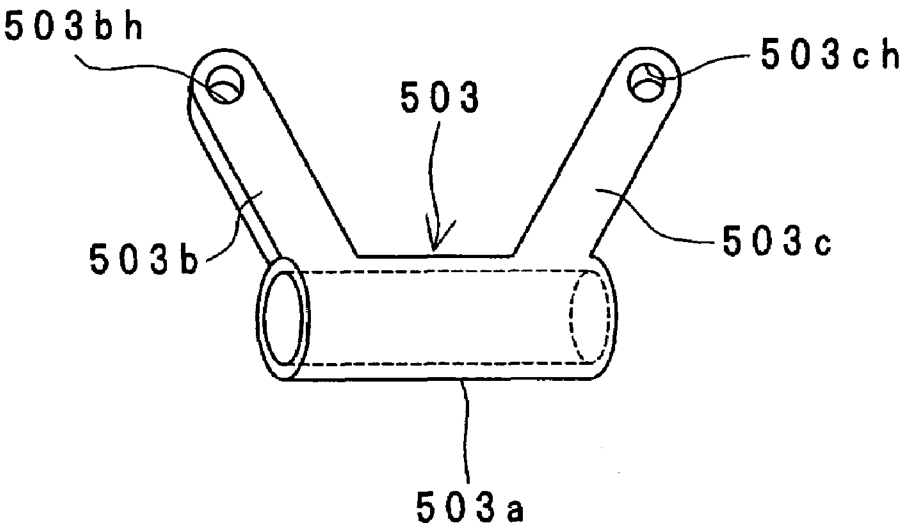
FIG. 10A is a perspective view showing a hinge portion 503 for use in the portable radio communication apparatus shown in FIGS. 9A and 9B.
Figure 10B:
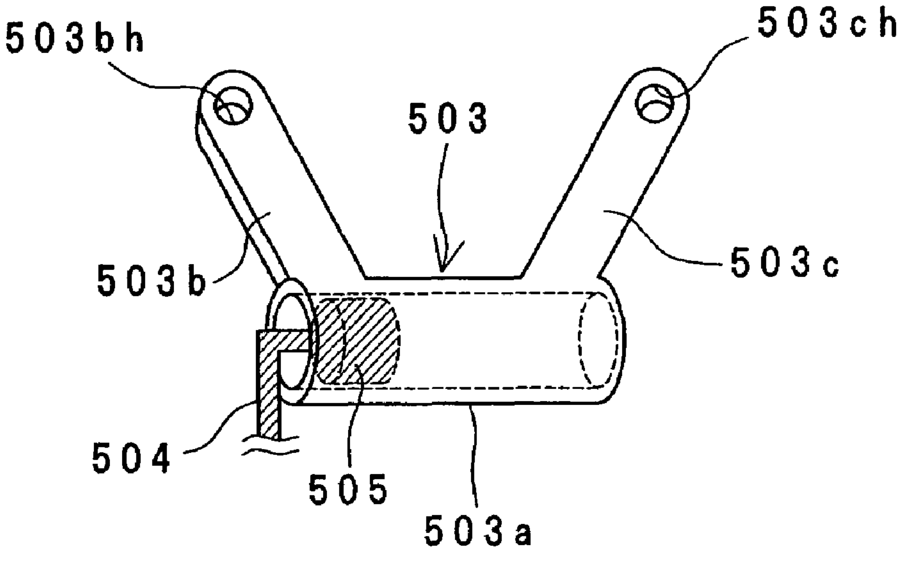
FIG. 10B is a perspective view showing a fitting intrusive circular cylindrical member 505 connected with the hinge portion 503 shown in FIG. 10A and an antenna element 504 connected with the member 505.

FIG. 9A is a plan view of a folding portable radio communication apparatus in an open state thereof according to a third preferred embodiment of the present invention. FIG. 9B is a side view of the portable radio communication apparatus shown in FIG. 9A. FIG. 10A is a perspective view showing a hinge portion 503 for use in the portable radio communication apparatus shown in FIGS. 9A and 9B. FIG. 10B is a perspective view showing a fitting intrusive circular cylindrical member 505 connected with the hinge portion 503 shown in FIG. 10A and an antenna element 504 connected with the member 505.

The portable radio communication apparatus according to the third preferred embodiment is different from that according to the first preferred embodiment shown in FIGS. 1A and 1B in the following points.

(a) The portable radio communication apparatus includes the hinge portion 503 of FIG. 10A made of an electrically conductive material such as aluminum or zinc, instead of the hinge portion 104.

(b) The portable radio communication apparatus includes the antenna element 504, and the fitting intrusive circular cylindrical member 505 which is made of an electrically conductive material such as aluminum or zinc and fitted into the hinge portion 503, instead of the antenna element 112, as shown in FIGS. 9A and 10B.

Referring to FIG. 10A, the hinge portion 503 is constituted by a circular cylindrical portion 503*a* and two leg portions 503*b* and 503*c* extending from left and right ends of the circular cylindrical portion 503*a* as being inclined from an upward direction, respectively. The leg portions 503*b* and 503*c* include circular holes 503*bh* and 503*ch*, respectively, so as to penetrate them in the thickness direction thereof in the vicinity of the ends thereof. The leg portions 503*b* and 503*c* are fitted into the upper second housing portion 102*b*, and screws 113 and 114 are inserted into the circular holes 503*bh* and 503*ch*, respectively. Then, the leg portions 503*b* and 503*c* are screwed with the upper second housing portion 102*b* by the screws 113 and 114.

Referring to FIG. 10B, one end of the antenna element 504 is connected with a part of a circular cylindrical end surface of the fitting intrusive circular cylindrical member 505. The fitting intrusive circular cylindrical member 505 is formed so that an outside diameter of the member 505 is substantially equal to an inside diameter of the circular cylindrical portion 503*a* of the hinge portion 503, and the fitting intrusive circular cylindrical member 505 is inserted into the circular cylindrical on the inside of the circular cylindrical portion 503*a*, and is fitted thereinto.

In the portable radio communication apparatus constituted as mentioned above, the connection point 111 that serves as the feeding point of the radio communication circuit 110 is electrically connected with the first upper housing portion 102*a* through the antenna element 504, the fitting intrusive circular cylindrical member 505, and the hinge portion 503. Therefore, the antenna element 504, the fitting intrusive circular cylindrical member 505, the hinge portion 503, and the upper first housing portion 102*a* can operate as the first antenna element 102A. In this case, at the connection point between the hinge portion 503 and the fitting intrusive circular cylindrical member 505 or at the connection point 111, an input impedance for the antenna is preferably low sufficiently to a predetermined impedance such as 50Ω or the like in a predetermined frequency band such as 900 MHz or the like.

In the portable radio communication apparatus constituted as mentioned above, the antenna element 504, the hinge portion 503 and the upper first housing portion 102*a* operate as the first antenna element 102A. Therefore, as compared with the portable radio communication apparatus in which only the upper first housing portion 102*a* operates as the antenna element, the antenna apparatus can be made larger in size and the antenna gain can be thereby remarkably improved. Further, it is unnecessary to extend the antenna element 112 toward the upper housing 102 through the inside of the hinge portion 104 as shown in FIG. 1A. Therefore, a diameter of the hinge portion 104 can be made small, and the portable radio communication apparatus can be made thinner. Besides, it is possible to reduce the load on the antenna element 112 when the portable radio communication apparatus is opened or closed, and this leads to improvement of the durability of the portable radio communication apparatus.

In the present preferred embodiment, the portable radio communication apparatus may be constituted, so that, for example, the insulating ring 201 of FIG. 3A is inserted between the hinge portion 503 and the fitting intrusive circular cylindrical member 505 and then a radio signal is fed to the antenna element 102A through a capacitance.

In the present preferred embodiment, the fitting intrusive circular cylindrical member 503 is arranged in the circular cylindrical inside of the hinge portion 503. However, the present invention is not limited to this, and the antenna element 504 may be formed to extend toward the upper housing 102 as shown in FIG. 1A.

In the present preferred embodiment, the upper first housing portion 102*a* is employed as a part of the antenna element 102A. However, the present invention is not limited to this, and the hinge portion 503 may be electrically connected with the upper second housing portion 102*b*, and the upper second housing portion 102*b* may be employed as a component of the antenna elements 102A as shown in FIG. 7A. In this case, it is possible to set the distance between the human body and the antenna element 102A larger, and to suppress the decrease of the antenna gain caused by the electromagnetic influence of the human body during a telephone conversation.

Fourth Preferred Embodiment

Figures 11A, 11B:
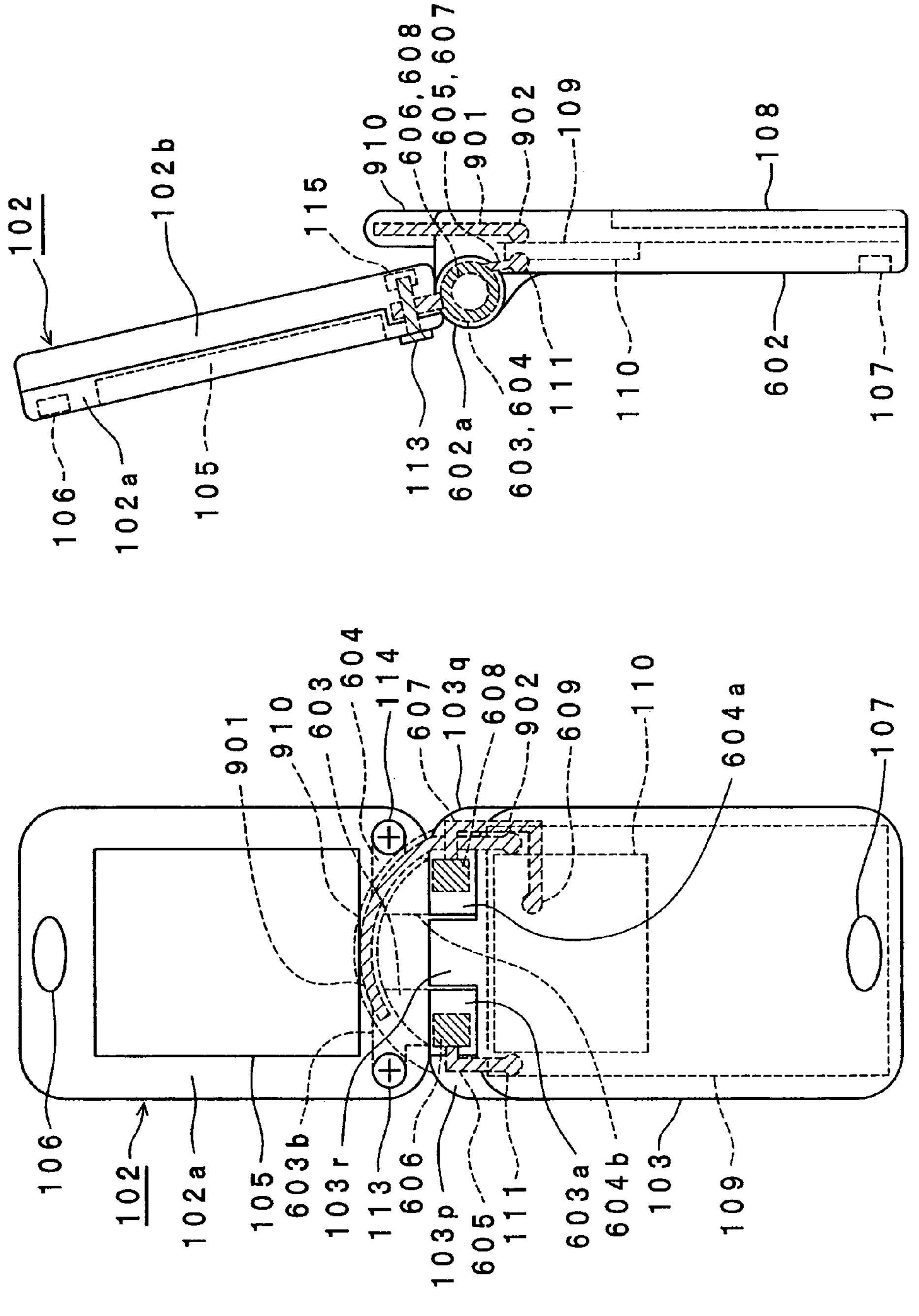
FIG. 11A is a plan view of a folding portable radio communication apparatus in an open state thereof according to a fourth preferred embodiment of the present invention.
FIG. 11B is a side view of the portable radio communication apparatus shown in FIG. 11A.
Figure 12A:
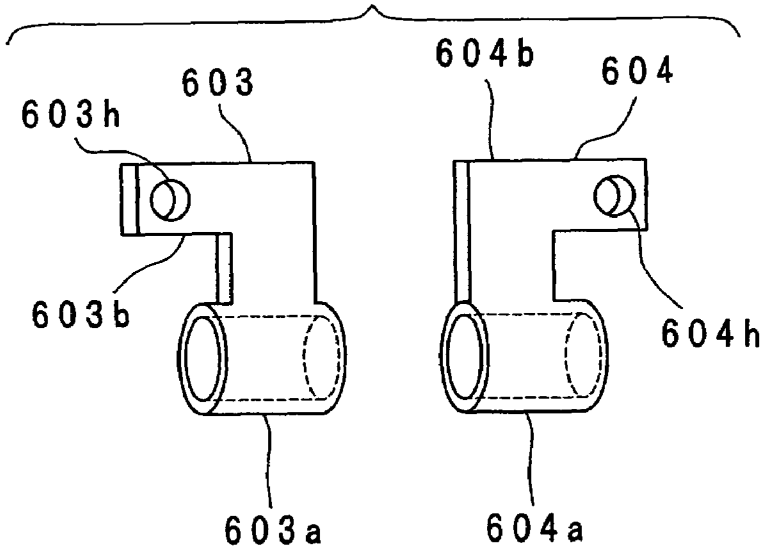
FIG. 12A is a perspective view showing a pair of hinge portions 603 and 604 employed in the portable radio communication apparatus shown in FIGS. 11A and 11B.
Figure 12B:
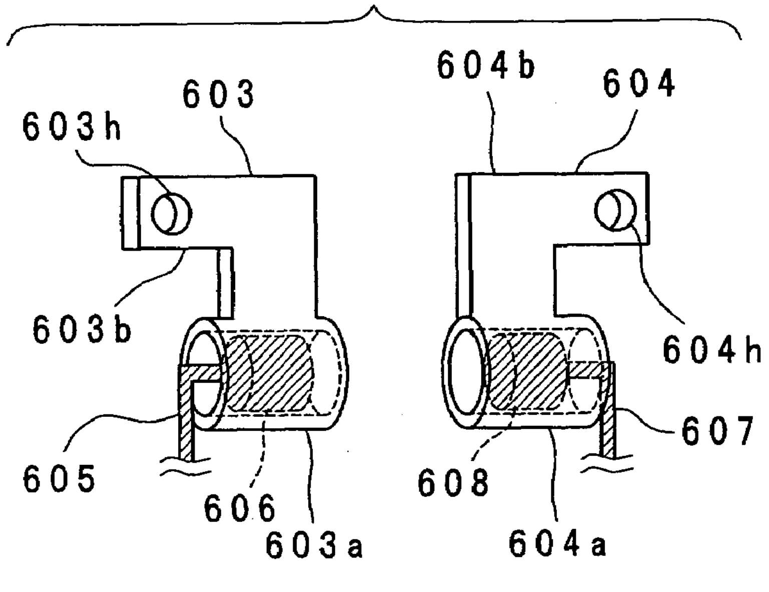
FIG. 12B is a perspective view showing (a) a fitting intrusive circular cylindrical member 606 connected with the hinge portion 603 shown in FIG. 12A, (b) an antenna element 605 connected with the fitting intrusive circular cylindrical member 606, (c) a fitting intrusive circular cylindrical member 608 connected with the hinge portion 604 shown in FIG. 12A, and (d) an antenna element 607 connected with the fitting intrusive circular cylindrical member 608.
Figure 13:
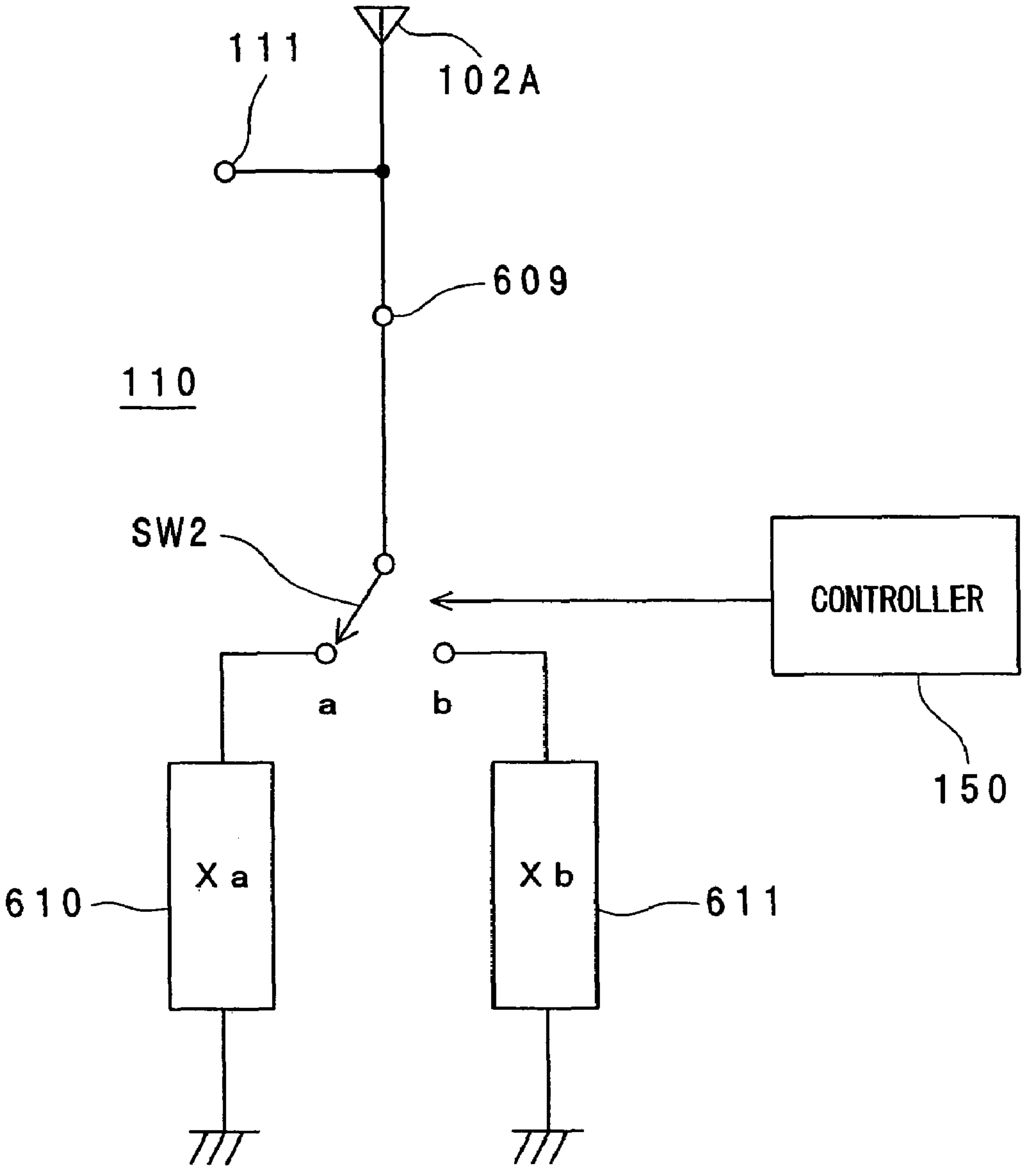
FIG. 13 is a circuit diagram showing a configuration of the radio communication circuit 110 connected with a hinge portion 604 of the portable radio communication apparatus shown in FIGS. 11A and 11B.

FIG. 11A is a plan view of a folding portable radio communication apparatus in an open state thereof according to a fourth preferred embodiment of the present invention. FIG. 11B is a side view of the portable radio communication apparatus shown in FIG. 11A. FIG. 12A is a perspective view showing a pair of hinge portions 603 and 604 employed in the portable radio communication apparatus shown in FIGS. 11A and 11B. FIG. 12B is a perspective view showing (a) a fitting intrusive circular cylindrical member 606 connected with the hinge portion 603 shown in FIG. 12A, (b) an antenna element 605 connected with the fitting intrusive circular cylindrical member 606, (c) a fitting intrusive circular cylindrical member 608 connected with the hinge portion 604 shown in FIG. 12A, and (d) an antenna element 607 connected with the fitting intrusive circular cylindrical member 608. FIG. 13 is a circuit diagram showing a configuration of the radio communication circuit 110 connected with a hinge portion 604 of the portable radio communication apparatus shown in FIGS. 11A and 11B.

The portable radio communication apparatus according to the fourth preferred embodiment is different from that according to the third preferred embodiment in the following points:

(a) The portable radio communication apparatus includes the hinge portions 603 and 604 made of an electrically conductive material such as magnesium or zinc, instead of the hinge portion 104.

(b) The fitting intrusive circular cylindrical member 606 which the antenna element 605 is connected with is fitted into the hinge portion 603.

(c) The fitting intrusive circular cylindrical member 608 which the antenna element 607 is connected with is fitted into the hinge portion 603.

(d) The antenna element 607 is connected with a reactance element 610 or 611 through a connection point 609 of the radio communication circuit 110. The reactance elements 610 and 611 may be variable reactance elements such as varactor diodes or the like.

Referring to FIG. 12A, the hinge portion 603 is constituted by a circular cylindrical portion 603*a* and a leg portion 603*b*, which extends from a circular cylindrical outer peripheral surface of the circular cylindrical portion 603*a* and has a circular hole 603*h*. The hinge portion 604 is constituted by a circular cylindrical portion 604*a* and a leg portion 604*b*, which extends from a circular cylindrical outer peripheral surface of the circular cylindrical portion 604*a* and has a circular hole 604*h*.

Referring to FIG. 12B, the circular cylindrical fitting intrusive member 606, which the antenna element 605 is connected with, is inserted and fitted into a circular cylindrical inside of the circular cylindrical portion 603*a* of the hinge portion 603, and further, the circular cylindrical fitting intrusive member 608, which the antenna element 607 is connected with, is inserted and fitted into a circular cylindrical inside of the circular cylindrical portion 604*a* of the hinge portion 604.

Referring to FIG. 11A, the circular cylindrical portion 603*a* of the hinge portion 603 is inserted and fitted between an upper left end 103*p* of the lower housing 103 and a protruding circular cylindrical portion 103*r*, and the leg portion 603*b* of the hinge portion 603 is inserted and fitted to the upper second housing portion 102*b*. Then, the screw 113 is inserted into the circular hole 603*h*, and this leads to that the hinge portion 603 is screwed with the upper housing 102 by the screw 113. In addition, the circular cylindrical portion 604*a* of the hinge portion 604 is inserted and fitted between an upper left end 103*q* of the lower housing 103 and the protruding circular cylindrical portion 103*r*, and the leg portion 604*b* of the hinge portion 604 is inserted and fitted to the upper second housing portion 102*b*. Then, the screw 114 is inserted into the circular hole 604*h*, and this leads to that the hinge portion 604 is screwed with the upper housing 102 by the screw 114. The connection point 111 of the radio communication circuit 110 is connected with the fitting intrusive circular cylindrical member 606 through the antenna element 605 that is provided so as to extend into the lower housing 103. The connection point 609 of the radio communication circuit 110 is connected with the fitting intrusive circular cylindrical member 608 through the antenna element 607 that is provided so as to extend into the lower housing 103.

In the portable radio communication apparatus constituted as mentioned above, the connection point 111 of the radio communication circuit 110 is electrically connected with the upper first housing 102*a* through the antenna element 605, the fitting intrusive circular cylindrical member 606, the hinge portion 603, and the screw 113. In addition, the connection point 609 of the radio communication circuit 110 is electrically connected with the upper first housing 102*a* through the antenna element 607, the fitting intrusive circular cylindrical member 608, the hinge portion 604, and the screw 114. A circuit ranging from the antenna element 605 to the upper first housing portion 102*a* and a circuit ranging from the antenna element 607 to the upper first housing portion 102*a* constitute the first antenna element 102A. In the present preferred embodiment, as shown in FIG. 13, the antenna element 102A is connected with one of reactance elements 610 and 611 respectively having reactance values Xa and Xb different from each other, through the connection point 609 and a switch SW2 controlled by a controller 150.

In addition, the fitting intrusive circular cylindrical member 606 is connected with the connection point 111 through the antenna element 605, and the fitting intrusive circular cylindrical member 608 is connected with a terminal 609*a* of the connection point 609 arranged on the antenna element 607. Further, a terminal 609*b* of the connection point 609 is connected with the first reactance element 610, and a terminal 609*c* thereof is connected with the second reactance element 611.

For example, when the switch SW1 of FIG. 2 is switched over to the contact "a" or the contact "b" thereof to use only the antenna element 102A as the antenna apparatus and the switch SW2 of FIG. 13 is switched over to the contact "a" or the contact "b" thereof, the reactance value of the reactance element connected with the antenna element 102A changes, and then, the resonance frequency of the antenna element 120A changes. Therefore, an operating frequency can be switched over, for example, by time division of transmission and reception. Alternatively, by switching over the switch SW2 to the contact "a" or the contact "b", for example, in accordance with the open or closed state of the portable radio communication apparatus, the reactance elements 610 and 611 may be selectively switched over. As a result, a condition of an object located in the vicinity of the antenna element 102A changes depending on whether the portable radio communication apparatus is in an open state or a closed state thereof, and then, the reactance elements 610 and 611 are selectively switched over according to the condition so as to be able to obtain a higher antenna gain.

Furthermore, when the switch SW1 of FIG. 2, for example, is switched over to the contact "b" to use only the antenna element 102A as the antenna apparatus, the antenna element 102A can operate as a parasitic element. When the switch SW2 of FIG. 13 is switched over to the contact "a" or the contact "b", the reactance value of the reactance element connected with the antenna element 102A changes. Namely, it is possible to change the electric length of the antenna element 102A that operates as a parasitic element for the antenna element 901. Therefore, it is possible to change directivity characteristics of the entire antenna apparatus.

In the present preferred embodiment shown in FIG. 13, the two reactance elements 610 and 611 are selectively switched over. However, the present invention is not limited to this, and three or more reactance elements may be selectively switched over.

In the present preferred embodiment, the first antenna element 102A is constituted by using the upper first housing portion 102*a*. However, the present invention is not limited to this, and the first antenna element 102A may be constituted by using the upper second housing portion 102*b*.

In the present preferred embodiment, the hinge portions 603 and 604 made of the electrically conductive material are employed. However, the present invention is not limited to this, and the hinge portions 603 and 604 made of a dielectric material such as a resin material or the like may be employed, and the antenna elements 605 and 607 may be directly and electrically connected with the upper first housing portion 102*a*.

Figures 14A, 14B:
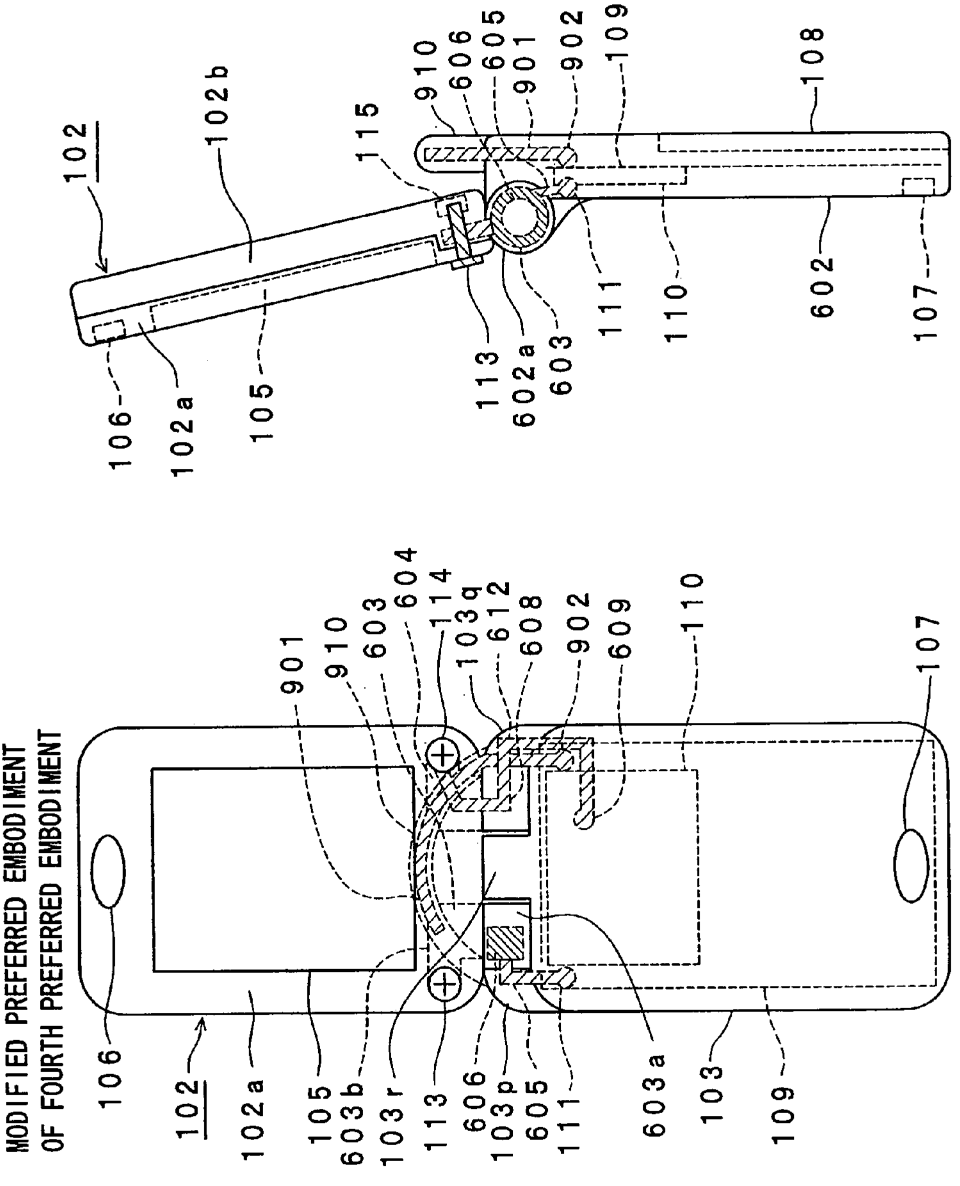
FIG. 14A is a plan view of a folding portable radio communication apparatus in an open state thereof according to a modified preferred embodiment of the fourth preferred embodiment of the present invention.
FIG. 14B is a side view of the portable radio communication apparatus shown in FIG. 14A.

FIG. 14A is a plan view of a folding portable radio communication apparatus in an open state thereof according to a modified preferred embodiment of the fourth preferred embodiment according to the present invention. FIG. 14B is a side view of the portable radio communication apparatus shown in FIG. 14A. The portable radio communication apparatus according to the first modified preferred embodiment of the fourth preferred embodiment is different from that according to the fourth preferred embodiment by including an antenna element 612, instead of the antenna element 607 and the fitting intrusive circular cylindrical member 608.

Referring to FIG. 14A, the antenna element 612 is formed to extend into the lower housing 103, the hinge portion 603, and the upper second housing portion 102*b* so as to be connected with the screw 114. Therefore, the connection point 609 of the radio communication circuit 110 is electrically connected with the upper first housing portion 102*a* through the antenna element 612 and the screw 114. The portable radio communication apparatus according to the modified preferred embodiment of the fourth preferred embodiment constituted as mentioned above has the same functions and advantageous effects as those of the portable radio communication apparatus according to the fourth preferred embodiment.

Fifth Preferred Embodiment

Figure 15B:
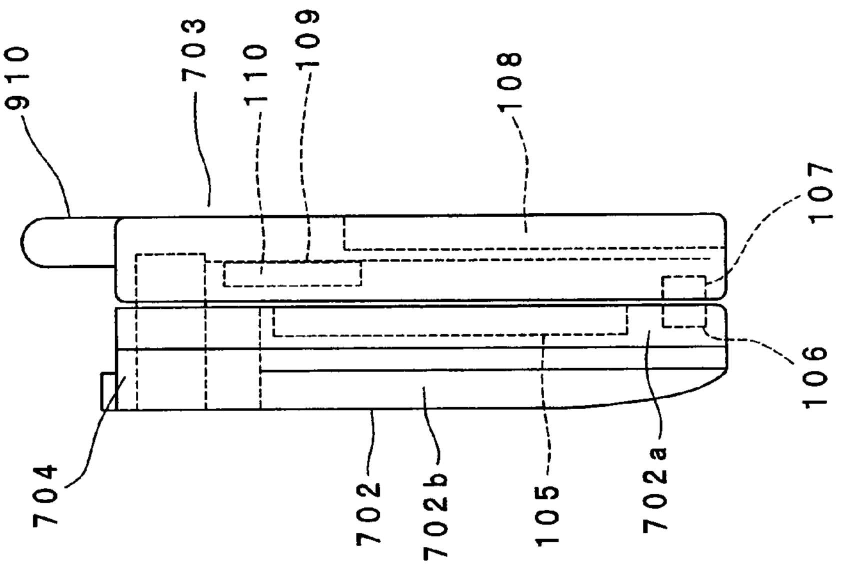
FIG. 15B is a side view of the portable radio communication apparatus shown in FIG. 15B.
Figure 15A:
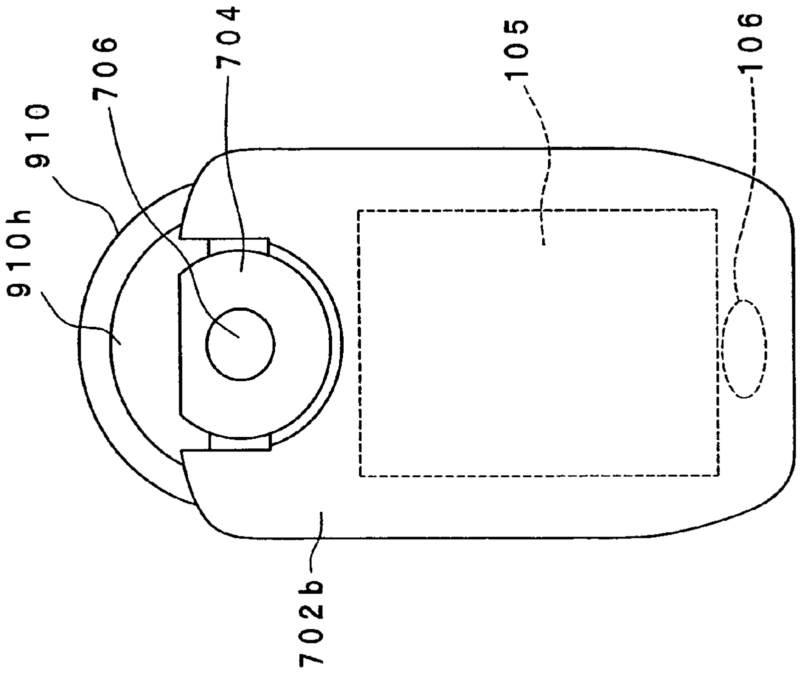
FIG. 15A is a plan view of a folding portable radio communication apparatus in a closed state thereof according to a fifth preferred embodiment of the present invention.
Figure 16:
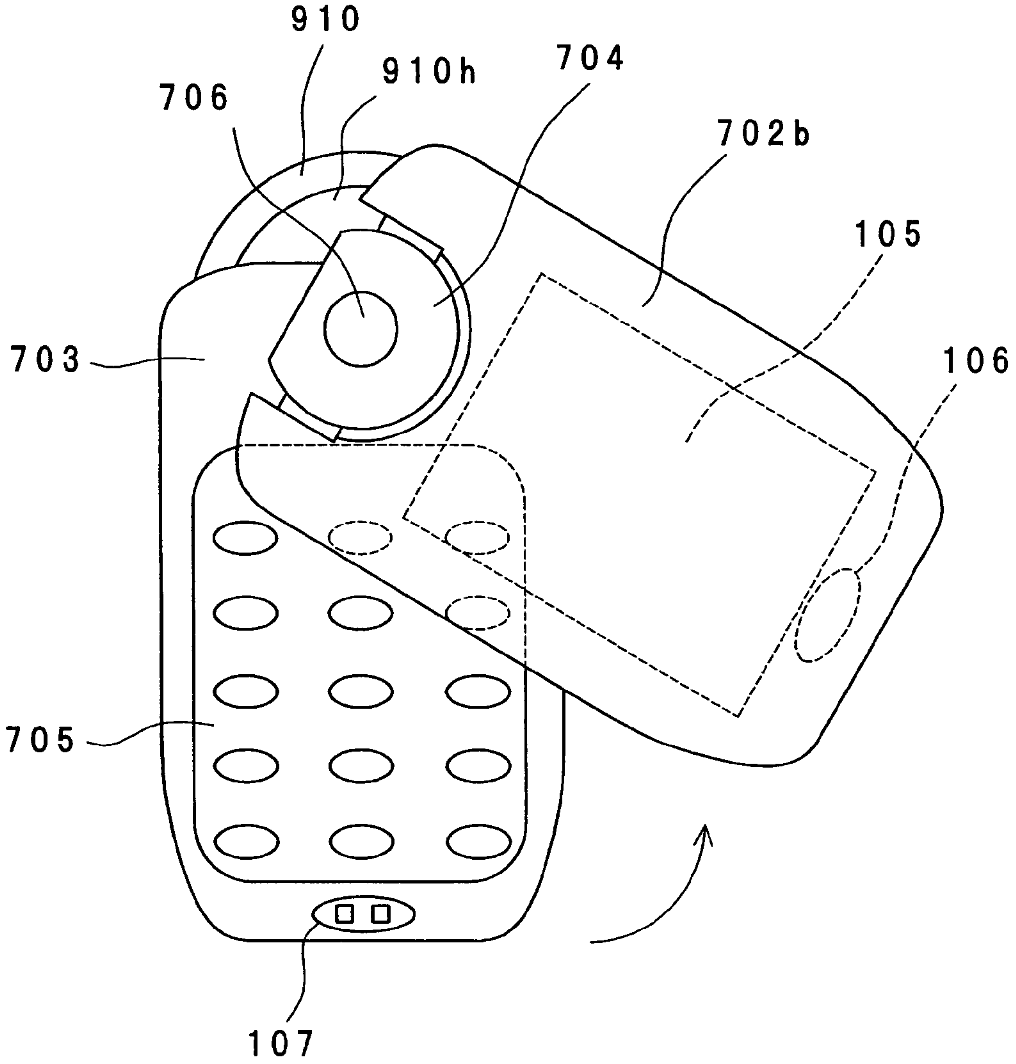
FIG. 16 is a plan view of the portable radio communication apparatus when an upper housing 702 of the portable radio communication apparatus shown in FIGS. 15A and 15B is rotated counterclockwise by about 45 degrees.
Figure 17B:
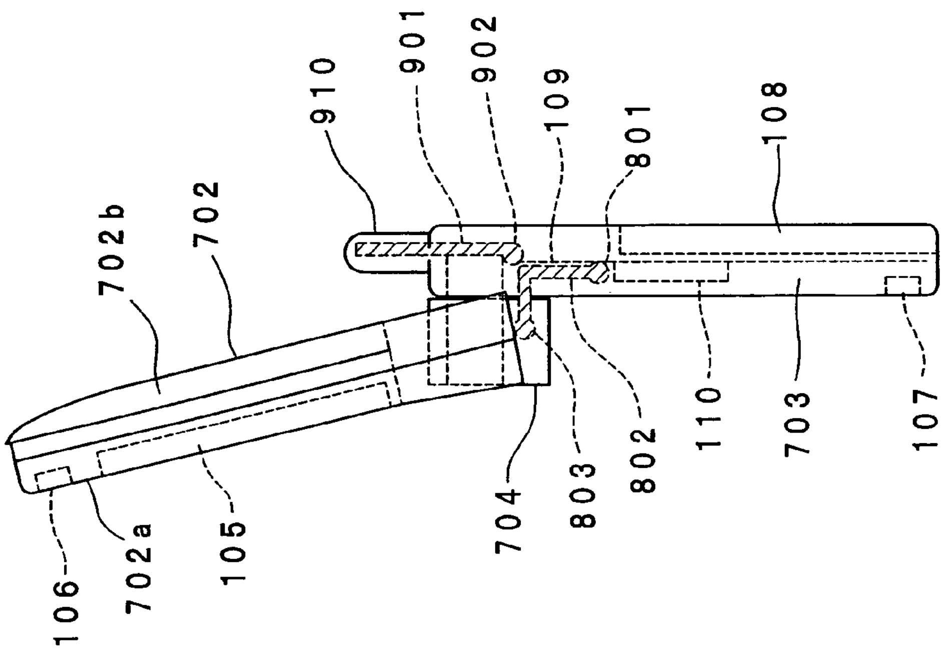
FIG. 17B is a side view of the portable radio communication apparatus shown in FIG. 17A.
Figure 17A:
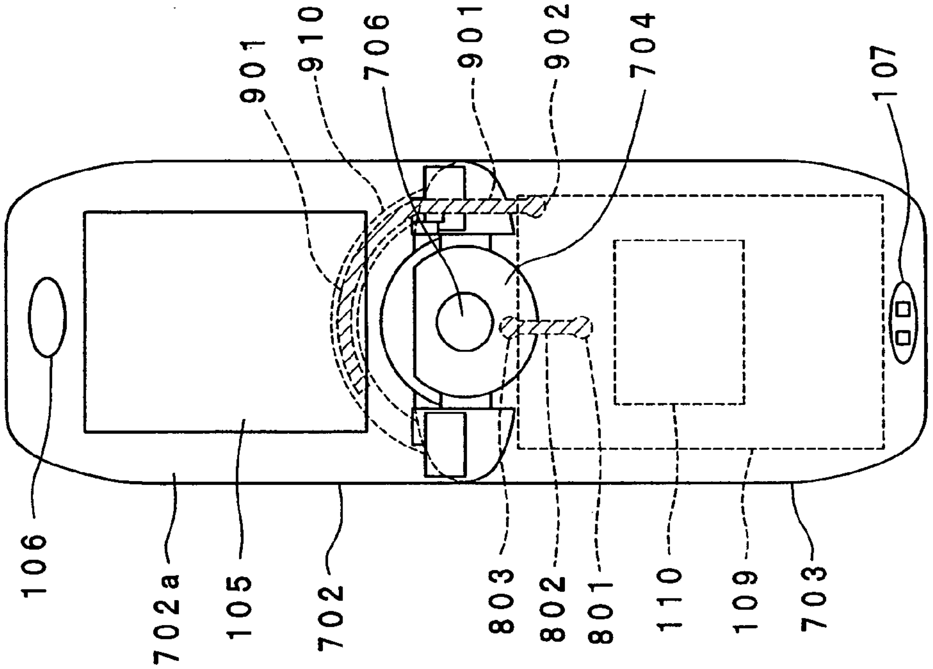
FIG. 17A is a plan view of the portable radio communication apparatus shown in FIGS. 15A and 15B in an open state thereof.

FIG. 15A is a plan view of a folding portable radio communication apparatus in a closed state thereof according to a fifth preferred embodiment of the present invention. FIG. 15B is a side view of the portable radio communication apparatus shown in FIG. 15A. FIG. 16 is a plan view of the portable radio communication apparatus when an upper housing 702 of the portable radio communication apparatus shown in FIGS. 15A and 15B is rotated counterclockwise by about 45 degrees. FIG. 17A is a plan view of the portable radio communication apparatus shown in FIGS. 15A and 15B in an open state thereof, and FIG. 17B is a side view of the portable radio communication apparatus shown in FIG. 17A.

The portable radio communication apparatus according to the fifth preferred embodiment is different from that according to the first preferred embodiment in the following points.

(a) The portable radio communication apparatus includes the biaxial hinge portion 704 having a CCD camera 706 arranged in central portion thereof, instead of the uniaxial hinge portion 104. It is noted that at least one part of the biaxial hinge portion 704 is made of an electrically conductive material, and the biaxial hinge portion 704 is provided in an upper central portion of a lower housing 703.

(b) The portable radio communication apparatus includes an antenna element 802, instead of the antenna element 112.

(c) The portable radio communication apparatus includes an upper housing 702 that includes an upper first housing portion 702*a* and an upper second housing portion 702*b*, instead of the upper housing 102. The upper housing 702 includes the same components as those of the upper housing 102. In addition, in a manner similar to that of the upper first housing portion 102*a*, at least one part of the upper first housing portion 702*a* is made of an electrically conductive material, and the upper first housing portion 702*a* includes a conductor portion.

(d) The portable radio communication apparatus includes the lower housing 703, instead of the lower housing 103. The lower housing 703 includes the same components as those of the lower housing 702.

Referring to FIGS. 15A, 15B and 16, the upper housing 702 and the lower housing 703 are connected with each other, so that they are foldable through the biaxial hinge portion 704 and the upper housing 702 is rotatable about the biaxial hinge portion 704. Referring to FIG. 16, a key pad 705 is provided almost in the central portion of an inner side surface of the lower housing 703. Referring to FIGS. 17A and 17B, the antenna element 802 is provided so as to extend from the inside of the lower housing 703 toward the upper housing 702 through the inside of the biaxial hinge portion 704. A connection point 801 (corresponding to the connection point 110 shown in FIGS. 1(*a*) and 1(*b*)) that serves as a feeding point of the radio communication circuit 110 is electrically connected with an electrical conductor portion of the upper first housing portion 702*a* through the antenna element 802. The antenna element 802 and the upper first housing portion 702*a* constitute the first antenna element 702A in a manner similar to the antenna element 102A of the first preferred embodiment.

Figure 18:
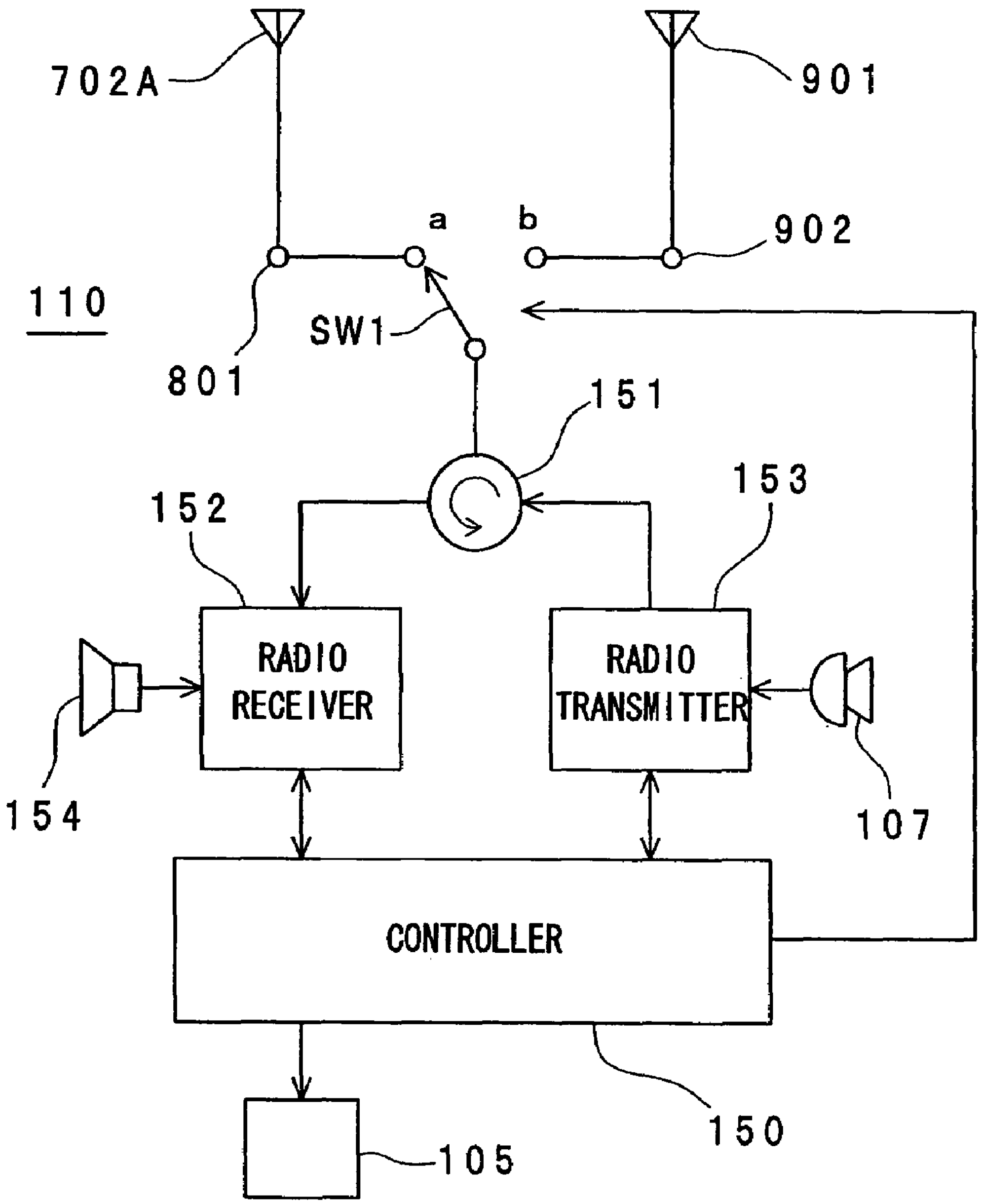
FIG. 18 is a circuit diagram showing a configuration of the antenna elements 702A and 901 and the radio communication circuit 110 connected with the antenna elements 702A and 901 in the portable radio communication apparatus shown in FIG. 17A.

FIG. 18 is a circuit diagram showing a configuration of the antenna elements 702A and 901 and the radio communication circuit 110 connected with the antenna elements 702A and 901 of the portable radio communication apparatus shown in FIG. 17A. Referring to FIG. 18, the antenna element 702A is electrically connected with the contact "a" of the switch SW1 through the connection point 801. The other circuits are constituted in a manner similar to that of FIG. 2. Accordingly, in the present preferred embodiment, the antenna elements 702A and 901 can be selectively switched over, and the portable radio communication apparatus according to the fifth preferred embodiment has the same functions and advantageous effects as those of the portable radio communication apparatus according to the first preferred embodiment.

In the present preferred embodiment, the antenna element 802 is connected with the conductor portion of the upper first housing portion 702*a*. However, the present invention is not limited to this. At least one part of the upper second housing portion 702*b* may be made of an electrically conductive material and the antenna element 802 may be connected with the conductor portion of the upper second housing portion 702*b*. In this case, it is possible to make the distance between the human body and the antenna element 702A larger, and to suppress the decrease of the antenna gain caused by the electromagnetic influence of the human body during a telephone conversation.

Figure 19A:
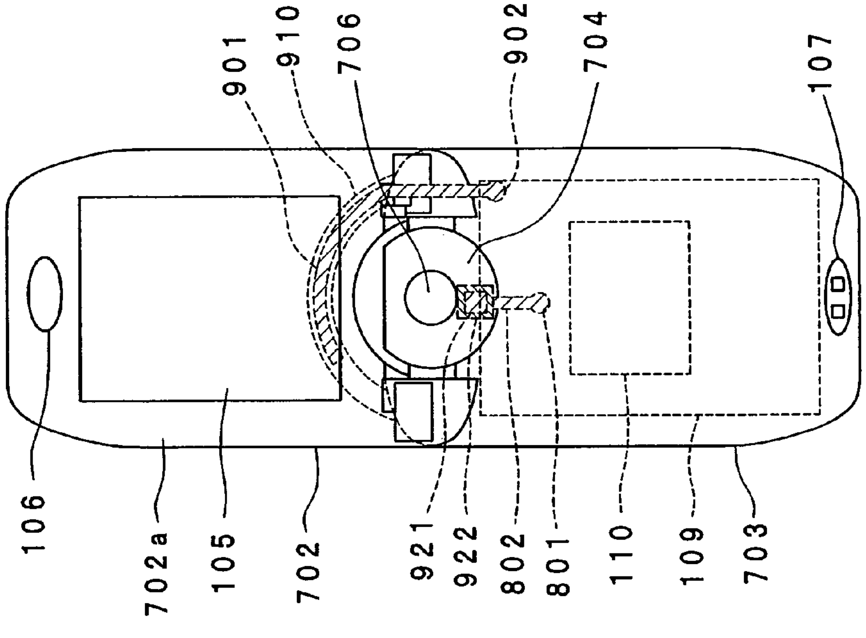
FIG. 19A is a plan view of a portable radio communication apparatus in an open state thereof according to a modified preferred embodiment of the fifth preferred embodiment of the present invention.
Figure 19B:
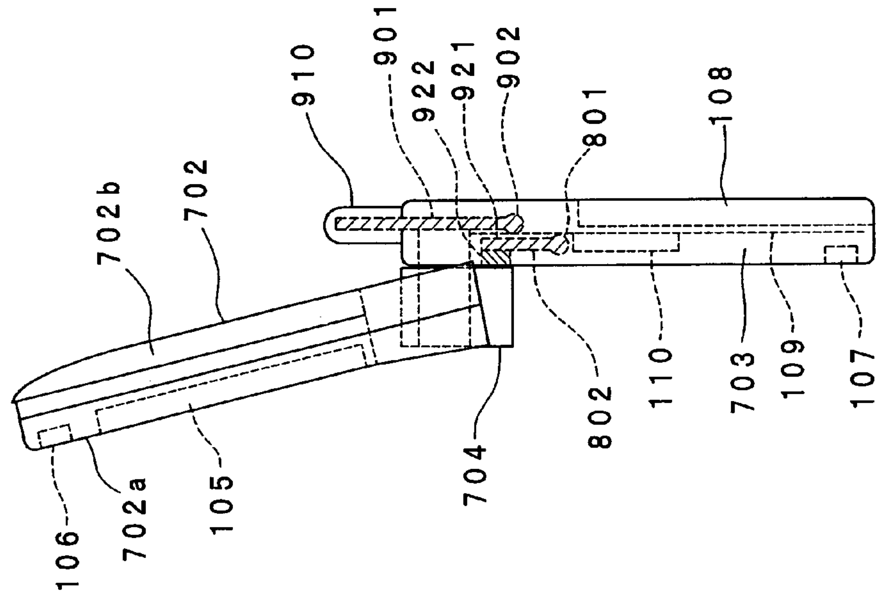
FIG. 19B is a side view of the portable radio communication apparatus shown in FIG. 19A.
Figure 20:
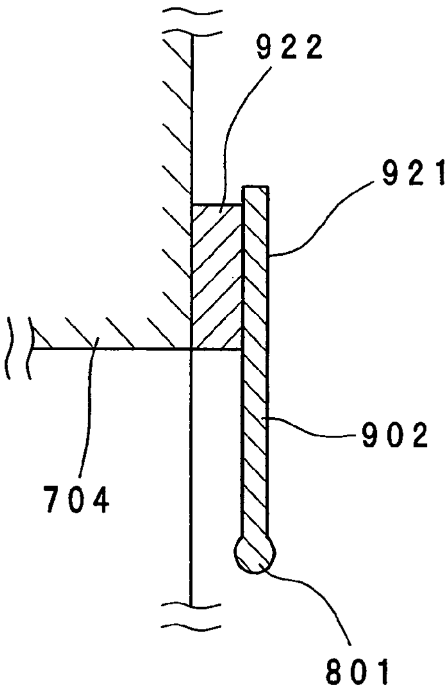
FIG. 20 is a longitudinal sectional view showing a detailed configuration in the vicinity of a flat electrical insulator 922 shown in FIG. 19B.

FIG. 19A is a plan view of a portable radio communication apparatus in an open state thereof according to a modified preferred embodiment of the fifth preferred embodiment according to the present invention. FIG. 19B is a side view of the portable radio communication apparatus shown in FIG. 19A. FIG. 20 is a longitudinal sectional view showing a detailed configuration in the vicinity of a flat electrical insulator 922 shown in FIG. 19B.

The portable radio communication apparatus according to the modified preferred embodiment of the fifth preferred embodiment is different from that according to the fifth preferred embodiment as follows. A flat antenna element 921 is connected with a tip end of the antenna element 802, electrically connected with the conductor portion of the biaxial hinge portion 704 through the flat electrical insulator 922, and connected with the upper first housing portion 702*a* through the biaxial hinge portion 704. As shown in FIG. 20, the flat electrical insulator 922 is inserted between the flat antenna element 921 and the biaxial hinge portion 704 in the inside of the lower housing 703. In the portable radio communication apparatus constituted as mentioned above, a radio signal can be fed to the antenna apparatus through the capacitance in a manner similar to that of the portable radio communication apparatus shown in FIG. 3B.

Figure 21:
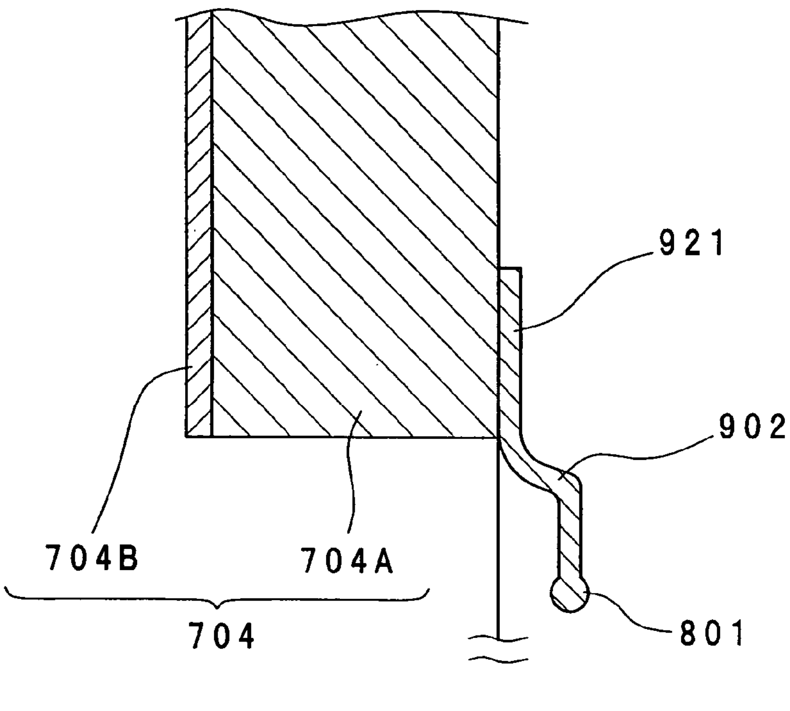
FIG. 21 is a longitudinal sectional view showing a detailed configuration in the vicinity of the antenna element 921 in a further modified preferred embodiment of the portable radio communication apparatus shown in FIG. 19A.

FIG. 21 is a longitudinal sectional view showing a detailed configuration in the vicinity of the antenna element 921 of a further modified preferred embodiment of the portable radio communication apparatus shown in FIG. 19A. Referring to FIG. 21, the flat electrical insulator 922 shown in FIG. 20 is not employed, and the biaxial hinge portion 704 is constituted by forming an electrical conductor layer 704B on the resin housing portion 704A. In addition, the conductor layer 704B is electrically connected with the upper first housing portion 702*a*. By thus constituting the same apparatus, the flat antenna element 921 is electrically connected with the conductor layer 704B through the resin housing portion 704A. Therefore, in a manner similar to that of FIG. 20, in the portable radio communication apparatus, a radio signal can be fed to the antenna apparatus through the capacitance.

The various kinds of implemental examples applied to the preferred embodiments mentioned above will be next described.

Figure 22A:
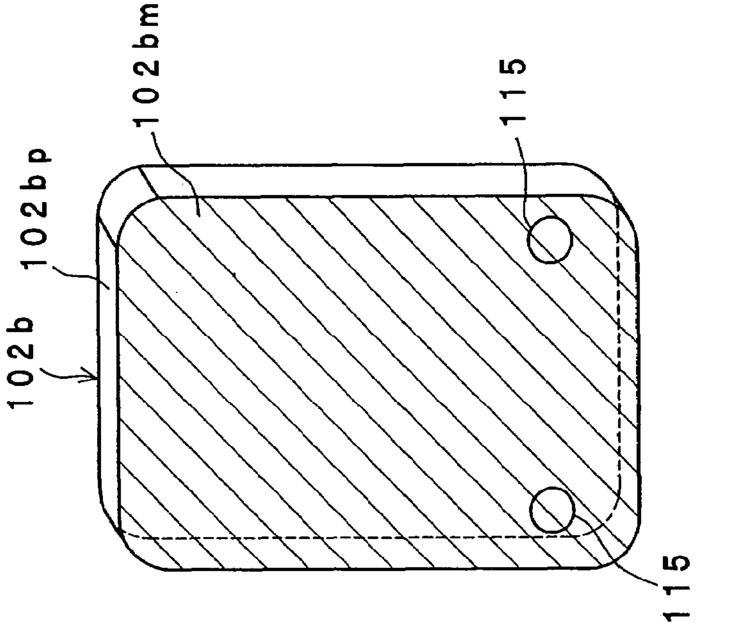
FIG. 22A shows a first implemental example applied to the preferred embodiments of the present invention, and is a perspective view seen from an inner side surface of the upper second housing portion 102*b* of the portable radio communication apparatus.
Figure 22B:
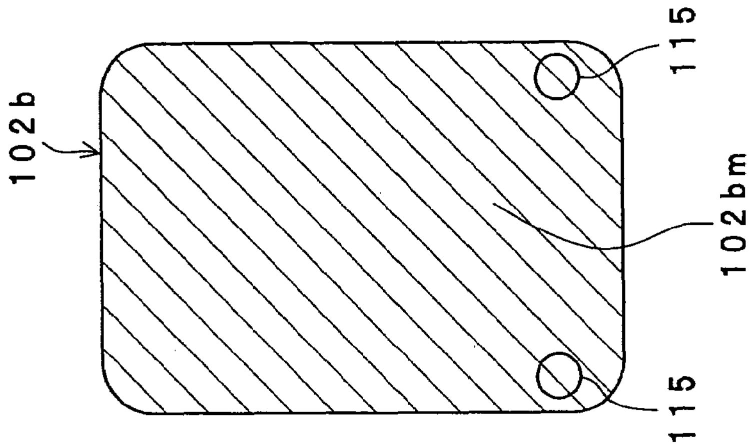
FIG. 22B is a plan view showing the inner side surface of the upper second housing portion 102*b* shown in FIG. 22A.
Figure 22C:
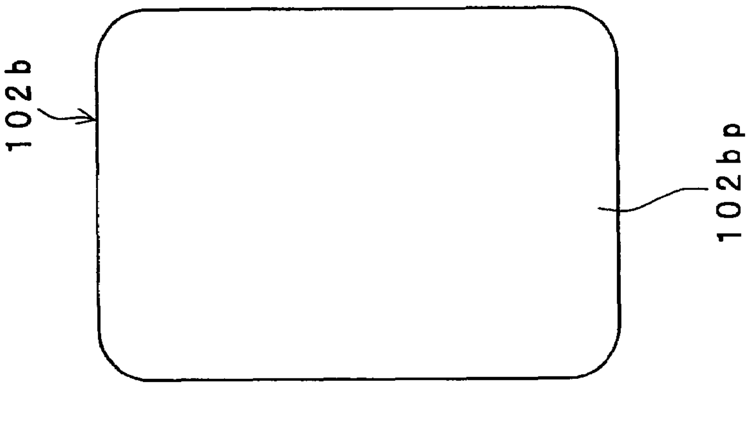
FIG. 22C is a plan view showing an outer side surface of the upper second housing portion 102*b* shown in FIG. 22A.

FIG. 22A shows a first implemental example applied to the preferred embodiments of the present invention, and is a perspective view seen from the inner side surface of the upper second housing portion 102*b* of the portable radio communication apparatus. FIG. 22B is a plan view showing the inner side surface of the upper second housing portion 102*b* shown in FIG. 22A. FIG. 22C is a plan view showing an outer side surface of the upper second housing portion 102*b* shown in FIG. 22A.

Referring to FIGS. 22A, 22B and 22C, an electrical conductor layer 102*bm* made of an electrically conductive material such as magnesium or zinc is formed on the inner side surface of a resin housing portion 102*bp* (including the screw reception portions 115), thereby constituting the upper second housing portion 102*b*, and then, for example, electrically connecting the antenna element 112 with the conductor layer 102*bm*. In the first implemental example constituted as mentioned above, by forming the conductor layer 102*bm*, the mechanical strength of the upper second housing portion 102*b* can be increased. In addition, since the upper housing 102 can be made of a resin material, the manufacturing cost can be reduced. Further, since a pattern of the conductor layer 102*bm* can be easily formed, it is possible to increase the degree of freedom for designing the antenna apparatus. Besides, since the upper second housing portion 102*b* is located on the opposite side of the head of an operator relative to the upper first housing portion 102*a*, it is possible to make the distance between the human body and the antenna element 112 larger, and to improve the antenna gain and the SAR during a telephone conversation.

Figures 23A, 23B, 23C:
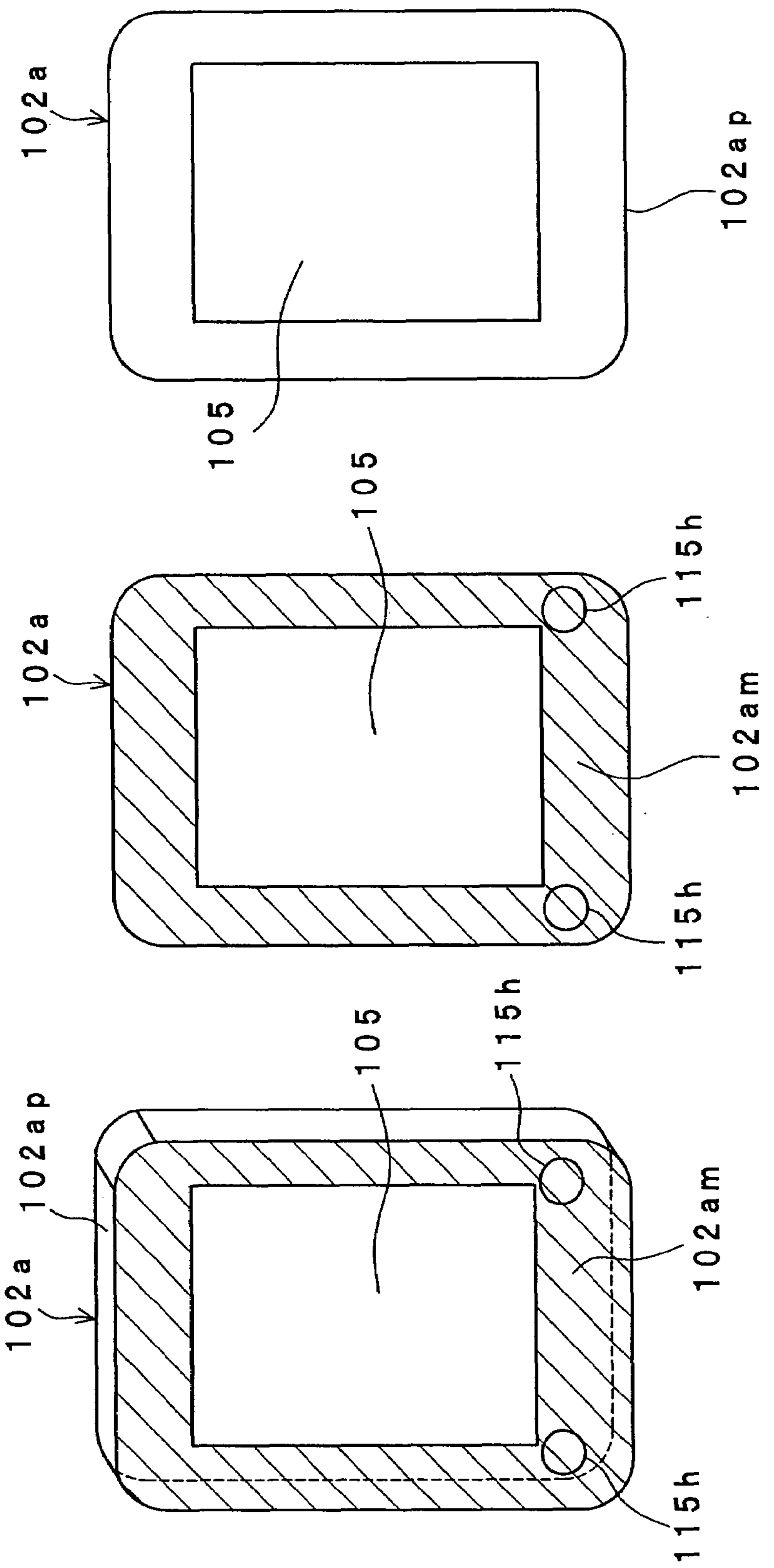
FIG. 23A shows a second implemental example applied to the preferred embodiments of the present invention, and is a perspective view seen from the inner side surface of the upper first housing portion 102*a* of the portable ratio communication apparatus.
FIG. 23B is a plan view showing the inner side surface of the upper first housing portion 102*a* shown in FIG. 23A.
FIG. 23C is a plan view showing an outer side surface of the upper first housing portion 102*a* shown in FIG. 23A.

FIG. 23A shows a second implemental example applied to the preferred embodiments of the present invention, and is a perspective view seen from the inner side surface of the upper first housing portion 102*a* of the portable ratio communication apparatus. FIG. 23B is a plan view showing the inner side surface of the upper first housing portion 102*a* shown in FIG. 23A. FIG. 23C is a plan view showing the outer side surface of the upper first housing portion 102*a* shown in FIG. 23A.

Referring to FIGS. 23A, 23B and 23C, an electrical conductor layer 103*bm* made of a magnetic material such as magnesium or zinc is formed on an inner side surface of a resin housing portion 103*bp* (including inner peripheral surfaces of circular holes 115*h* on the respective screw reception portions 115 but not including the liquid crystal display 105), thereby constituting the upper first housing portion 102*a*, and then, for example, electrically connecting the antenna element 112 with the conductor layer 103*bm*. In the second implemental example constituted as mentioned above, by forming the conductor layer 103*bm*, the mechanical strength of the upper first housing portion 102*a* can be increased. In addition, since the upper housing 102 can be made of a resin material, the manufacturing cost can be reduced. Further, since a forming pattern of the conductor layer 103*bm* can be easily formed, it is possible to increase the degree of freedom for designing the antenna apparatus.

Figure 24C:
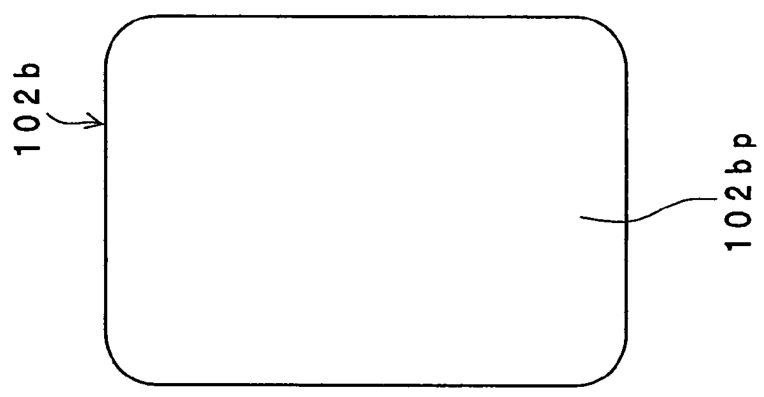
FIG. 24C is a plan view showing the outer side surface of the upper second housing portion 102*b* shown in FIG. 24A.
Figure 24B:
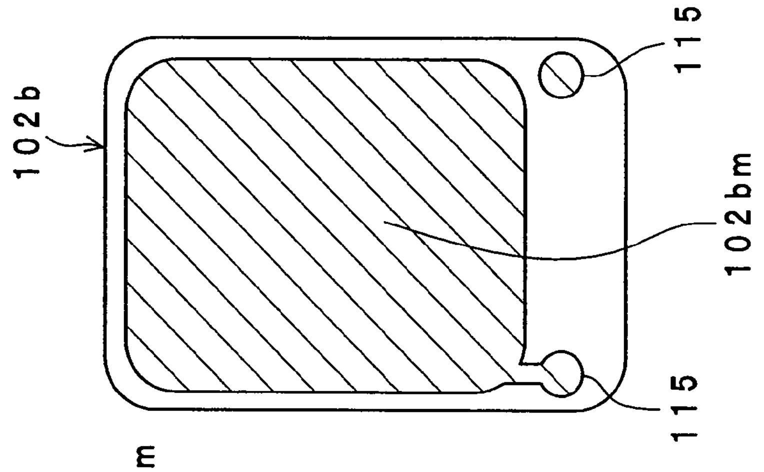
FIG. 24B is a plan view showing the inner side surface of the upper second housing portion 102*b* shown in FIG. 24A.
Figure 24A:
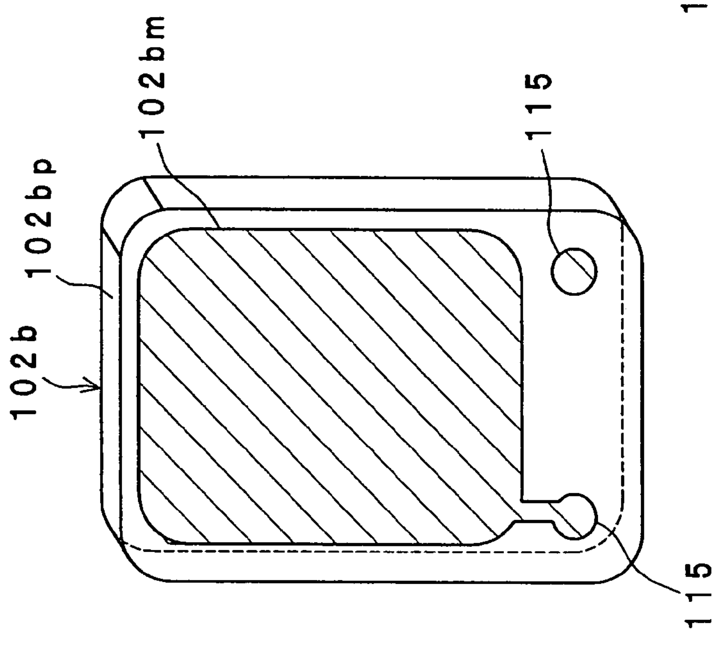
FIG. 24A shows a third implemental example applied to the preferred embodiments of the present invention, and is a perspective view seen from the inner side surface of the upper second housing portion 102*b* of the portable ratio communication apparatus.

FIG. 24A shows a third implemental example applied to the preferred embodiments of the present invention, and is a perspective view seen from the inner side surface of the upper second housing portion 102*b* of the portable ratio communication apparatus. FIG. 24B is a plan view showing the inner side surface of the upper second housing portion 102*b* shown in FIG. 24A. FIG. 24C is a plan view showing the outer side surface of the upper second housing portion 102*b* shown in FIG. 24A.

Referring to FIGS. 24A, 24B and 24C, the conductor layer 102*bm* made of a magnetic material such as magnesium or zinc is formed on the inner side surface of the resin housing portion 102*bp* (including one of the screw reception portions 115 but not including lower end portions in the vicinity of the screw reception portions 115), thereby constituting the upper second housing portion 102*b*, and then, for example, electrically connecting the antenna element 112 with the conductor layer 102*bm*. In the third implemental example constituted as mentioned above, the upper housing 102 can be electrically connected with the lower housing 103.

Figure 25A:
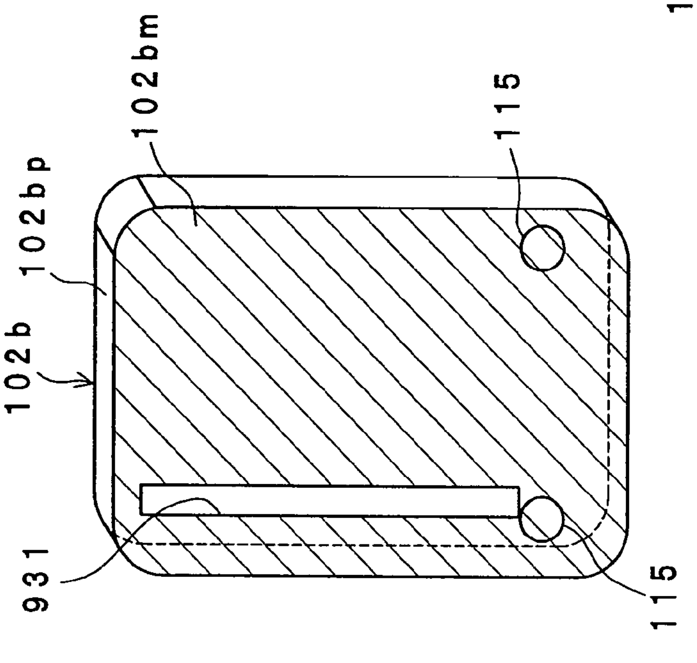
FIG. 25A shows a fourth implemental example applied to the preferred embodiments of the present invention, and is a perspective view seen from the inner side surface of the upper second housing portion 102*b* of the portable radio communication apparatus.
Figure 25B:
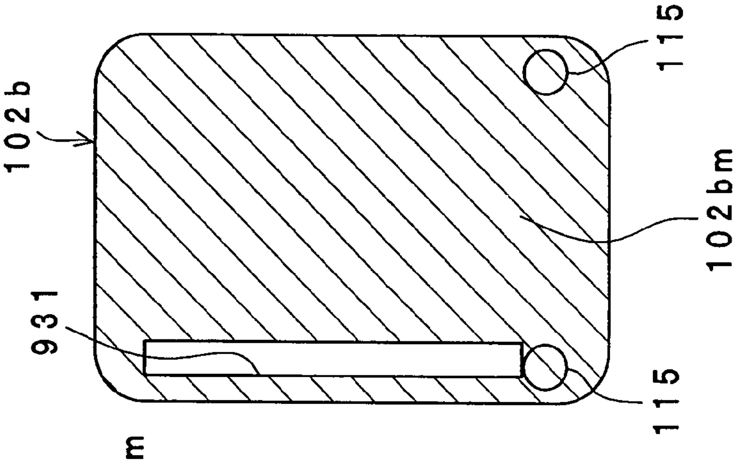
FIG. 25B is a plan view showing the inner side surface of the upper second housing portion 102*b* shown in FIG. 25A.
Figure 25C:
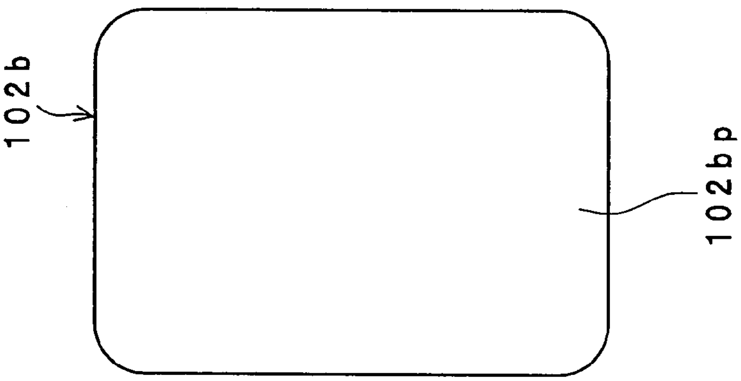
FIG. 25C is a plan view showing an outer side surface of the upper second housing portion 102*b* shown in FIG. 25A.

FIG. 25A shows a fourth implemental example applied to the preferred embodiments of the present invention, and is a perspective view seen from the inner side surface of the upper second housing portion 102*b* of the portable radio communication apparatus. FIG. 25B is a plan view showing the inner side surface of the upper second housing portion 102*b* shown in FIG. 25A. FIG. 25C is a plan view showing an outer side surface of the upper second housing portion 102*b* shown in FIG. 25A.

Referring to FIGS. 25A, 25B and 25C, the conductor layer 102*bm* is made of an electrically conductive material such as magnesium or zinc, and includes a rectangular slot 931, for example, along an end portion on the left side of the inner side surface in parallel to a vertical direction of the same apparatus. The conductor layer 102*bm* is formed on the inner side surface of a resin housing portion 102*bp* (including the screw reception portions 115). This leads to constituting the upper second housing portion 102*b*, and then, for example, electrically connecting the antenna element 112 with the conductor layer 102*bm*. In the fourth implemental example constituted as mentioned above, since the slot 931 is formed on the inner side surface of the upper second housing portion 102*b*, an electrical conductor having a plurality of electric lengths can be formed on the conductor layer 102*bm*, and further, there can be realized the antenna element 102A that has a plurality of resonance frequencies and that can cover a plurality of frequency bands. Alternatively, a slit having an open end may be formed in place of the slot 931 of FIGS. 25A and 25B.

Figures 26A, 26B, 26C:
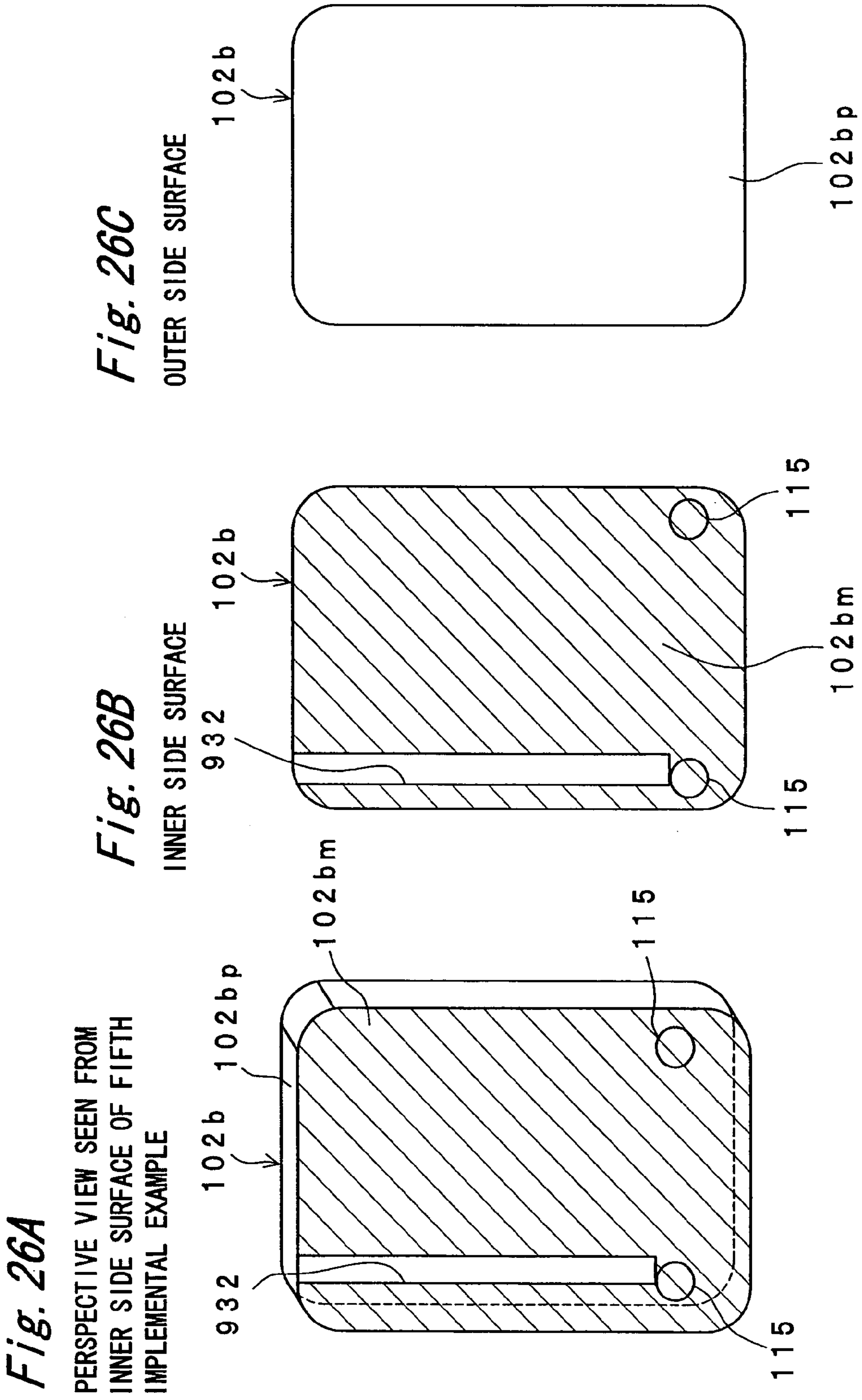
FIG. 26A shows a fifth implemental example applied to the preferred embodiments of the present invention, and is a perspective view seen from the inner side surface of the upper second housing portion 102*b* of the portable radio communication apparatus.
FIG. 26B is a plan view showing the inner side surface of the upper second housing portion 102*b* shown in FIG. 26A.
FIG. 26C is a plan view showing an outer side surface of the upper second housing portion 102*b* shown in FIG. 26A.

FIG. 26A shows a fifth implemental example applied to the preferred embodiments of the present invention, and is a perspective view seen from the inner side surface of the upper second housing portion 102*b* of the portable radio communication apparatus. FIG. 26B is a plan view showing the inner side surface of the upper second housing portion 102*b* shown in FIG. 26A. FIG. 26C is a plan view showing an outer side surface of the upper second housing portion 102*b* shown in FIG. 26A.

Referring to FIGS. 26A, 26B and 26C, the conductor layer 102*bm* is made of an electrically conductive material such as magnesium or zinc, and includes a rectangular slit 932, for example, along the end portion on the left side of the inner side surface in parallel to the vertical direction of the same apparatus and extending toward an upper end portion thereof. The conductor layer 102*bm* is formed on the inner side surface of a resin housing portion 102*bp* (including the screw reception portions 115). This leads to constituting the upper second housing portion 102*b*, and then, for example, electrically connecting the antenna element 112 with the conductor layer 102*bm*. In the fifth implemental example constituted as mentioned above, since the slit 932 is formed on the inner side surface of the upper second housing portion 102*b*, an electrical conductor having a plurality of electric lengths can be formed on the conductor layer 102*bm*, and further, there can be realized the antenna element 102A that has a plurality of resonance frequencies and that can cover a plurality of frequency bands. The slit 932 is formed to have a longitudinal length of a quarter of wavelength, and operates as a quarter-wave resonance element. Therefore, the slit 932 can be realized with half the length of the slot 931.

Figures 27A, 27B, 27C:
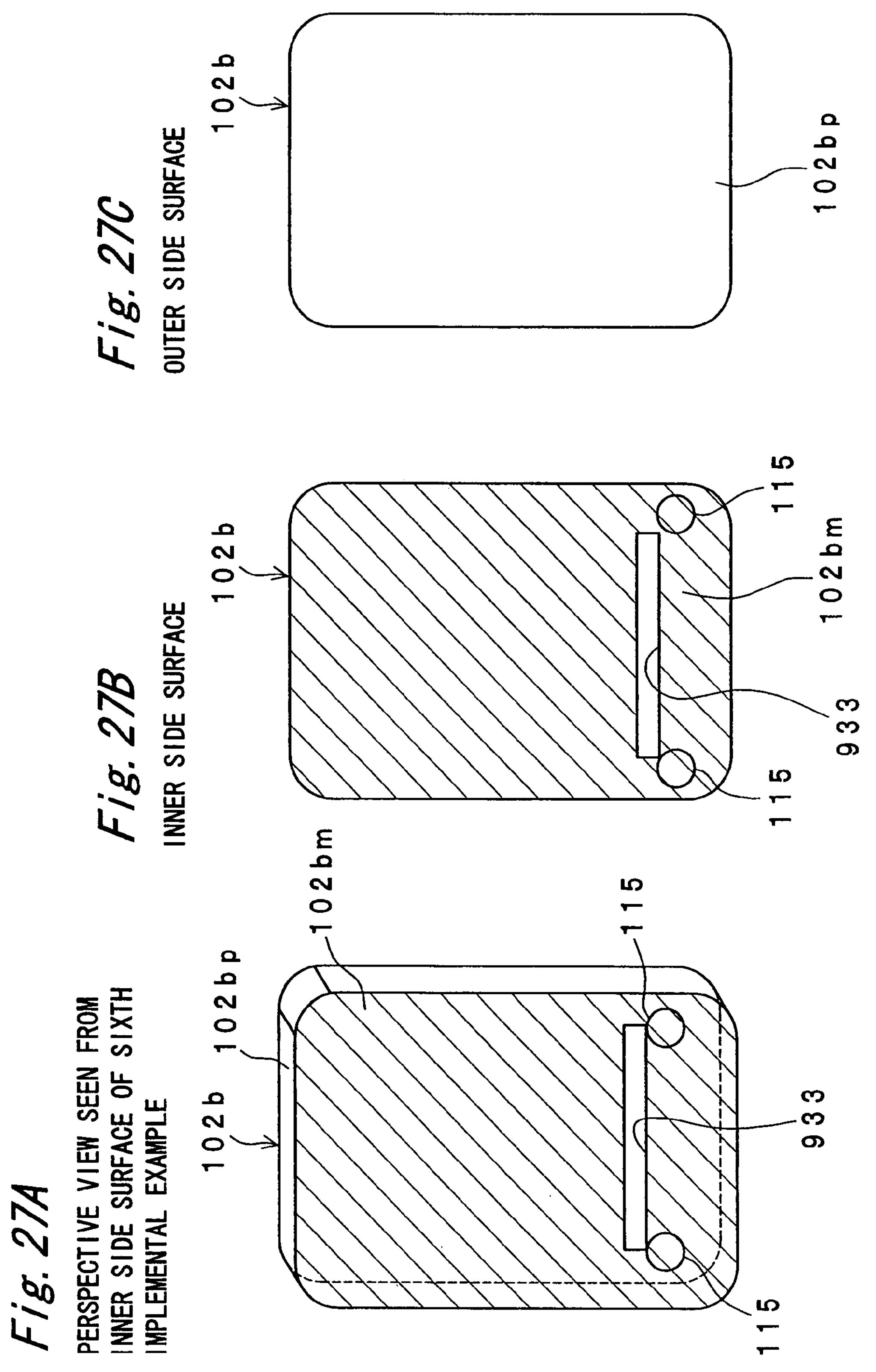
FIG. 27A shows a sixth implemental example applied to the preferred embodiments of the present invention, and is a perspective view seen from the inner side surface of the upper second housing portion 102*b* of the portable radio communication apparatus.
FIG. 27B is a plan view showing the inner side surface of the upper second housing portion 102*b* shown in FIG. 27A.
FIG. 27C is a plan view showing an outer side surface of the upper second housing portion 102*b* shown in FIG. 27A.

FIG. 27A shows a sixth implemental example applied to the preferred embodiments of the present invention, and is a perspective view seen from the inner side surface of the upper second housing portion 102*b* of the portable radio communication apparatus. FIG. 27B is a plan view showing the inner side surface of the upper second housing portion 102*b* shown in FIG. 27A. FIG. 27C is a plan view showing an outer side surface of the upper second housing portion 102*b* shown in FIG. 27A.

Referring to FIGS. 27A, 27B and 27C, the conductor layer 102*bm* made of an electrically conductive material such as magnesium or zinc and including a rectangular slot 933 extending, for example, along a lower end portion of the inner side surface in parallel to a lateral or horizontal direction of the same apparatus is formed on the inner side surface of the resin housing portion 102*bp* (including the screw reception portions 115). This leads to constituting the upper second housing portion 102*b*, and then, for example, electrically connecting the antenna element 112 with the conductor layer 102*bm*. In the sixth implemental example constituted as mentioned above, since the slot 933 is formed on the inner side surface of the upper second housing portion 102*b*, an electrical conductor having a plurality of electric lengths can be formed on the conductor layer 102*bm*, and further, there can be realized the antenna element 102A that has a plurality of resonance frequencies and that can cover a plurality of frequency bands. Further, since the horizontal slot 933 is formed, a horizontally polarized radio wave can be projected from the antenna element 102A. On the other hand, since a vertically polarized radio wave is projected from the antenna element 901, polarization diversity can be constituted by using these two antenna elements.

Figures 28A, 28B, 28C:
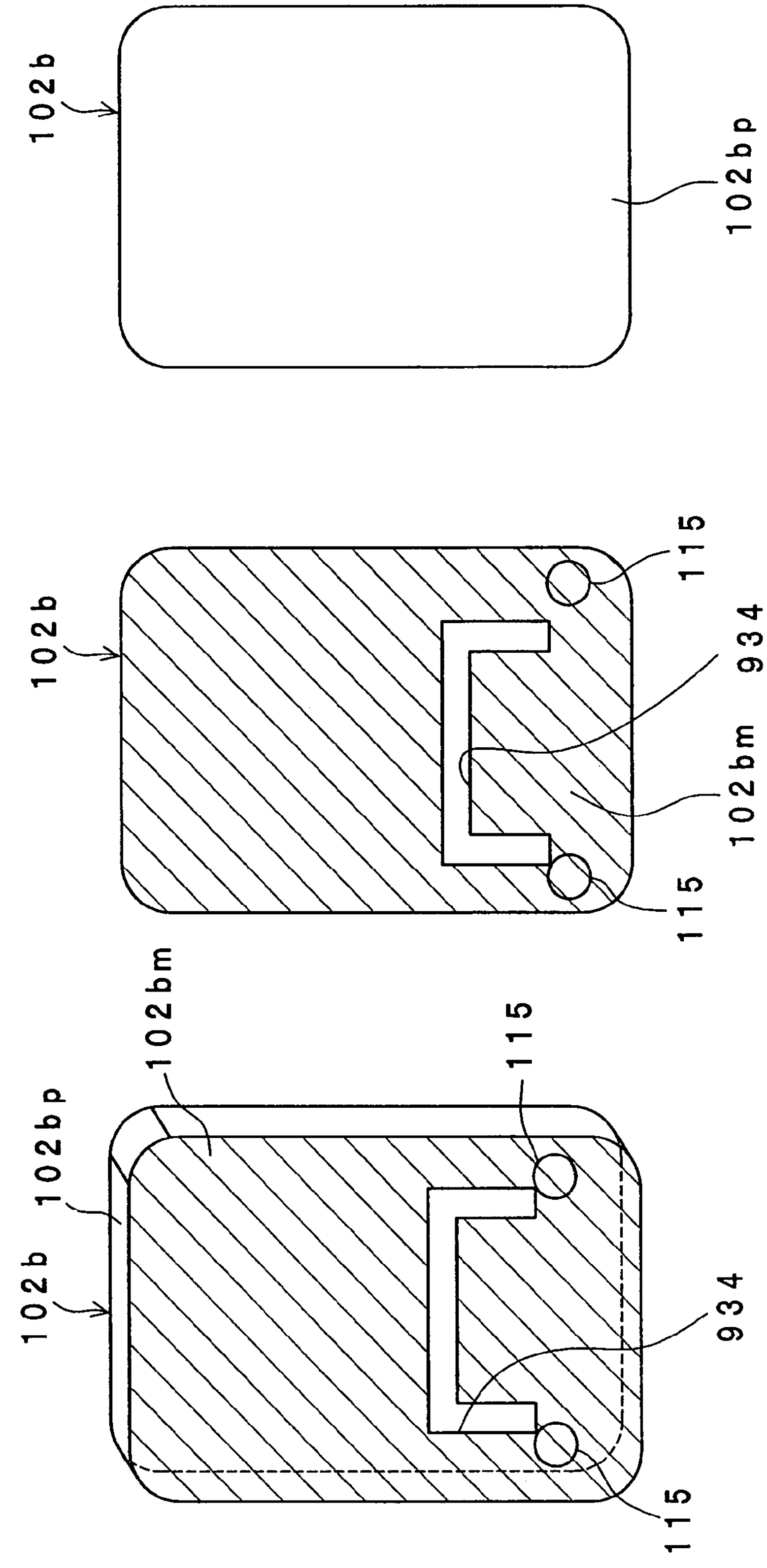
FIG. 28A shows a seventh implemental example applied to the preferred embodiments of the present invention, and is a perspective view seen from the inner side surface of the upper second housing portion 102*b* of the portable radio communication apparatus.
FIG. 28B is a plan view showing the inner side surface of the upper second housing portion 102*b* shown in FIG. 28A.
FIG. 28C is a plan view showing an outer side surface of the upper second housing portion 102*b* shown in FIG. 28A.

FIG. 28A shows a seventh implemental example applied to the preferred embodiments of the present invention, and is a perspective view seen from the inner side surface of the upper second housing portion 102*b* of the portable radio communication apparatus. FIG. 28B is a plan view showing the inner side surface of the upper second housing portion 102*b* shown in FIG. 28A. FIG. 28C is a plan view showing an outer side surface of the upper second housing portion 102*b* shown in FIG. 28A.

Referring to FIGS. 28A, 28B and 28C, the conductor layer 102*bm* made of an electrically conductive material such as magnesium or zinc and including an inverted-U-shaped rectangular slot 934, which is formed to extend, for example, along the lower end portion of the inner side surface in parallel to the lateral or horizontal direction of the same apparatus, and which has end portions extending downward is formed on the inner side surface of the resin housing portion 102*bp* (including the screw reception portions 115). This leads to constituting the upper second housing portion 102*b*, and then, for example, electrically connecting the antenna element 112 with the conductor layer 102*bm*. In the seventh implemental example constituted as mentioned above, since the slot 934 is formed on the inner side surface of the upper second housing portion 102*b*, an electrical conductor having a plurality of electric lengths can be formed on the conductor layer 102*bm*, and further, there can be realized the antenna element 102A that has a plurality of resonance frequencies and that can cover a plurality of frequency bands. Further, by changing a formation pattern of the conductor layer 102*bm*, the length of the slot 934 can be adjusted so as to adjust the respective resonance frequencies.

Figure 29A:
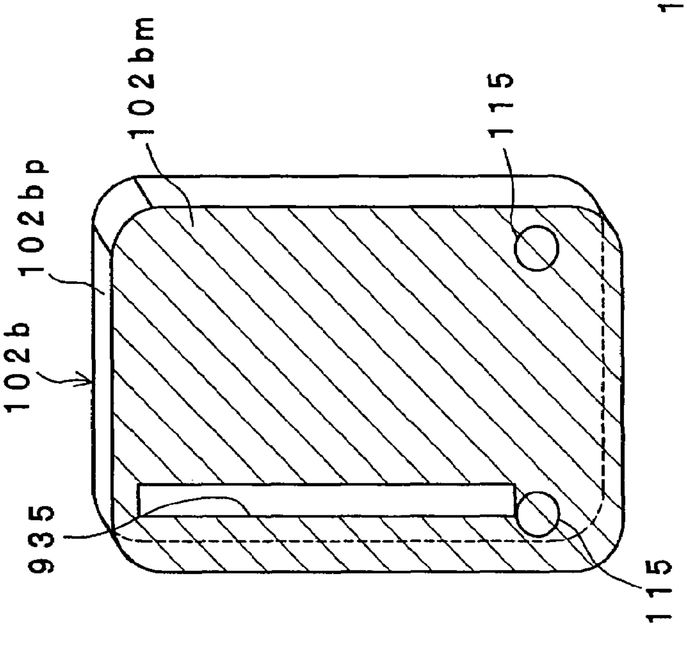
FIG. 29A shows an eighth implemental example applied to the preferred embodiments of the present invention, and is a perspective view seen from the inner side surface of the upper second housing portion 102*b* of the portable radio communication apparatus.
Figure 29B:
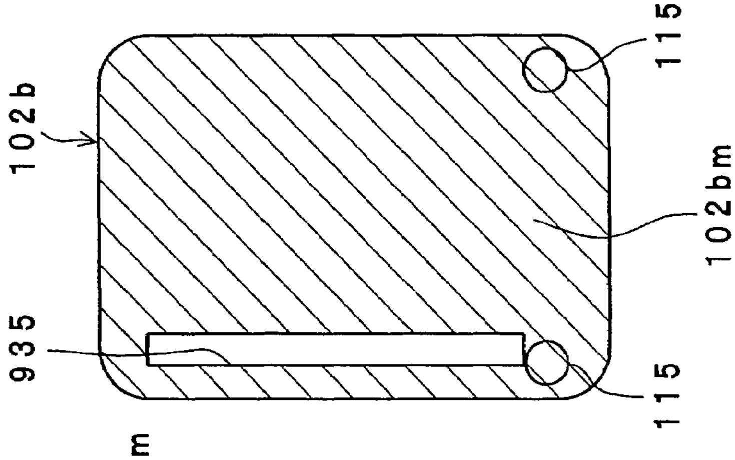
FIG. 29B is a plan view showing the inner side surface of the upper second housing portion 102*b* shown in FIG. 29A.
Figure 29C:
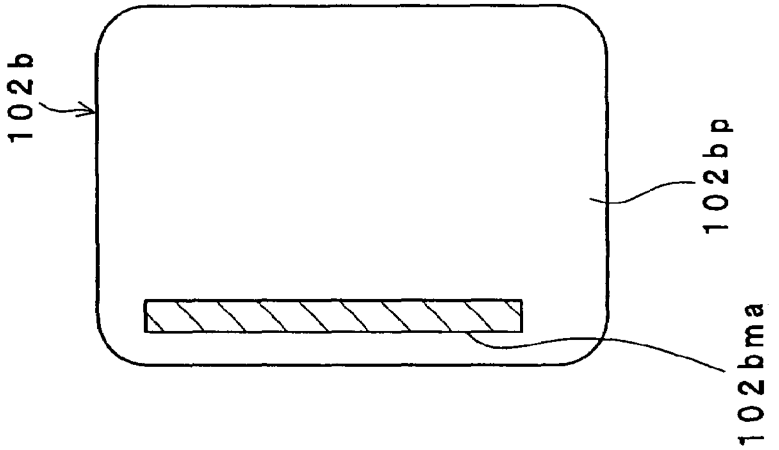
FIG. 29C is a plan view showing an outer side surface of the upper second housing portion 102*b* shown in FIG. 29A

FIG. 29A shows an eighth implemental example applied to the preferred embodiments of the present invention, and is a perspective view seen from the inner side surface of the upper second housing portion 102*b* of the portable radio communication apparatus. FIG. 29B is a plan view showing the inner side surface of the upper second housing portion 102*b* shown in FIG. 29A. FIG. 29C is a plan view showing an outer side surface of the upper second housing portion 102*b* shown in FIG. 29A.

Referring to FIGS. 29A, 29B and 29C, the conductor layer 102*bm* made of an electrically conductive material such as magnesium or zinc and including a rectangular slot 935 extending, for example, along the end portion on the left side of the inner side surface in parallel to the vertical direction of the same apparatus is formed on the inner side surface of the resin housing portion 102*bp* (including the screw reception portions 115). This leads to constituting the upper second housing portion 102*b*, and then, for example, electrically connecting the antenna element 112 with the conductor layer 102*bm*. In addition, an electrical conductor layer 102*bma* extending along the end portion on the left side of the outer side surface in parallel to the vertical direction is formed on the outer side surface of the upper second housing portion 102*b*, and this leads to formation of a parasitic element. In the eighth implemental example constituted as mentioned above, the antenna apparatus can project a radio wave through the slot 935, and further, the directivity characteristics of the antenna apparatus can be controlled using the conductor layer 102*bma* that serves as a parasitic element. Therefore, it is possible to project the radio wave so that the main beam thereof is directed, for example, in an opposite direction to a direction of the operator's body. Further, since the slot 935 is formed on the inner side surface of the upper second housing portion 102*b*, an electrical conductor having a plurality of electric lengths can be formed on the conductor layer 102*bm*, and further, there can be realized the antenna element 102A that has a plurality of resonance frequencies and that can cover a plurality of frequency bands.

Figures 30A, 30B, 30C:
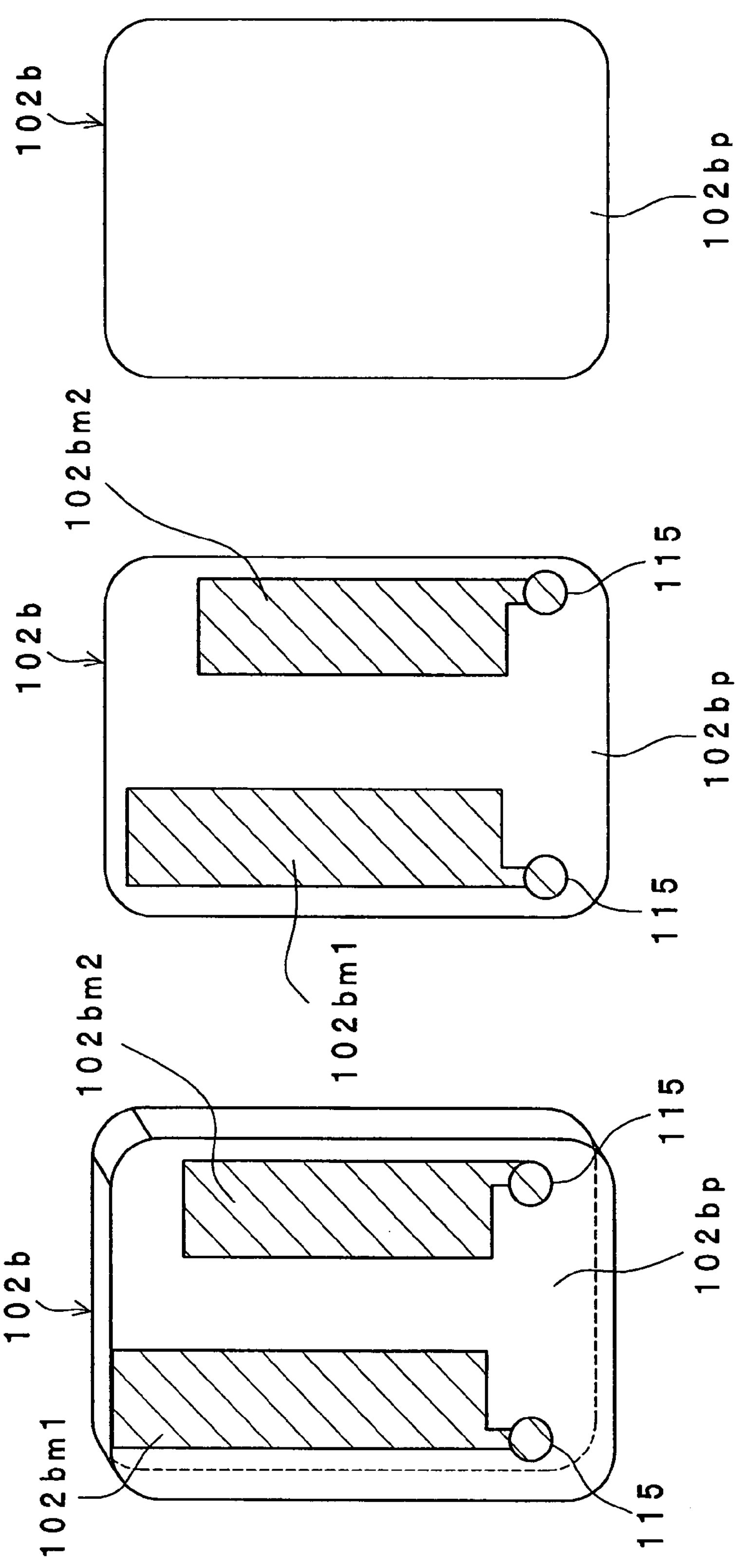
FIG. 30A shows a ninth implemental example applied to the preferred embodiments of the present invention, and is a perspective view seen from the inner side surface of the upper second housing portion 102*b* of the portable radio communication apparatus.
FIG. 30B is a plan view showing the inner side surface of the upper second housing portion 102*b* shown in FIG. 30A.
FIG. 30C is a plan view showing an outer side surface of the upper second housing portion 102*b* shown in FIG. 30A.

FIG. 30A shows a ninth implemental example applied to the preferred embodiments of the present invention, and is a perspective view seen from the inner side surface of the upper second housing portion 102*b* of the portable radio communication apparatus. FIG. 30B is a plan view showing the inner side surface of the upper second housing portion 102*b* shown in FIG. 30A. FIG. 30C is a plan view showing an outer side surface of the upper second housing portion 102*b* shown in FIG. 30A.

Referring to FIGS. 30A, 30B and 30C, rectangular electrical conductor layers 102*bm* 1 and 120*bm*2 are formed on the inner side surface of the resin housing portion 102*bp* (including the screw reception portions 115). The rectangular electrical conductor layer 102*bm* 1 made of an electrically conductive material such as magnesium or zinc is formed to extend, for example, along the end portion on the left side of the inner side surface in parallel to the vertical direction of the same apparatus. Further, the rectangular electrical conductor layer 102*bm* 2 (which is different in the longitudinal length from the rectangular electrical conductor layer 102*bm*1) made of an electrically conductive material such as magnesium or zinc is formed to extend, for example, along the end portion on the right side of the inner side surface in parallel to the vertical direction of the same apparatus. This leads to constituting the upper second housing portion 102*b*, and then, for example, electrically connecting the antenna element 112 with the conductor layers 102*bm*1 and 102*bm*2. In the ninth implemental example constituted as mentioned above, since the two conductor layers 102*bm*1 and 102*bm*2 are formed on the inner side surface of the upper second housing 102*b* to serve a part of the antenna element 102A, an electrical conductor having a plurality of electric lengths can be formed on the antenna element 102A, and further, there can be realized the antenna element 102A that has a plurality of resonance frequencies and that can cover a plurality of frequency bands. Further, by changing forming patterns of the respective conductor layers 102*bm*1 and 102*bm*2, the electric length of the antenna element 102A can be adjusted so as to adjust the respective resonance frequencies.

In the ninth implemental example, the portable radio communication apparatus may be constituted to selectively switch over the antenna element of the conductor layer 102*bm*1 and that of the conductor layer 102*bm*2. For example, the portable radio communication apparatus can be constituted to selectively switch over the two antenna elements so as to be able to attain a higher antenna gain depending on whether the portable radio communication apparatus is held in the operator's right hand or left hand.

Figure 31A:
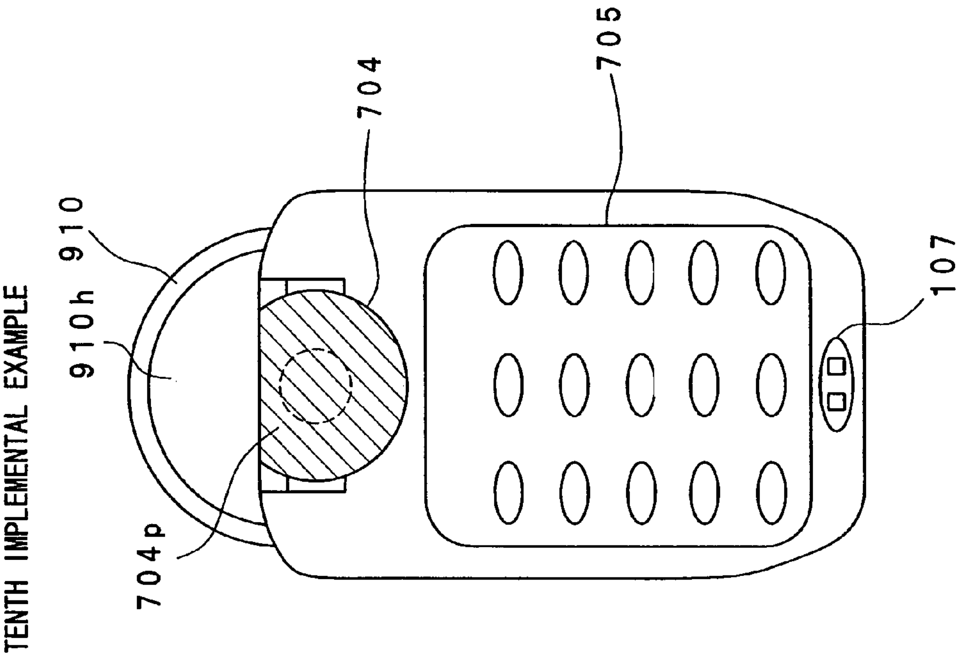
FIG. 31A shows a tenth implemental example applied to the fifth preferred embodiment of the present invention, and is a plan view showing that the upper housing 702 of the portable radio communication apparatus is detached.
Figure 31B:
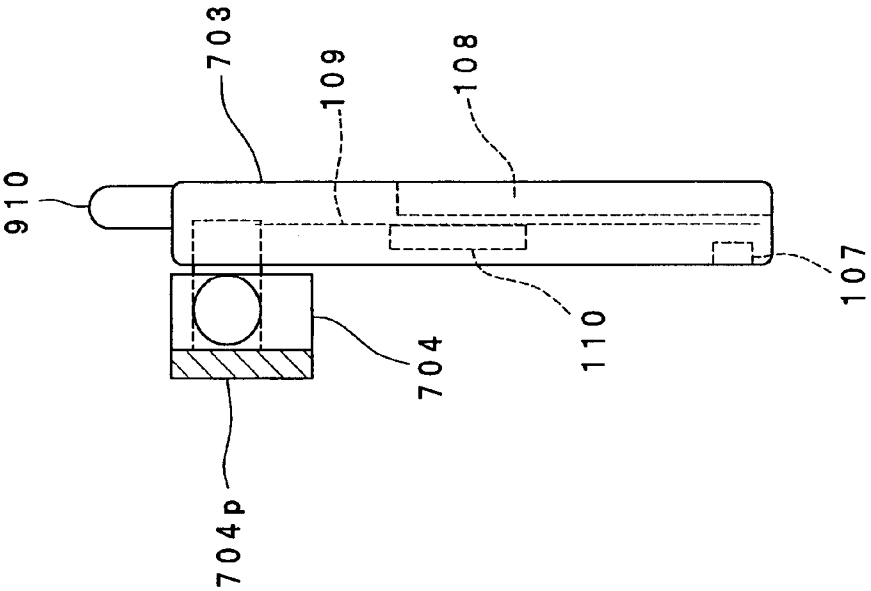
FIG. 31B is a side view of the portable radio communication apparatus shown in FIG. 31A.

FIG. 31A shows a tenth implemental example applied to the fifth preferred embodiment of the present invention, and is a plan view showing that the upper housing 702 of the portable radio communication apparatus is detached. FIG. 31B is a side view of the portable radio communication apparatus shown in FIG. 31A.

Referring to FIGS. 31A and 31B, a resin layer 704*p* is formed on a front surface of the biaxial hinge portion 704 made of an electrically conductive material. Namely, by forming the resin layer 704*p* on the portion with which the operator's head contacts during a telephone conversation, the SAR can be reduced. The resin layer 704*p* may be formed by using a magnetic material.

Sixth Preferred Embodiment

Figure 32B:
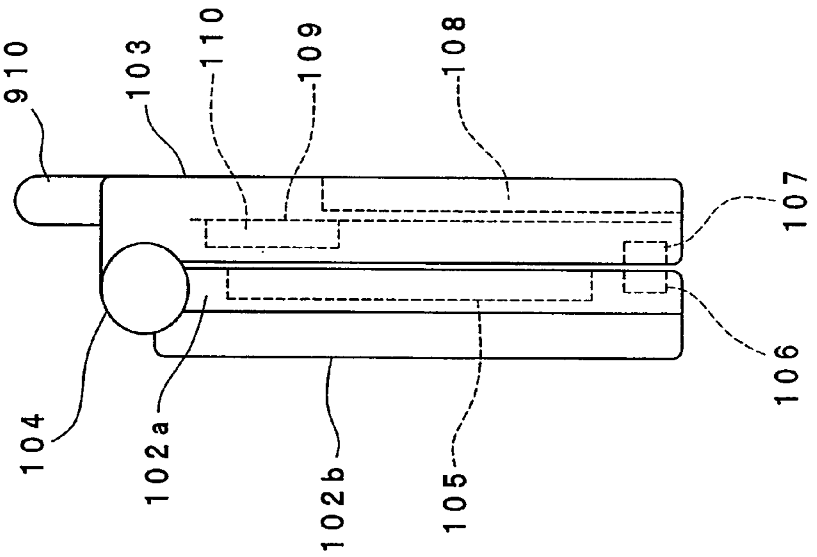
FIG. 32B is a side view of the portable radio communication apparatus shown in FIG. 32A.
Figure 32A:
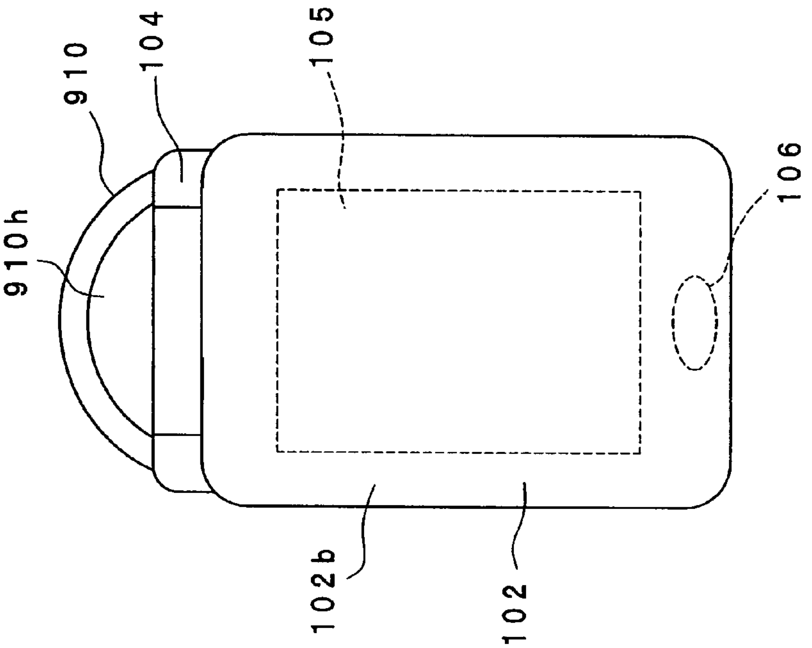
FIG. 32A is a plan view of the folding portable radio communication apparatus in a closed state thereof according to a sixth preferred embodiment of the present invention.
Figures 33A, 33B:
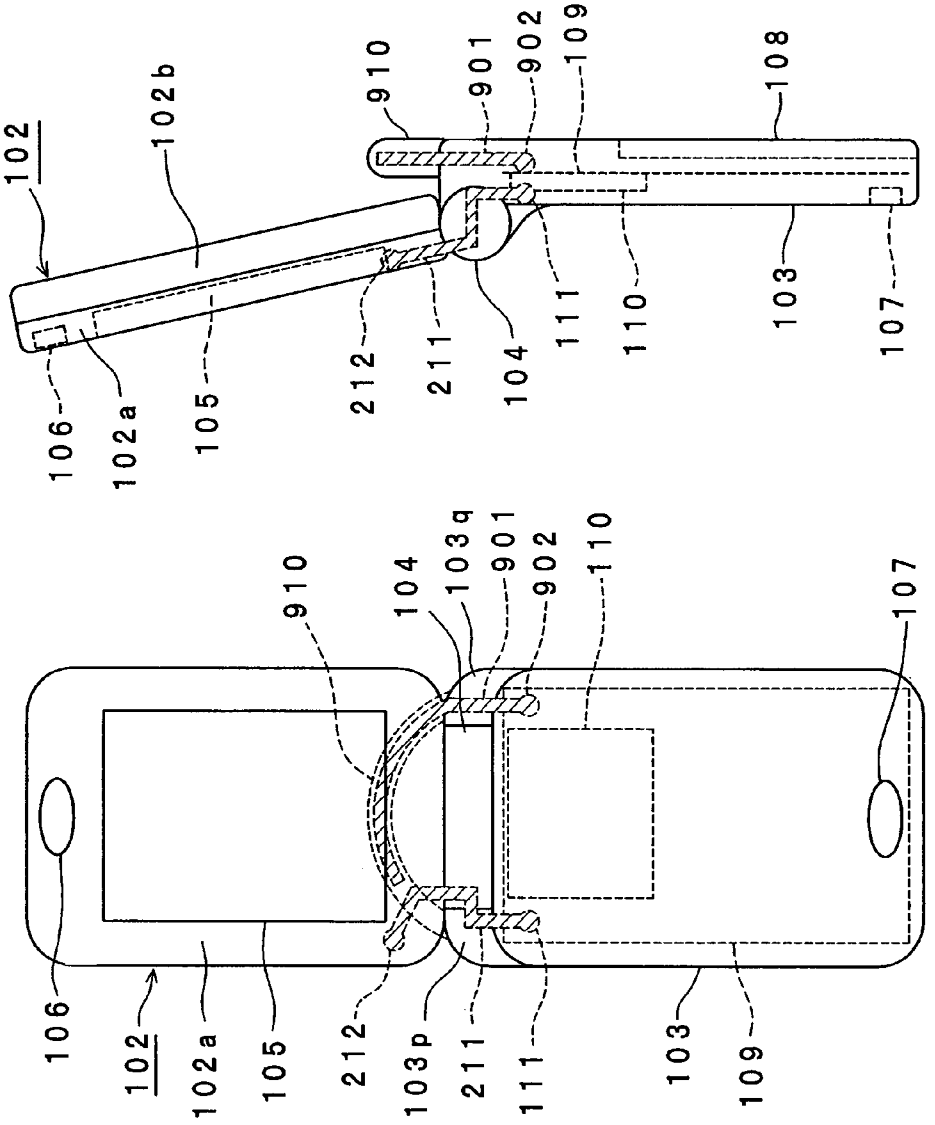
FIG. 33A a plan view of the portable radio communication apparatus shown in FIGS. 32A and 32B in an open state thereof.
FIG. 33B is a side view of the portable radio communication apparatus shown in FIG. 33A.

FIG. 32A is a plan view of a folding portable radio communication apparatus in a closed state thereof according to a sixth preferred embodiment of the present invention. FIG. 32B is a side view of the portable radio communication apparatus shown in FIG. 32A. FIG. 33A a plan view of the portable radio communication apparatus shown in FIGS. 32A and 32B in an open state. FIG. 33B is a side view of the portable radio communication apparatus shown in FIG. 33A.

The portable radio communication apparatus according to the sixth preferred embodiment is different from that according to the first preferred embodiment by including an antenna element 211, instead of the antenna element 112. The antenna element 211 is formed to extend from the connection point 111 of the radio communication circuit 110 toward a connection point 212 on the conductor portion of the upper first housing portion 102*a* through the inside of the lower housing 103, the inside of the hinge portion 104, and the inside of the upper first housing portion 102*a*. Therefore, the connection point 111 of the radio communication circuit 110 is electrically connected with the conductor portion of the upper first housing portion 120*a* through the antenna element 211.

Figure 34:
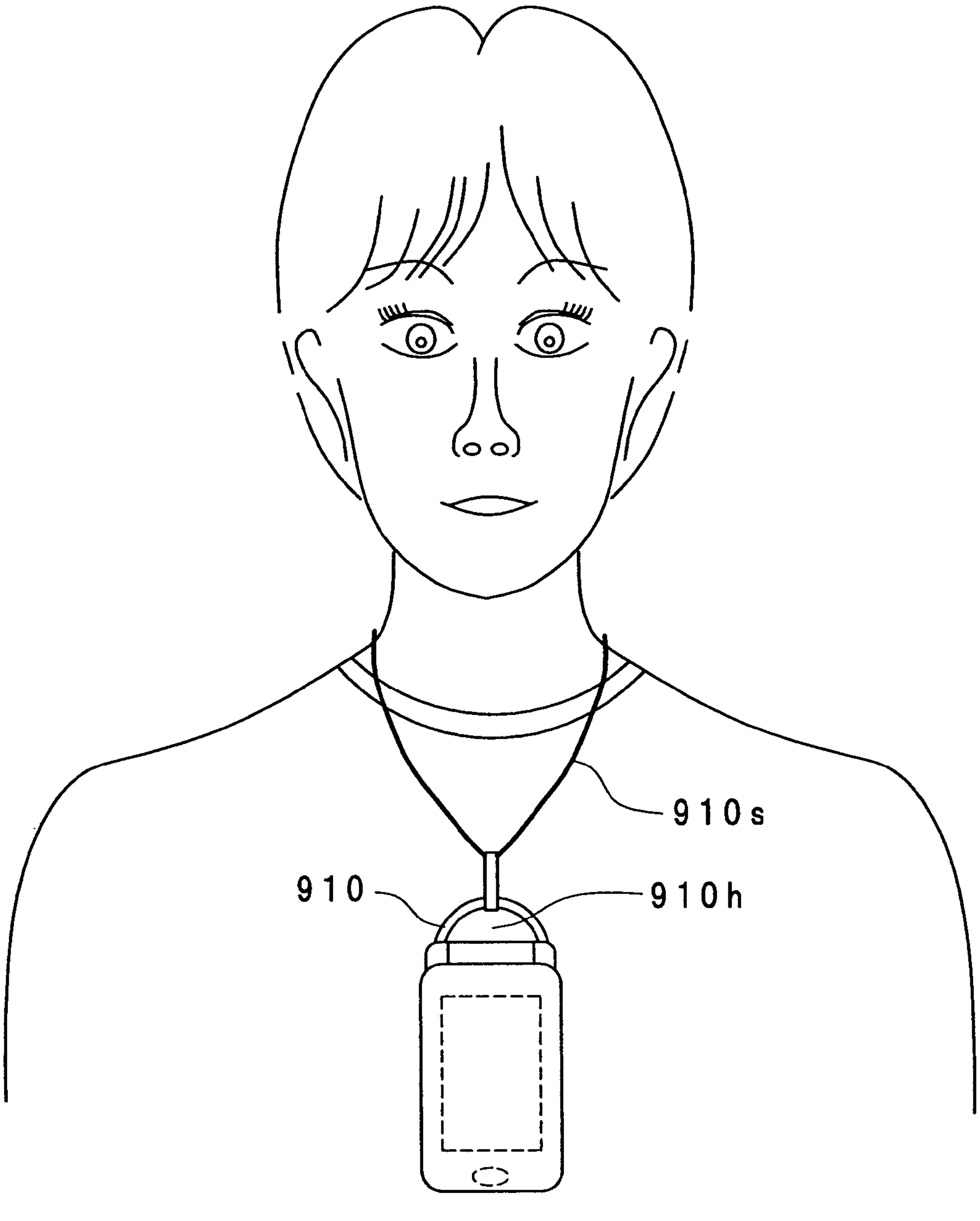
FIG. 34 is a front view which illustrate one example in which the portable radio communication apparatus shown in FIG. 32A is used while being suspended from a neck of a user.

The portable radio communication apparatus according to the sixth preferred embodiment constituted as mentioned above has the same functions and advantageous effects as those of the portable radio communication apparatus according to the first preferred embodiment. In addition, since the antenna element 901 is formed on the inside of the boom portion 910 and the conductor portion of the upper first housing portion 120*a* operates as the antenna element 102A, the portable radio communication apparatus can transmit and receive radio waves without employing the external antenna as required in the conventional portable radio communication apparatus. Therefore, it is possible to prevent the external antenna from being got stuck with an operator's pocket when taking out the same apparatus from his pocket. Further, since the penetrating hole 910*h* is formed in the space surrounded by the boom portion 910 and the lower housing 103, the portable radio communication apparatus can be suspended from a neck of a user with a strap 910*s* attached to the boom portion 910 as shown in FIG. 34. In this case, since it is unnecessary to use the external antenna as used in the conventional portable radio communication apparatus, the portable radio communication apparatus can be designed to be laterally symmetric, and further, the portable radio communication apparatus can be easily well balanced laterally or horizontally when the same apparatus is suspended from the neck of the user.

Figure 35B:
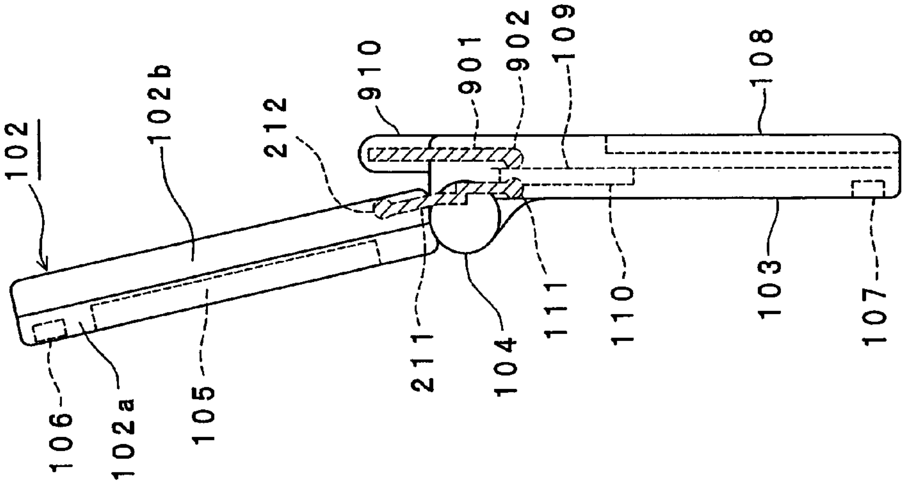
FIG. 35B is a side view of the portable radio communication apparatus shown in FIG. 35A.
Figure 35A:
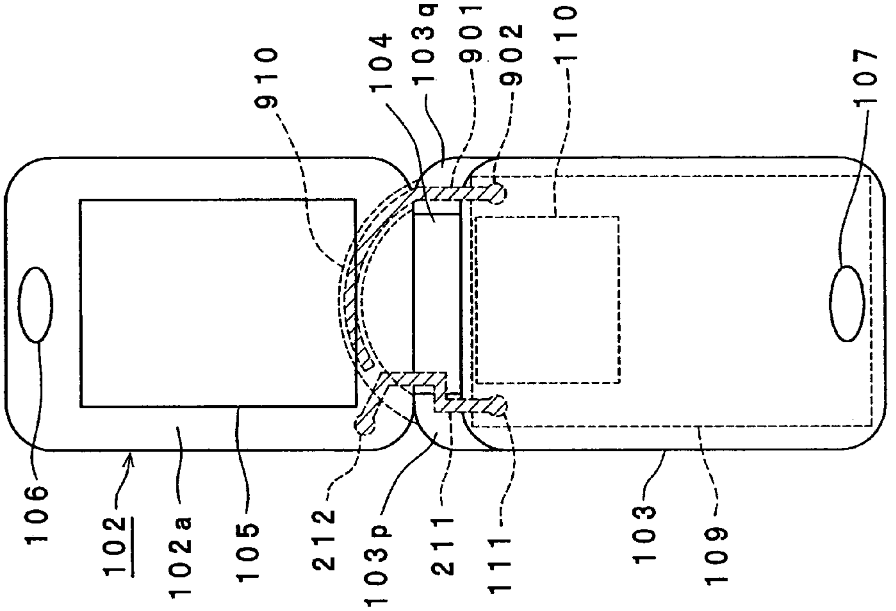
FIG. 35A is a plan view of a folding portable radio communication apparatus in a closed state thereof according to a modified preferred embodiment of the sixth preferred embodiment of the present invention.

FIG. 35A is a plan view of a folding portable radio communication apparatus in a closed state thereof according to a modified preferred embodiment of the sixth preferred embodiment of the present invention. FIG. 35B is a side view of the portable radio communication apparatus shown in FIG. 35A. The portable radio communication apparatus according to the modified preferred embodiment of the sixth preferred embodiment is different from that according to the sixth preferred embodiment, in that at least one part of the upper second housing portion 102*b* is made of an electrically conductive material, and in that the antenna element 211 is electrically connected with the conductor portion of the upper second housing portion 102*b* at the connection point 212. Namely, the antenna element 102A is constituted by using the antenna element 211 and the conductor portion of the upper second housing portion 102*b*. In this case, the upper first housing portion 102*a* may be made of either a resin material or an electrical conductive material. By thus constituting the portable radio communication apparatus, it is possible to set the distance between the antenna element 102A and the human head larger, and to suppress the decrease of the antenna gain during a telephone conversation.

In the present preferred embodiment, the antenna element 211 may be constituted by using a feeding line such as a coaxial cable.

Seventh Preferred Embodiment

Figure 36B:
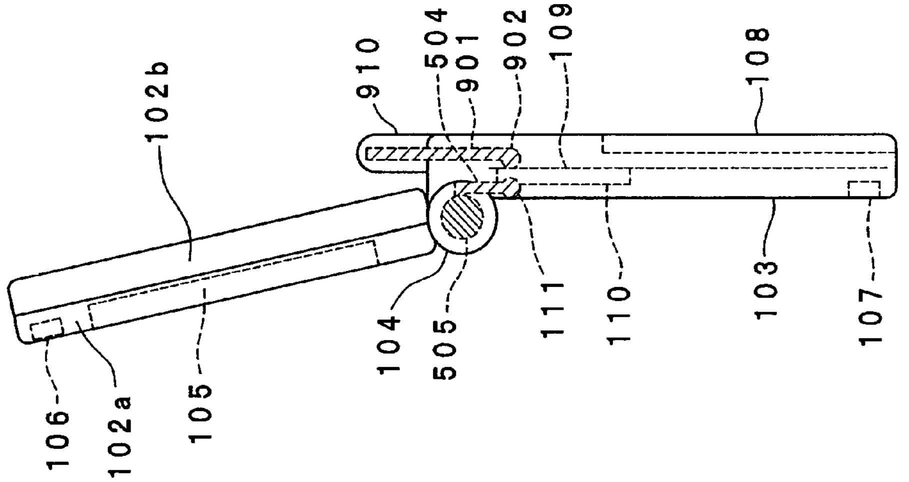
FIG. 36B is a side view of the portable radio communication apparatus shown in FIG. 36A.
Figure 36A:
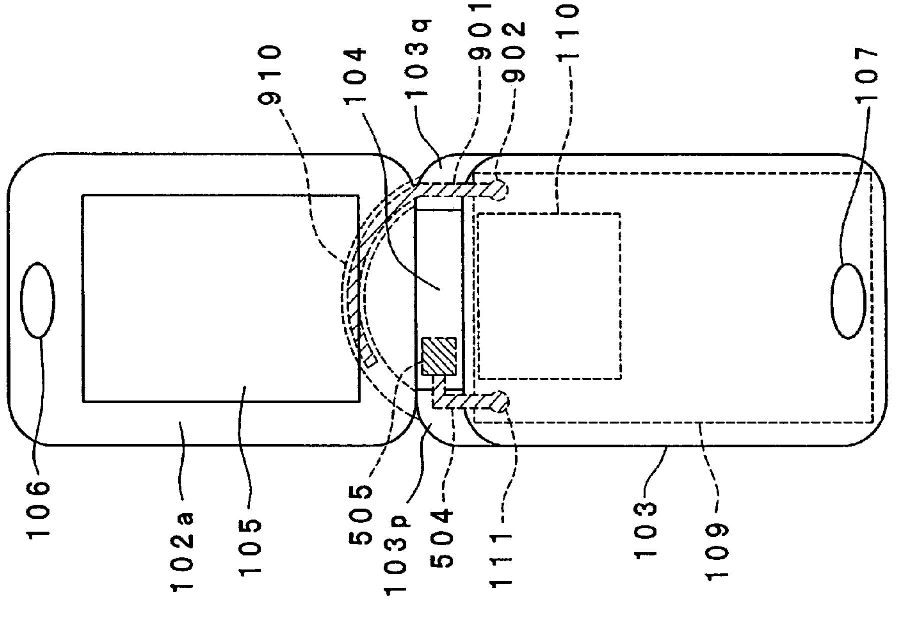
FIG. 36A is a plan view of a folding portable radio communication apparatus in an open state thereof according to a seventh preferred embodiment of the present invention.

FIG. 36A is a plan view of a folding portable radio communication apparatus in an open state thereof according to a seventh preferred embodiment of the present invention. FIG. 36B is a side view of the portable radio communication apparatus shown in FIG. 36A.

The portable radio communication apparatus according to the seventh preferred embodiment is different from that according to the third preferred embodiment, in that the fitting intrusive circular cylindrical member 505 connected with the antenna element 504 is inserted and fitted into the circular cylindrical portion of the hinge portion 104 made of an electrically conductive material which is coupled with the upper first housing portion 102*a*. By thus constituting the portable radio communication apparatus, the connection point 111 of the radio communication circuit 110 is electrically connected with the conductor portion of the upper first housing portion 102*a* through the antenna element 504, the fitting intrusive circular cylindrical member 505, and the hinge portion 104. Accordingly, the portable radio communication apparatus according to the seventh preferred embodiment has the same functions and advantageous effects as those of the portable radio communication apparatus according to the third preferred embodiment. In addition, in a manner different from that of the first preferred embodiment, it is unnecessary to extend the antenna element 504 toward the upper housing 102 through the inside of the hinge portion 104. Due to this, the thickness of the upper housing 102 can be made smaller and the diameter of the hinge portion 104 can be made smaller. Besides, the durability of the hinge portion 104 when the portable radio communication apparatus is opened or closed through the hinge portion 104 can be further improved.

In the present preferred embodiment, at least one part of the upper first housing portion 102*a* is made of an electrically conductive material. However, the present invention is not limited to this, and at least one part of the upper second housing portion 102*b* may be made of an electrically conductive material and the hinge portion 104 may be electrically connected with the upper second housing portion 102*b*. In this case, the antenna element 120A is constituted by using the antenna element 504, the fitting intrusive circular cylindrical member 505, the hinge portion 104, and the conductor portion of the upper second housing portion 102*b*. It is thereby possible to set the distance between the antenna element 102A and the human head larger during a telephone conversation, and to suppress the decrease of the antenna gain.

In the present preferred embodiment, the antenna element 504 may be constituted by using a feeding line such as a coaxial cable.

Eighth Preferred Embodiment

Figure 37B:
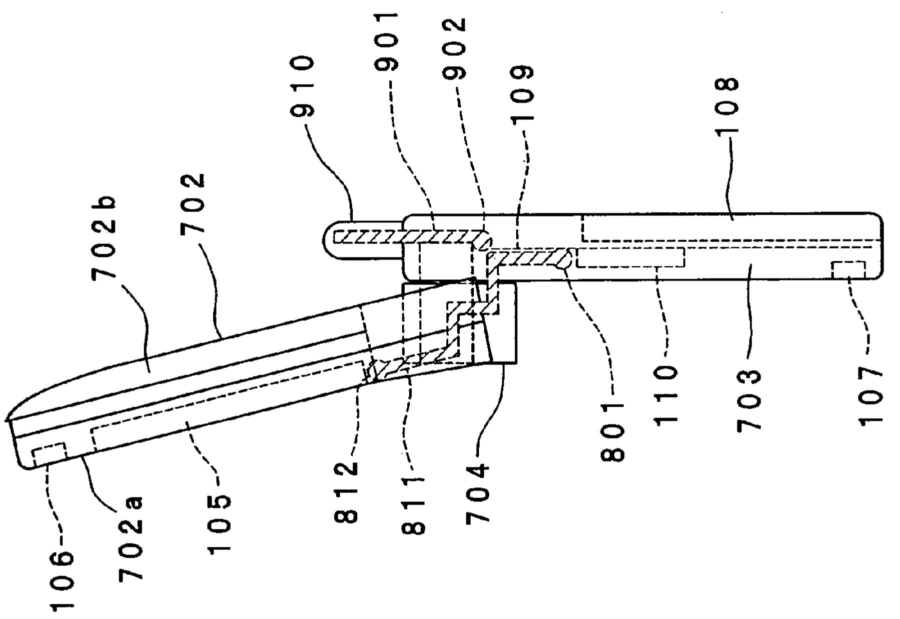
FIG. 37B is a side view of the portable radio communication apparatus shown in FIG. 37A.
Figure 37A:
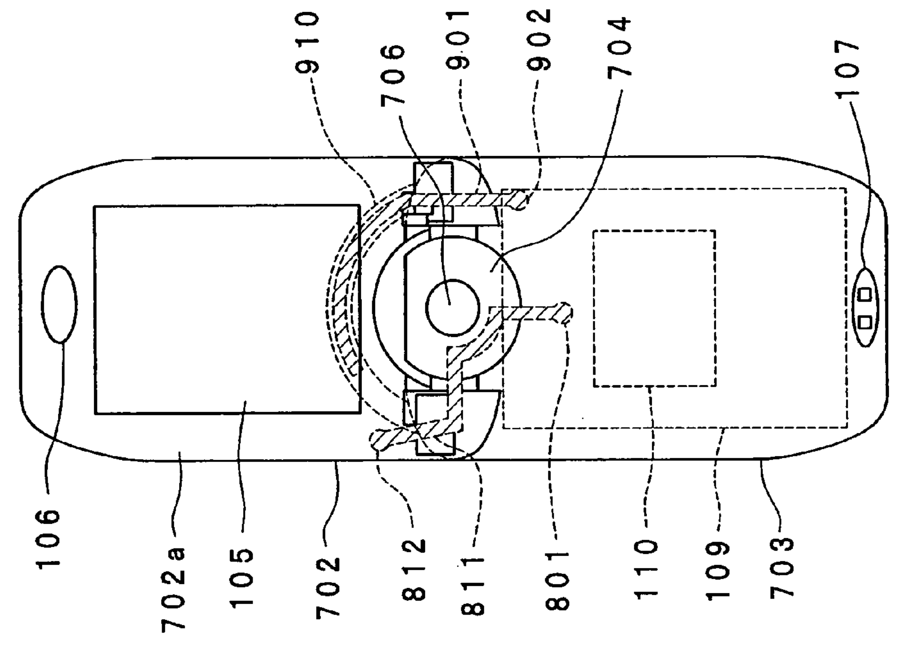
FIG. 37A is a plan view of a folding portable radio communication apparatus in a closed state thereof according to an eighth preferred embodiment of the present invention.

FIG. 37A is a plan view of a folding portable radio communication apparatus in a closed state thereof according to an eighth preferred embodiment of the present invention. FIG. 37B is a side view of the portable radio communication apparatus shown in FIG. 37A.

The portable radio communication apparatus according to the eighth preferred embodiment is different from that according to the fifth preferred embodiment shown in FIG. 17A, in that an antenna element 811 is formed to extend toward the conductor portion of the upper first housing portion 702*a* through the inside of the biaxial hinge portion 704, the inside of the upper second housing portion 702*b*, and the inside of the upper first housing portion 702*a*. Therefore, the connection point 801 of the radio communication circuit 110 is electrically connected with the upper first housing portion 702*a* at a connection point 812 through the antenna element 811. The portable radio communication apparatus according to the eighth preferred embodiment constituted as mentioned above has the same functions and advantageous effects as those of the portable radio communication apparatus according to the fifth preferred embodiment. By arranging the boom portion 910 of substantially laterally symmetric structure to be substantially laterally symmetric relative to the width direction or the horizontal direction of the portable radio communication apparatus, the design quality of the portable radio communication apparatus can be further improved. Even if the structure of the biaxial hinge portion 704 is larger, the design quality of the portable radio communication apparatus can be further improved.

The antenna element 811 can extend to be electrically insulated from the biaxial hinge portion 704, and the biaxial hinge portion 704 can operate as a parasitic element of the antenna element 102A or 901.

In the present preferred embodiment, the antenna element 811 is formed to extend into the upper first housing portion 702*a* and to be electrically connected with the conductor portion of the upper first housing portion 702*a*. However, the present invention is not limited to this, and the antenna element 811 may be connected with an electrical conductor portion of the biaxial hinge portion 704 connected with the conductor portion of the upper first housing portion 702*a*.

In the present preferred embodiment, the portable radio communication apparatus includes the antenna element 811. However, the present invention is not limited to this, and the portable radio communication apparatus may include the feeding line such as the coaxial cable, instead of the antenna element 811.

Figure 38B:
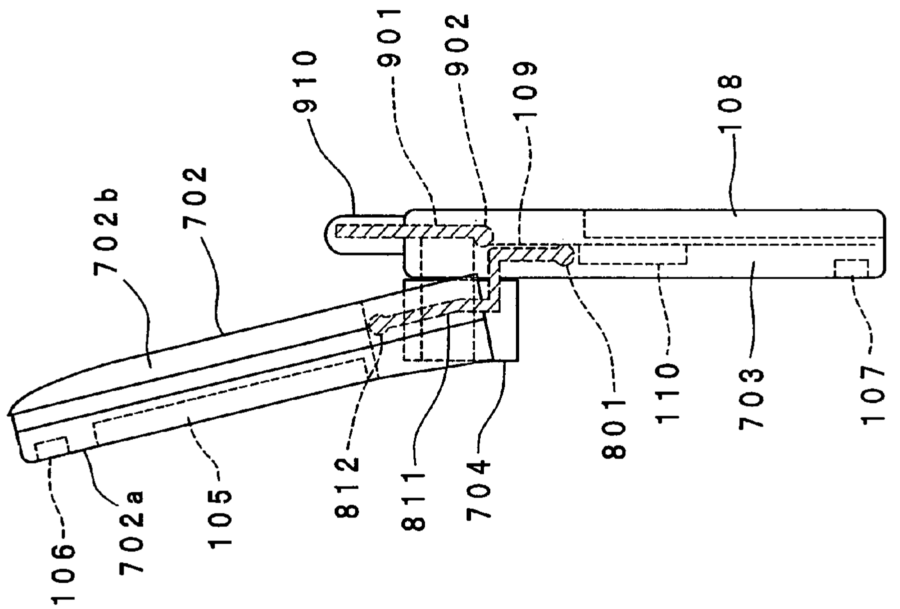
FIG. 38B is a side view of the portable radio communication apparatus shown in FIG. 39A.
Figure 38A:
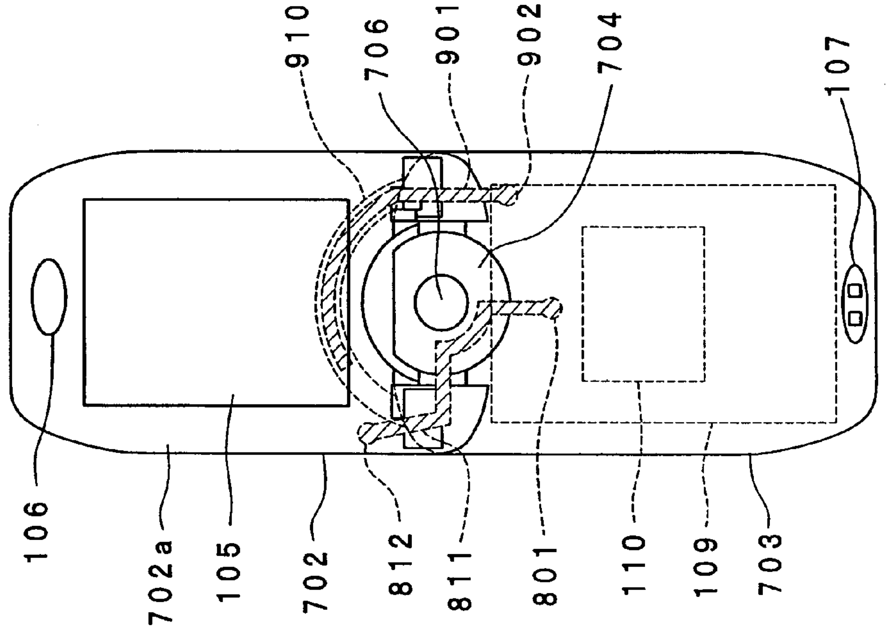
FIG. 38A is a plan view of a folding portable radio communication apparatus in an open state thereof according to a modified preferred embodiment of the eighth preferred embodiment of the present invention.

FIG. 38A is a plan view of a folding portable radio communication apparatus in an open state thereof according to a modified preferred embodiment of the eighth preferred embodiment of the present invention. FIG. 38B is a side view of the portable radio communication apparatus shown in FIG. 39A. The portable radio communication apparatus according to the modified preferred embodiment of the eighth preferred embodiment is different from that according to the eighth preferred embodiment, in that at least one part of the upper second housing portion 102*b* is made of an electrically conductive material, and in that the antenna element 811 is electrically connected with the upper second housing portion 102*b*. In this case, the antenna element 102A is constituted by using the antenna element 811 and the conductor portion of the upper second housing portion 702*b*. It is thereby possible to set the distance between the antenna element 102A and the human head larger during a telephone conversation, and to suppress the decrease of the antenna gain.

Ninth Preferred Embodiment

Figure 39B:
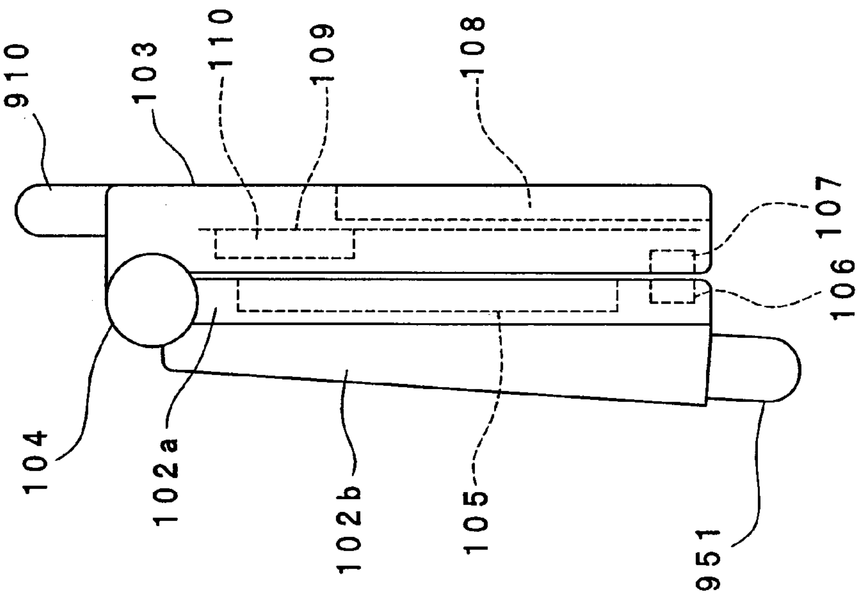
FIG. 39B is a side view of the portable radio communication apparatus shown in FIG. 39A.
Figure 39A:
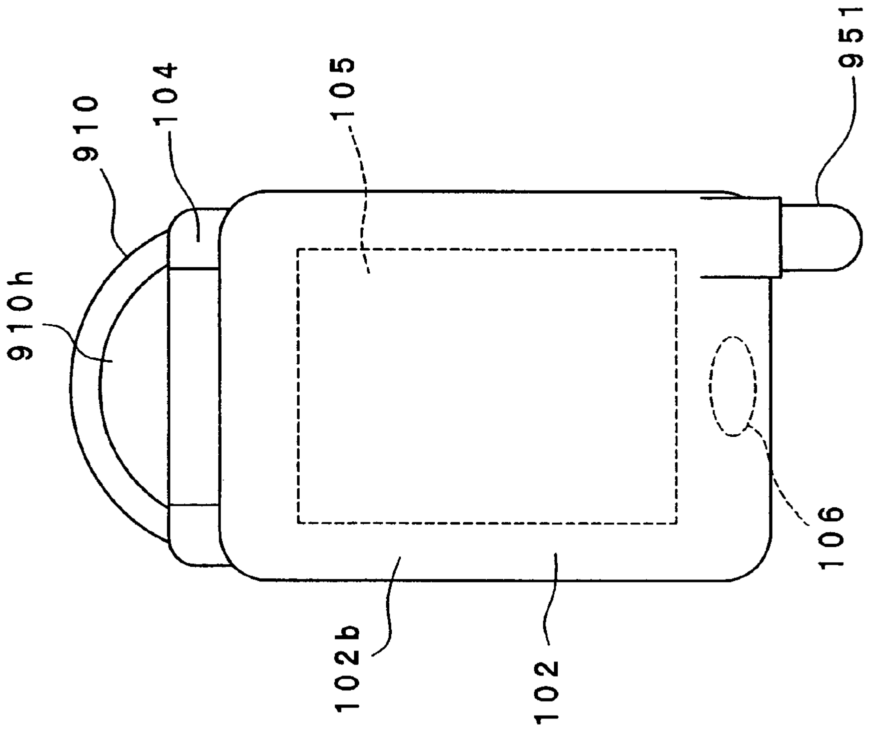
FIG. 39A is a plan view of a folding portable radio communication apparatus in a closed state thereof according to a ninth preferred embodiment of the present invention.

FIG. 39A is a plan view of a folding portable radio communication apparatus in a closed state thereof according to a ninth preferred embodiment of the present invention. FIG. 39B is a side view of the portable radio communication apparatus shown in FIG. 39A.

The portable radio communication apparatus according to the ninth preferred embodiment is different from the portable radio communication apparatus according to the first preferred embodiment, in that an external antenna 951 such as a quarter-wave whip antenna is provided in the vicinity of the end portion of the upper second housing portion 102*b* on the opposite side of the hinge portion 104 in a portable radio communication apparatus 1001, instead of the first antenna element 102A that includes the antenna element 112 and the upper first housing portion 102*a*. According to the portable radio communication apparatus constituted as mentioned above, by combining the external antenna 951 that has conventionally function as a main antenna in both closed and open states thereof, with the antenna element 901 (not shown in FIGS. 39A and 39B) provided in the boom portion 910, then a reception diversity processing can be executed which is improved as compared with the conventional portable radio communication apparatus. In addition, the degree of freedom for designing the same apparatus to satisfy required antenna characteristics can be further improved, the external antenna 951 smaller in size than that of the conventional portable radio communication apparatus can be employed, and the design quality can be further improved.

It is noted that the installment position of the external antenna element 951 described in the present preferred embodiment is just one example, and the installment position of the external antenna element 951 is not limited to this. For example, the external antenna 951 may be arranged in the lower housing 103. In this case, the boom portion 910 may be arranged in the upper housing 102.

In the above-mentioned embodiments described, the folding portable radio communication apparatus has been described. However, the present invention is not limited to this, and a straight portable radio communication apparatus may be provided in which the external antenna 851 and the antenna element 901 of the boom portion 910 may be combined.

Tenth Preferred Embodiment

Figure 40A:
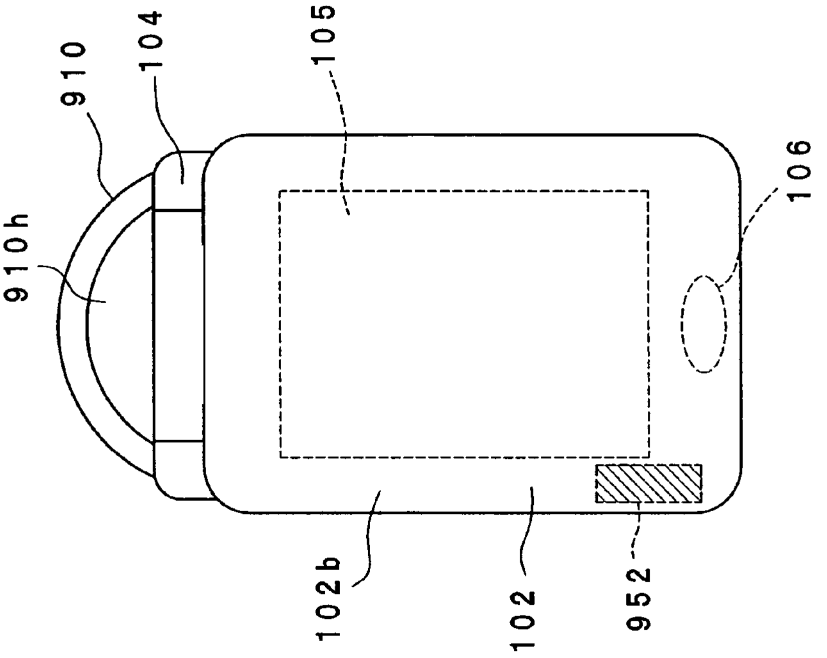
FIG. 40A is a plan view of a folding portable radio communication apparatus in a closed state thereof according to a tenth preferred embodiment of the present invention.
Figure 40B:
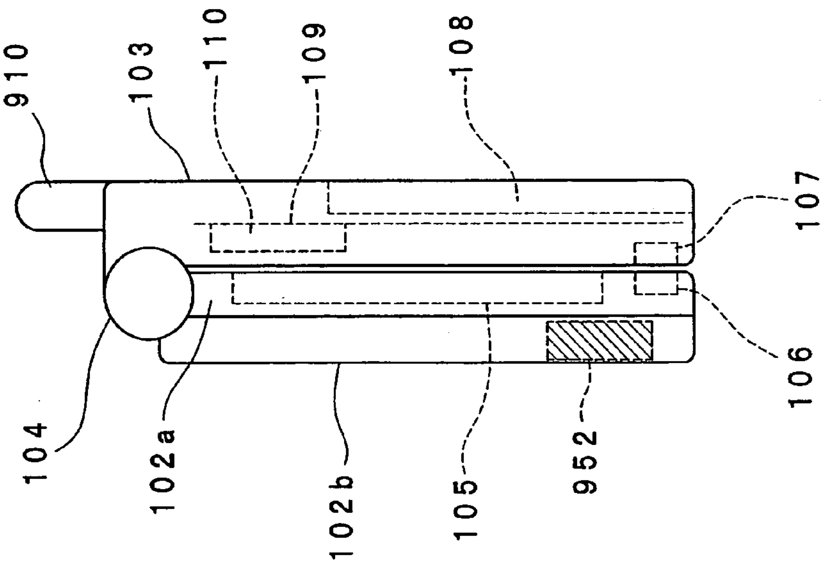
FIG. 40B is a side view of the portable radio communication apparatus shown in FIG. 40A.

FIG. 40A is a plan view of a folding portable radio communication apparatus in a closed state thereof according to a tenth preferred embodiment of the present invention. FIG. 40B is a side view of the portable radio communication apparatus shown in FIG. 40A.

The portable radio communication apparatus according to the tenth preferred embodiment is different from the portable radio communication apparatus according to the ninth preferred embodiment, in that a built-in antenna element 952 such as a ceramic chip antenna or the like is provided on the inside of the upper second housing portion 102*b* in the vicinity of the end portion of the upper second housing portion 102*b* on the opposite side of the hinge portion 104 of the portable radio communication apparatus, instead of the external antenna 951. In the present preferred embodiment, the built-in antenna element 952 and the antenna element 901 of the boom portion 910 (not shown in FIGS. 40A and 40B) constitute the antenna apparatus. By thus constituting the portable radio communication apparatus, it is possible to improve the design quality, and to improve the degree of freedom for designing the same apparatus.

Figure 41B:
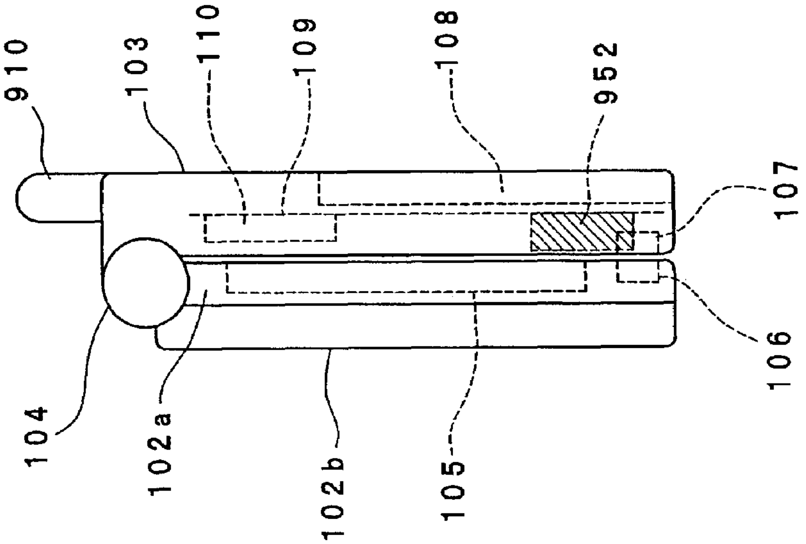
FIG. 41B is a side view of the portable radio communication apparatus shown in FIG. 41A.
Figure 41A:
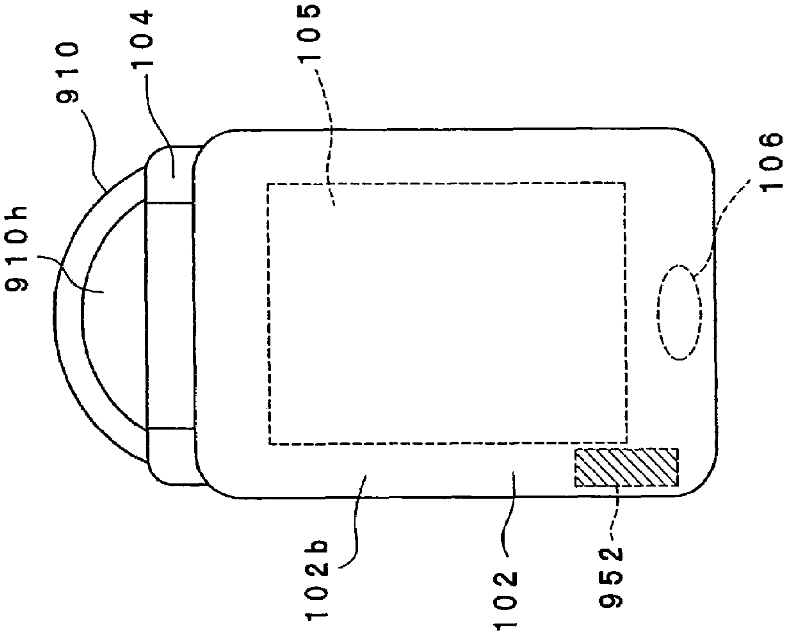
FIG. 41A is a plan view of a folding portable radio communication apparatus in a closed state thereof according to a modified preferred embodiment of the tenth preferred embodiment of the present invention.

FIG. 41A is a plan view of a folding portable radio communication apparatus in a closed state thereof according to a modified preferred embodiment of the tenth preferred embodiment of the present invention. FIG. 41B is a side view of the portable radio communication apparatus shown in FIG. 41A.

The portable radio communication apparatus according to the modified preferred embodiment of the tenth preferred embodiment is different from the portable radio communication apparatus according to the tenth preferred embodiment, in that the built-in antenna element 952 is arranged on the inside of the lower housing 103 in the vicinity of the end portion of the lower housing 103 on the opposite side of the hinge portion 104. The portable radio communication apparatus according to the modified preferred embodiment of the tenth preferred embodiment has the same functions and advantageous effects as those of the portable radio communication apparatus according to the tenth preferred embodiment. As the distance between the antenna element 901 of the boom portion 910 and the built-in antenna element 952 becomes smaller, the correlation coefficient between the antenna elements 901 and 952 becomes higher by coupling between the antenna elements 901 and 952. As a result, the advantageous effects such as the diversity reception may possibly be lowered. Therefore, it is preferable that the antenna elements 901 and 952 are away from each other by at least a quarter of wavelength.

In the present preferred embodiment and the modified preferred embodiment of the tenth preferred embodiment, an instance in which the portable radio communication apparatus includes one built-in antenna element 952 has been described. However, the present invention is not limited to this, and the portable radio communication apparatus may include a plurality of built-in antennas. In this case, it is possible to cover a plurality of frequency bands.

Eleventh Preferred Embodiment

Figure 42B:
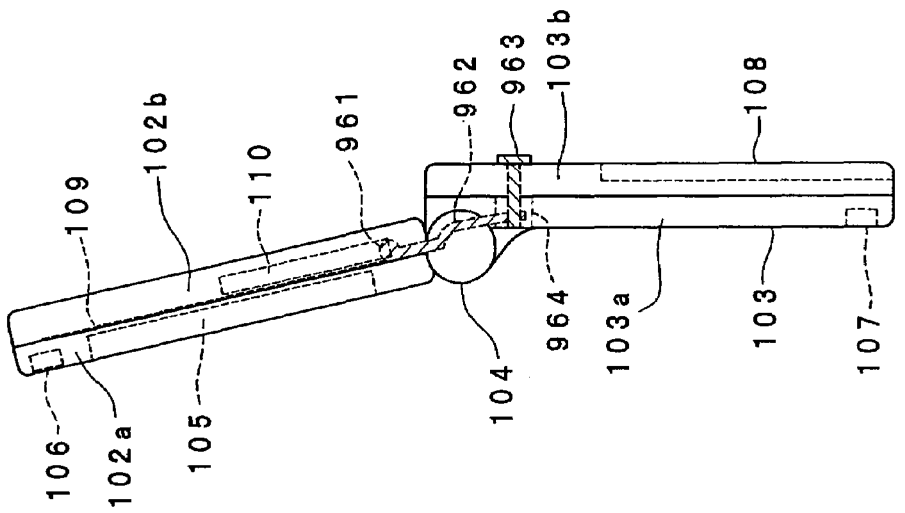
FIG. 42B is a side view of the portable radio communication apparatus shown in FIG. 42A.
Figure 42A:
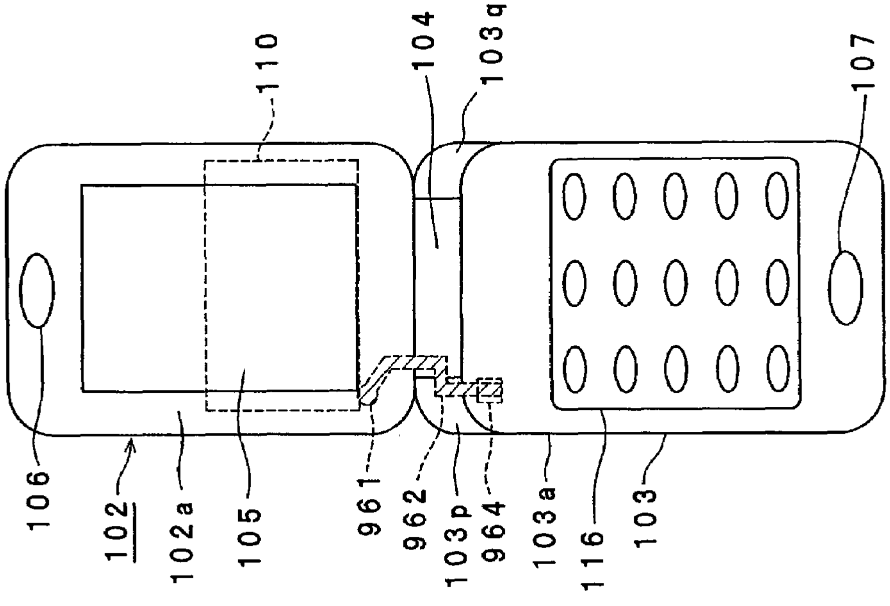
FIG. 42A is a plan view of a folding portable radio communication apparatus according to an eleventh preferred embodiment of the present invention.

FIG. 42A is a plan view of a folding portable radio communication apparatus according to an eleventh preferred embodiment of the present invention. FIG. 42B is a side view of the portable radio communication apparatus shown in FIG. 42A.

The portable radio communication apparatus according to the eleventh preferred embodiment is different from that according to the first preferred embodiment in the following points.

(a) The lower housing 103 is constituted so that the lower first housing portion 103*a* located on the inside thereof and the lower second housing portion 103*b* located on the outside thereof are bonded together while opposing to each other. At least one part of the lower second housing portion 103*b* is made of the same electrically conductive material as that of the upper first housing portion 102*a* of the first preferred embodiment (this portion made of an electrically conductive material will be referred to as a conductor portion hereinafter). The portable radio communication apparatus includes a key pad 116 in the central portion of the inner side surface of the lower first housing portion 103*a*.

(b) The portable radio communication apparatus includes the radio communication circuit 110 of the upper second housing portion 102*b*.

(c) The portable radio communication apparatus includes an antenna element 962 extending from the upper second housing portion 102*b* toward the lower second housing portion 103*b* through the hinge portion 104.

Referring to FIGS. 42A and 42B, the antenna element 962 is provided so as to extend from a connection point 961 (corresponding to the connection point 111 shown in FIG. 1A) that serves as a feeding point of the radio communication circuit 110 into the lower first housing portion 103*a* through the inside of the hinge portion 104, and one end of the antenna element 962 located on the inside of the lower first housing portion 103*a* is connected with a screw 963.

The screw 963 penetrates the lower housing 103 from the outer side surface of the lower second housing portion 103*b* toward a screw reception portion 964 of the lower first housing portion 103*b*, and this leads to that the lower housing 103 is screwed with the screw 963 and the screw 963 is electrically connected with the conductor portion of the lower second housing portion 103*b*. Accordingly, the connection point 961 of the radio communication circuit 110 is electrically connected with the conductor portion of the lower second housing portion 103*b* through the antenna element 962 and the screw 963. As a result, the antenna apparatus is constituted by using the antenna element 962 and the conductor portion of the lower second housing portion 103*b*. The portable radio communication apparatus constituted as mentioned above has the same functions and advantageous effects as those of the portable radio communication apparatus according to the first preferred embodiment.

In the present preferred embodiment, the antenna element 962 is connected with the conductor portion of the lower second housing portion 103*b*. However, the present invention is not limited to this, and at least one part of the lower first housing portion 103*a* may be made of an electrically conductive material, and the antenna element 962 may be connected with the conductor portion of the lower first housing portion 103*a*. Alternatively, the conductor portion may be formed on each of the lower first housing portion 103*a* and the lower second housing portion 103*b*.

Twelfth Preferred Embodiment

Figure 44B:
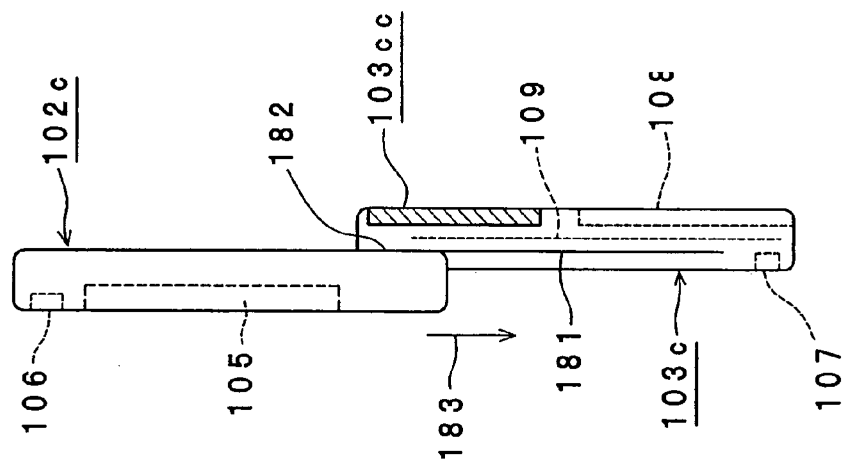
FIG. 44B is a side view of the portable radio communication apparatus shown in FIG. 44A.
Figure 44A:
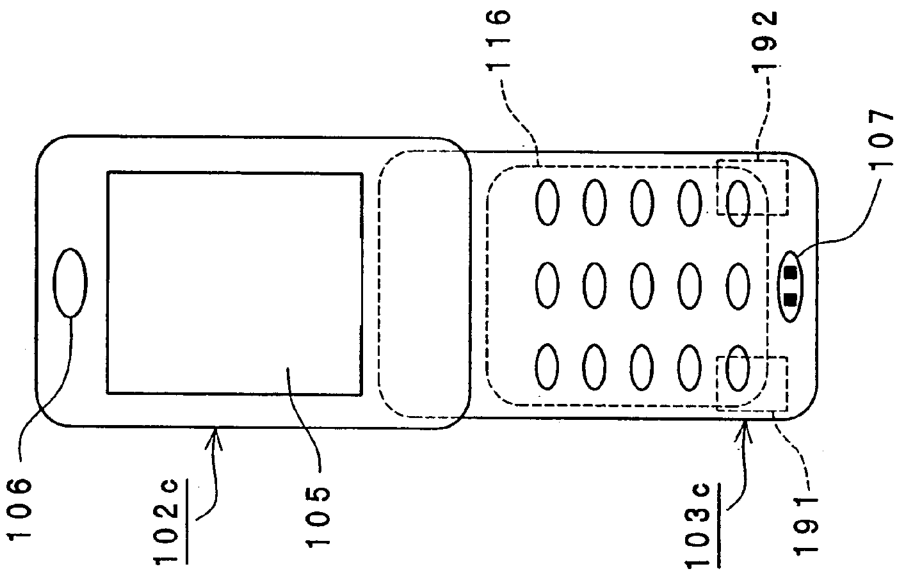
FIG. 44A is a plan view of a slide type portable radio communication apparatus according to a twelfth preferred embodiment of the present invention.

FIG. 44A is a plan view of a slide type portable radio communication apparatus according to a twelfth preferred embodiment of the present invention. FIG. 44B is a side view of the portable radio communication apparatus shown in FIG. 44A.

Referring to FIGS. 44A and 44B, the portable radio communication apparatus according to the present preferred embodiment includes an upper housing 102*c*, a lower housing 103*c*, and a sliding mechanism. The sliding mechanism is constituted so that two sliding protrusions 182 formed on a rear surface of the upper housing 102*c* are fitted into slide grooves 181 formed on both side surfaces of the lower housing 130*c* in a longitudinal direction thereof, respectively, and so that the upper housing 102*c* is slidable along the longitudinal direction thereof in a direction indicated by an arrow 183. As shown in FIGS. 44A and 44B, when the upper housing 102*c* is located on the upper side of the sliding mechanism, a keypad 116 of the lower housing 103*c* appears and is made operable by the user. On the other hand, when the upper housing 102*c* is located on the lower side of the sliding mechanism, the keypad 116 of the lower housing 103*c* is covered with the upper housing 102*c* and is made inoperable by the user. At that time, the upper housing 102*c* and the lower housing 103*c* are integrated with each other at a minimum occupied area, and the integrated housings become similar in a form to a straight type portable radio communication apparatus which will be described later. Further, a conductor layer 103*c* c made of an electrically conductive material is formed on a top portion of a rear surface of the lower housing 103*c*, and used as an antenna element 103A. In addition, built-in antenna elements 191 and 192 each constructed by, for example, a chip antenna are included internally in left and right end portions of a lower portion of the lower housing 103*c*, respectively. Preferably, at least two of the three antenna elements 103A, 191, and 192 are formed, and transmission diversity and reception diversity are performed using the at least two antenna elements.

Figure 45B:
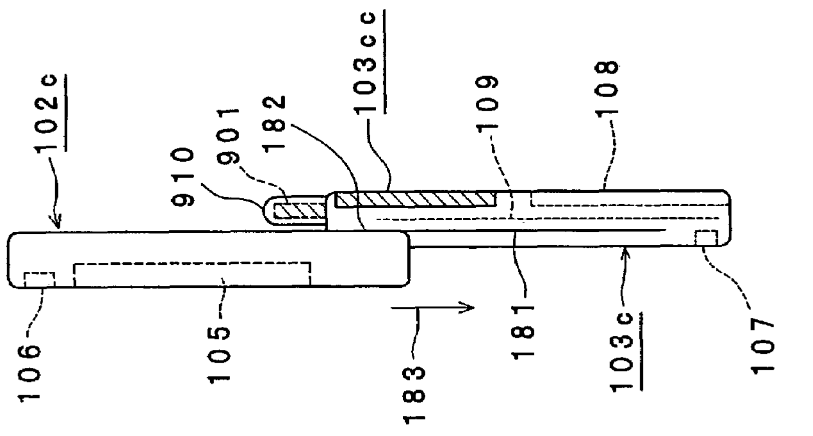
FIG. 45B is a side view of the portable radio communication apparatus shown in FIG. 45A.
Figure 45A:
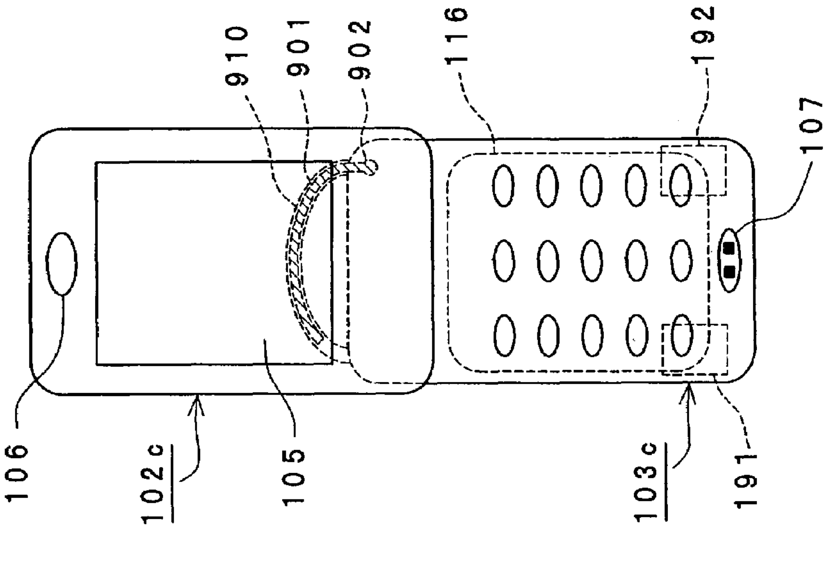
FIG. 45A is a plan view of a slide type portable radio communication apparatus according to a modified preferred embodiment of the twelfth preferred embodiment of the present invention.

FIG. 45A is a plan view of a slide type portable radio communication apparatus according to a modified preferred embodiment of the twelfth preferred embodiment of the present invention. FIG. 45B is a side view of the portable radio communication apparatus shown in FIG. 45A.

Referring to FIGS. 45A and 45B, the portable radio communication apparatus according to the present modified preferred embodiment is characterized, as compared with that of the twelfth preferred embodiment, in that the boom portion 910 including therein the antenna element 901 connected with the connection point 902 is coupled with both edges of the upper end surface of the lower housing 103*c*.

The characteristic constitutions of the portable radio communication apparatuses according to the first to eleventh preferred embodiments and their modified preferred embodiments may be applied to the slide type portable radio communication apparatuses according to the twelfth preferred embodiment and the modified preferred embodiment of the twelfth preferred embodiment.

Thirteenth Preferred Embodiment

Figures 46A, 46B, 46C:
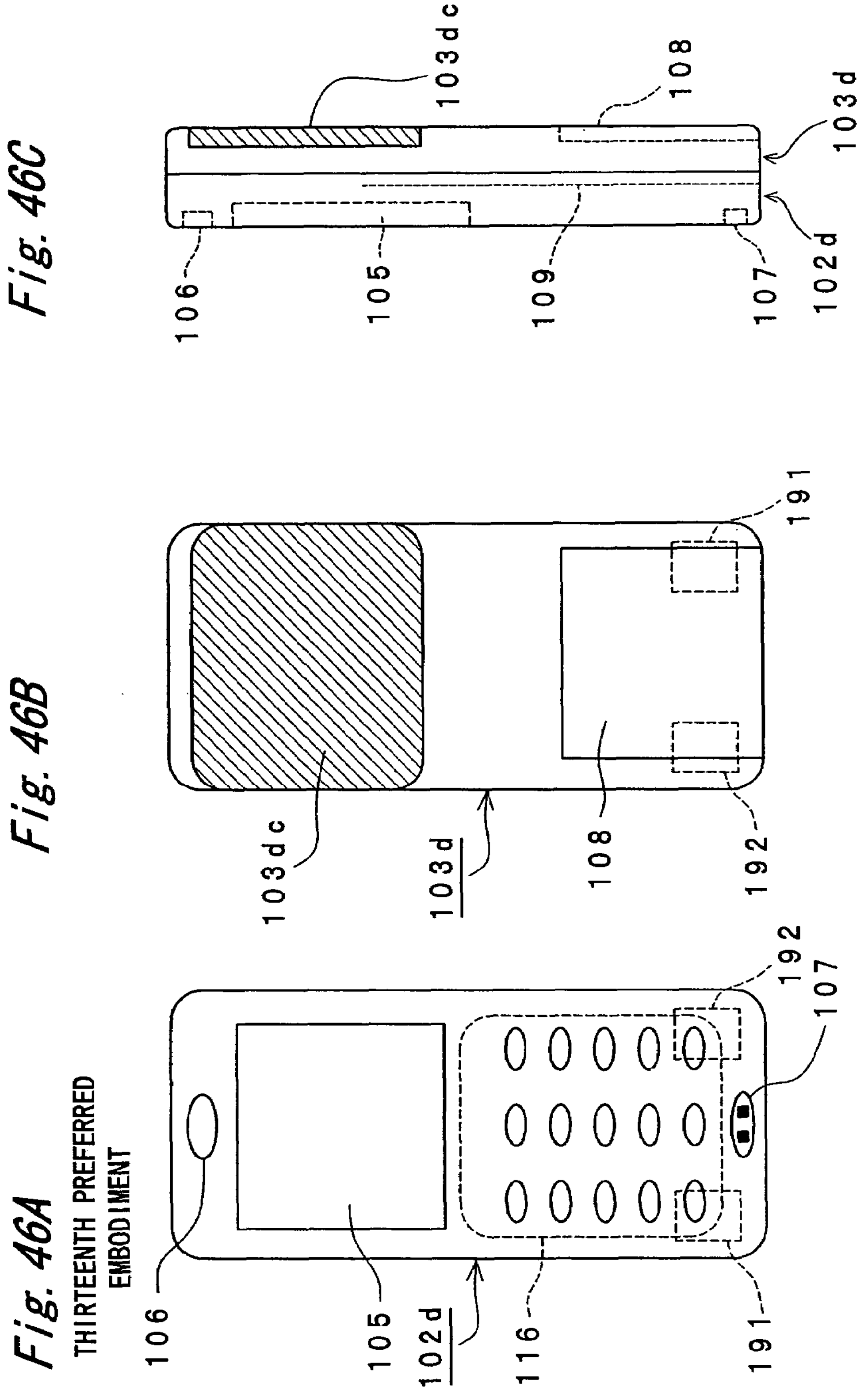
FIG. 46A is a plan view of a straight type portable radio communication apparatus according to a thirteenth preferred embodiment of the present invention.
FIG. 46B is a rear view of the portable radio communication apparatus shown in FIG. 46A.
FIG. 46C is a side view of the portable radio communication apparatus shown in FIG. 46A.

FIG. 46A is a plan view of a straight type portable radio communication apparatus according to the thirteenth preferred embodiment of the present invention. FIG. 46B is a rear view of the portable radio communication apparatus shown in FIG. 46A. FIG. 46C is a side view of the portable radio communication apparatus shown in FIG. 46A.

Referring to FIGS. 46A, 46B, and 46C, the portable radio communication apparatus according to the present preferred embodiment is a straight type portable radio communication apparatus which includes an upper housing 102*d* and a lower housing 103_d_ that are bonded to each other. For example, a conductor layer 103_dc_ made of an electrically conductive material is formed on an upper portion of a rear surface of the lower housing 103_d_, and is used as the antenna element 103A. In addition, the built-in antenna elements 191 and 192 each constructed by, for example, a chip antenna are included in left and right end portions of a lower portion of the lower housing 103_d_, respectively. Preferably, at least two of the three antenna elements 103A, 191, and 192 are formed, and transmission diversity and reception diversity are performed using the at least two antenna elements.

Figure 47C:
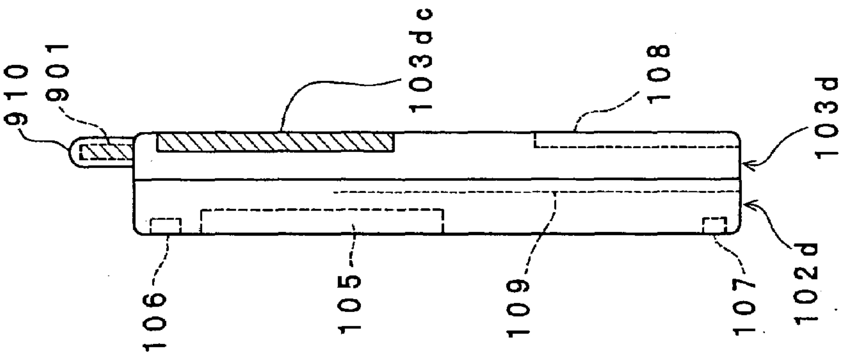
FIG. 47C is a side view of the portable radio communication apparatus shown in FIG. 47A.
Figure 47B:
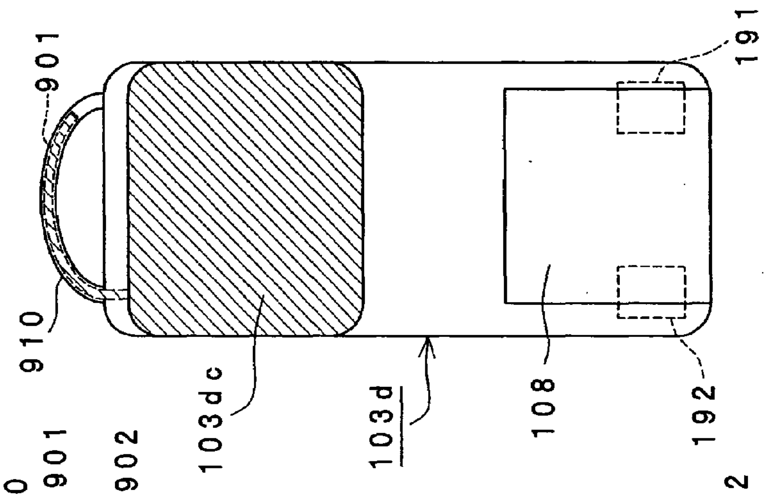
FIG. 47B is a rear view of the portable radio communication apparatus shown in FIG. 47A.
Figure 47A:
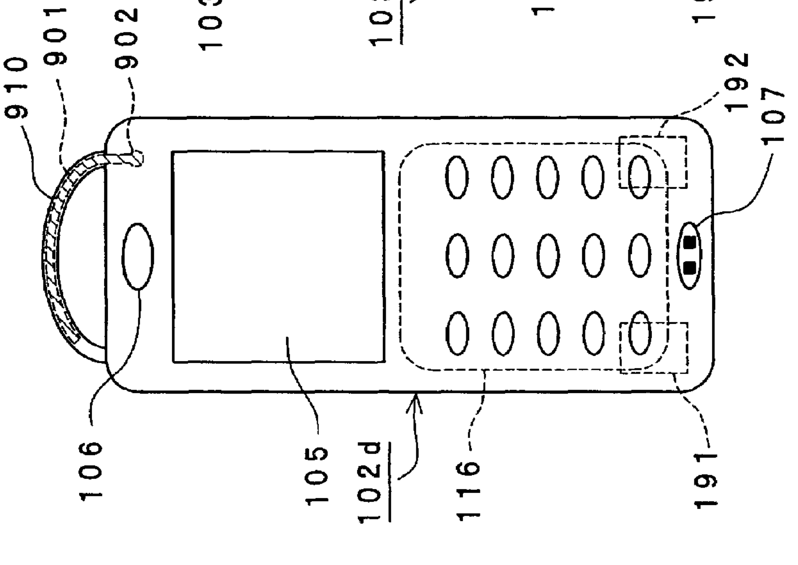
FIG. 47A is a plan view of a straight type portable radio communication apparatus according to a modified preferred embodiment of the thirteenth preferred embodiment of the present invention.

FIG. 47A is a plan view of a straight type portable radio communication apparatus according to a modified preferred embodiment of the thirteenth preferred embodiment of the present invention. FIG. 47B is a rear view of the portable radio communication apparatus shown in FIG. 47A. FIG. 47C is a side view of the portable radio communication apparatus shown in FIG. 47A.

Referring to FIGS. 47A, 47B and 47C, the portable radio communication apparatus according to the present modified preferred embodiment is characterized, as compared with that of the thirteenth preferred embodiment, in that the boom portion 910 including therein the antenna element 901 connected with the connection point 902 is coupled with both edges of an upper end surface of the lower housing 103_d_.

The characteristic constitutions of the portable radio communication apparatuses according to the first to eleventh preferred embodiments and their modified preferred embodiments may be applied to the straight type portable radio communication apparatuses according to the thirteenth preferred embodiment and the modified preferred embodiment of the thirteenth preferred embodiment.

In the above-mentioned preferred embodiments, the antenna or antenna element is preferably an unbalanced type antenna or antenna element.

Modified Preferred Embodiments

Figure 43:
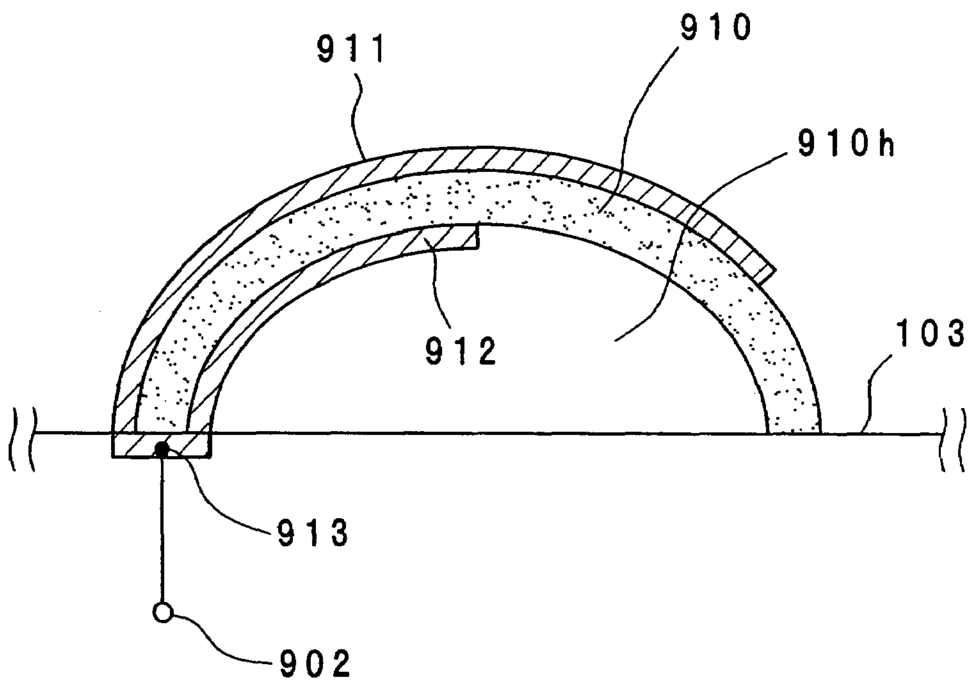
FIG. 43 is a longitudinal sectional view showing a detailed configuration of a boom portion 910 of a portable radio communication apparatus according to a further modified preferred embodiment of the preferred embodiments of the present invention.

FIG. 43 is a longitudinal sectional view showing a detailed configuration of a boom portion 910 of a portable radio communication apparatus according to a further modified preferred embodiment of the preferred embodiments of the present invention.

Referring to FIG. 43, a first electrical conductor antenna element layer 911 is formed on an upper surface of the boom portion 901, and a second electrical conductor antenna element layer 912 is formed on the lower surface of the boom portion 901 to be away from the first electrical conductor antenna element layer 911. Then, the two conductor antenna element layers 911 and 912 are electrically connected with each other at a connection point 913 in the lower housing 103, and the two conductor antenna element layers 911 and 912 are also connected with the connection point 902.

In the portable radio communication apparatus constituted as mentioned above, when the first conductor antenna element layer 911 is formed to have an electric length at which the layer 911 resonates in a lower frequency band such as 800 MHz band or the like. Further, the second conductor antenna element layer 912 is formed to have an electric length at which the layer 912 resonates in a higher frequency band such as 1.5 GHz band or the like. Then, the electric distance between the two layers 911 and 912 is smaller as the frequency becomes lower. Generally speaking, when the distance between a grounding conductor of the printed wiring board 106 in the lower housing 103, and the conductor antenna element 911 is equal to the distance between the grounding conductor thereof and the conductor antenna element 912, the antenna gain of the conductor antenna element layer in the lower frequency band is lowered. However, as shown in FIG. 43, by arranging the conductor antenna element in the lower frequency band on the outer side (upper side) away from the grounding conductor, it is possible to set the distance of the present conductor antenna element layer to the grounding conductor of the lower housing 103 larger. The capacitive coupling between the conductor antenna element layer 911 and the grounding conductor can be remarkably reduced. Therefore, the input impedance when the antenna apparatus is viewed from the feeding point can be further lowered. It is possible to easily attain impedance matching at a predetermined characteristic impedance such as 50 Ω or the like, and it is possible to realize high antenna gain characteristics in wide bands using the two conductor antenna element layers 911 and 912.

In the preferred embodiments mentioned above, the conductor portion that operates as the antenna element 102A is formed on one of the upper first housing portion 102_a_ and the upper second housing portion 102_b_. However, the present invention is not limited to this, and the conductor portion that operates as the antenna element 102A may be formed on each of the upper first housing portion 102_a_ and the upper second housing portion 102_b_.

In the preferred embodiments mentioned above, the conductor portion formed on one of the upper housing 102 and the lower housing 103. However, the present invention is not limited to this, and the conductor portion may be formed on each of the upper housing 102 and the lower housing 103.

In the preferred embodiments mentioned above, the whip antenna is employed as the external antenna. However, the present invention is not limited to this, and a fixed helical antenna may be employed. Further, an inverted-F antenna may be employed as the built-in antenna. Besides, a plurality of antenna apparatuses may be provided in the upper housing 102.

In the preferred embodiments mentioned above, the upper housing 102 is connected with the lower housing 103, for example, by the antenna element 112. However, the present invention is not limited to this, and the upper housing 102 may be connected with the lower housing 103 by an electrical conductor pattern on a flexible printed wiring board.

In the preferred embodiments mentioned above, the boom portion 910 is made of an electrically conductive material such as magnesium or zinc, and this leads to that the mechanical strength of the boom portion 910 can be increased. Accordingly, even if the portable radio communication apparatus falls down to the ground, it is possible to prevent the same apparatus from being damaged. In addition, since at least one part of the boom portion 910 is formed to be filled with a dielectric material such as a resin material, it is advantageously possible to lower the resonance frequency of the antenna element 901 of the boom portion 910, and the portable radio communication apparatus can be made smaller in size as compared with the same apparatus in which the boom portion 910 is not filled with the dielectric material. Further, by fixing the surroundings of the antenna element 901 by a dielectric material such as a resin material, it is possible to increase the mechanical strengths of the boom portion 910 and the antenna element 901, and to improve the mass-producibility of the same apparatus.

In the above-mentioned preferred embodiments, at least one part of the boom portion 910 may be made of an elastic or flexible resin material such as elastomer. In this case, when the portable radio communication apparatus is put on the ground and the user pressurizes the same apparatus from above such as inadvertently stamping down the same apparatus or inadvertently dropping the same apparatus from a holding state, the impact can be absorbed and the damage of the boom portion 910 can be prevented.

In the above-mentioned preferred embodiments, the shape of the boom portion 910 is not limited to that shown in the drawings. For example, the boom portion 910 may be formed to be trapezoidal or tapered. In addition, at least one part of the boom portion 910 may be made of a transparent or semitransparent resin material. In this case, the design quality can be further improved. Further, a light emission diode that projects light during transmission of the radio wave may be arranged in the boom portion 910.

As mentioned above, according to the folding portable radio communication apparatus according to the preferred embodiments, at least one part of the upper housing or lower housing is constituted to serve as the antenna element. Therefore, it is advantageously possible to increase the strength of the same apparatus against the impact such as that upon the user's dropping the same apparatus. In addition, since it is unnecessary to secure the space occupied by the antenna element, the number of parts can be decreased, and the portable radio communication apparatus can be made thinner and lighter in weight as compared with the conventional portable radio communication apparatus. Further, by allowing the hinge portion made of the electrically conductive material to function as a part of the antenna apparatus, the antenna apparatus can be made larger in size, and the antenna gain thereof can be further improved. Additionally, by bonding the thin-film-shaped electrically insulating sheet 301 made of the dielectric material or the magnetic material onto the surface of the upper first housing portion 102*a*, the distance between the human body and the antenna apparatus can be set larger, and then, the decrease of the antenna gain caused by the electromagnetic influence of the human body can be suppressed during a telephone conversation.

According to the portable radio communication apparatus of the preferred embodiments mentioned above, a combination of (a) a first antenna and (b) a second antenna is provided in the vicinity of the hinge portion of the lower housing of the folding portable radio communication apparatus, where (a) the first antenna is the antenna element 901 of the boom portion 910 connected at a position at which the antenna element 901 is substantially laterally symmetric relative to the width direction or the horizontal direction of the same apparatus, and (b) the second antenna includes, as the component, the upper housing or lower housing at least one part of which is made of the electrically conductive material. It is thereby possible to transmit and receive radio waves without using the conventional external antenna. Therefore, it is possible to solve such a conventional disadvantages that the external antenna is sometimes got stuck with his pocket when the portable radio communication apparatus is taken out from his pocket. In addition, since the penetrating hole 910*h* is formed in the space surrounded by the boom portion 910 and the lower housing 103, it is possible to suspend the portable radio communication apparatus from the neck of the user with the strap 910*s* attached to the boom portion 910. In this case, since it is unnecessary to use any conventional external antenna, the portable radio communication apparatus can be designed to be laterally symmetric, and the portable radio communication apparatus can be easily well balanced laterally or horizontally when the same apparatus is suspended from the neck of the user.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A portable radio communication apparatus comprising:

a housing;

a radio communication circuit;

a boom portion connected to said housing at at least two points, said boom portion being made of a dielectric material having at least one through hole formed between said housing and said boom portion;

first and second antenna elements provided in said boom portion, said first and second antenna elements having electric lengths that are different from each other, wherein said first and second antenna elements are connected to a feeding point of said radio communication circuit, wherein the electric length of said first antenna element is larger than that of said second antenna element, wherein said first antenna element is formed at a position further distinct from a grounding conductor of said radio communication circuit than said second antenna element;

a plurality of reactance elements having reactance values that are different from each other; and a switch device for selecting one reactance element among said reactance elements by selectively switching over said reactance elements, and connecting the selected reactance element to at least one of said first and second antenna elements.

2. The portable radio communication apparatus as claimed in claim 1, further comprising at least one third antenna element connected to the feeding point of said radio communication circuit, wherein said switch device is operable to connect the selected reactance element to at least one of said first, second and third antenna elements.

3. The portable radio communication apparatus as claimed in claim 1, wherein said switch device is operable to selectively switch over said reactance elements according to a plurality of operation frequencies of said portable radio communication apparatus.

4. The portable radio communication apparatus as claimed in claim 2, wherein said switch device is operable to selectively switch over said reactance elements according to a plurality of operation frequencies of said portable radio communication apparatus.

5. The portable radio communication apparatus as claimed in claim 1, wherein said switch device is operable to selectively switch over said reactance elements according to transmission and reception of said portable radio communication apparatus.

6. The portable radio communication apparatus as claimed in claim 2, wherein said switch device is operable to selectively switch over said reactance elements according to transmission and reception of said portable radio communication apparatus.

* * * * *